(12) United States Patent
Kuo

(10) Patent No.: US 12,429,675 B2
(45) Date of Patent: Sep. 30, 2025

(54) PHOTOGRAPHING OPTICAL LENS ASSEMBLY

(71) Applicant: LARGAN PRECISION CO., LTD., Taichung (TW)

(72) Inventor: Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 18/433,588

(22) Filed: Feb. 6, 2024

(65) Prior Publication Data

US 2024/0176110 A1 May 30, 2024

Related U.S. Application Data

(63) Continuation of application No. 17/465,995, filed on Sep. 3, 2021, now Pat. No. 11,927,729, which is a continuation of application No. 16/382,648, filed on Apr. 12, 2019, now Pat. No. 11,137,576.

(30) Foreign Application Priority Data

Jul. 4, 2018 (TW) .................. 107123175

(51) Int. Cl.
| | | |
|---|---|---|
| G02B 15/14 | (2006.01) | |
| G02B 3/02 | (2006.01) | |
| G02B 9/64 | (2006.01) | |
| G02B 13/00 | (2006.01) | |
| G02B 13/18 | (2006.01) | |
| G02B 13/06 | (2006.01) | |

(52) U.S. Cl.
CPC .......... *G02B 13/0045* (2013.01); *G02B 9/64* (2013.01); *G02B 13/18* (2013.01); *G02B 13/06* (2013.01)

(58) Field of Classification Search
CPC ...... G02B 9/64; G02B 13/0045; G02B 13/18; G02B 13/06
USPC .................................................. 359/681, 708
See application file for complete search history.

(56) References Cited

U.S. PATENT DOCUMENTS

| | | |
|---|---|---|
| 5,087,989 A | 2/1992 | Igarashi |
| 9,523,841 B1 | 12/2016 | Chen |
| 9,615,008 B2 | 4/2017 | Sun |
| 9,678,315 B2 | 6/2017 | Chen |
| 9,835,822 B2 | 12/2017 | Huang |
| 9,885,855 B2 | 2/2018 | Chen |
| 10,268,026 B2 | 4/2019 | Suzuki |

(Continued)

FOREIGN PATENT DOCUMENTS

| | | |
|---|---|---|
| CN | 104145200 A | 11/2014 |
| CN | 104871063 A | 8/2015 |

(Continued)

*Primary Examiner* — Mahidere S Sahle
(74) *Attorney, Agent, or Firm* — McClure, Qualey & Rodack, LLP

(57) ABSTRACT

A photographing optical lens assembly includes eight lens elements, the eight lens elements being, in order from an object side to an image side, a first lens element, a second lens element, a third lens element, a fourth lens element, a fifth lens element, a sixth lens element, a seventh lens element and an eighth lens element. Each of the eight lens elements has an object-side surface facing towards the object side and an image-side surface facing towards the image side. At least one surface of the object-side surface and the image-side surface of at least one lens element of the photographing optical lens assembly is aspheric and includes at least one inflection point.

9 Claims, 28 Drawing Sheets

(56) References Cited

U.S. PATENT DOCUMENTS

| | | |
|---|---|---|
| 10,649,201 B2 | 5/2020 | Takato |
| 2007/0064313 A1 | 3/2007 | Hosokawa |
| 2012/0120505 A1 | 5/2012 | Nakai et al. |
| 2014/0293100 A1 | 10/2014 | Sasaya |
| 2015/0271374 A1 | 9/2015 | Sun |
| 2016/0282591 A1 | 9/2016 | Mizusawa |
| 2017/0192200 A1 | 7/2017 | Hsieh et al. |
| 2017/0242220 A1 | 8/2017 | Lee |
| 2017/0254990 A1 | 9/2017 | Noda et al. |
| 2017/0322397 A1 | 11/2017 | Lee et al. |
| 2017/0329108 A1 | 11/2017 | Hashimoto |
| 2018/0180856 A1 | 6/2018 | Jung et al. |
| 2018/0239117 A1 | 8/2018 | Lee et al. |
| 2018/0326909 A1 | 11/2018 | Iwashita |
| 2018/0329184 A1* | 11/2018 | Chang .................. G02B 9/64 |
| 2018/0356616 A1 | 12/2018 | Bone et al. |
| 2019/0033557 A1 | 1/2019 | Chang et al. |
| 2019/0049705 A1 | 2/2019 | Cook |
| 2019/0101728 A1 | 4/2019 | Hsieh et al. |
| 2019/0121098 A1* | 4/2019 | Zhou .................. G02B 13/0045 |
| 2019/0204565 A1 | 7/2019 | Wolterink et al. |
| 2020/0003986 A1 | 1/2020 | Lai et al. |

FOREIGN PATENT DOCUMENTS

| | | | | |
|---|---|---|---|---|
| CN | 106772946 | | 5/2017 | |
| CN | 106932884 A | | 7/2017 | |
| CN | 107085285 A | | 8/2017 | |
| CN | 107436475 A | | 12/2017 | |
| CN | 107462969 A | | 12/2017 | |
| CN | 107643586 A | | 1/2018 | |
| CN | 107678140 A | | 2/2018 | |
| CN | 107703608 A | | 2/2018 | |
| CN | 107703609 A | | 2/2018 | |
| CN | 107741630 A | | 2/2018 | |
| CN | 107797261 A | | 3/2018 | |
| CN | 107831588 A | | 3/2018 | |
| CN | 207164344 | | 3/2018 | |
| CN | 207164344 U | | 3/2018 | |
| CN | 207336908 | | 5/2018 | |
| CN | 108169881 | | 6/2018 | |
| CN | 108241202 A | | 7/2018 | |
| CN | 108318995 A | * | 7/2018 | ......... G02B 13/0015 |
| CN | 108983399 A | * | 12/2018 | ......... G02B 13/0045 |
| JP | H0455807 A | | 2/1992 | |
| JP | 2011242520 A | | 12/2011 | |
| JP | 2012073337 | | 4/2012 | |
| JP | 2017142363 A | | 8/2017 | |
| TW | 201816455 A | | 5/2018 | |
| TW | 201816456 A | | 5/2018 | |
| WO | WO-2010077050 A2 | * | 7/2010 | ............. G02B 13/06 |
| WO | 2017119188 A1 | | 7/2017 | |
| WO | 2019078222 A1 | | 4/2019 | |
| WO | 2019091170 | | 5/2019 | |

* cited by examiner

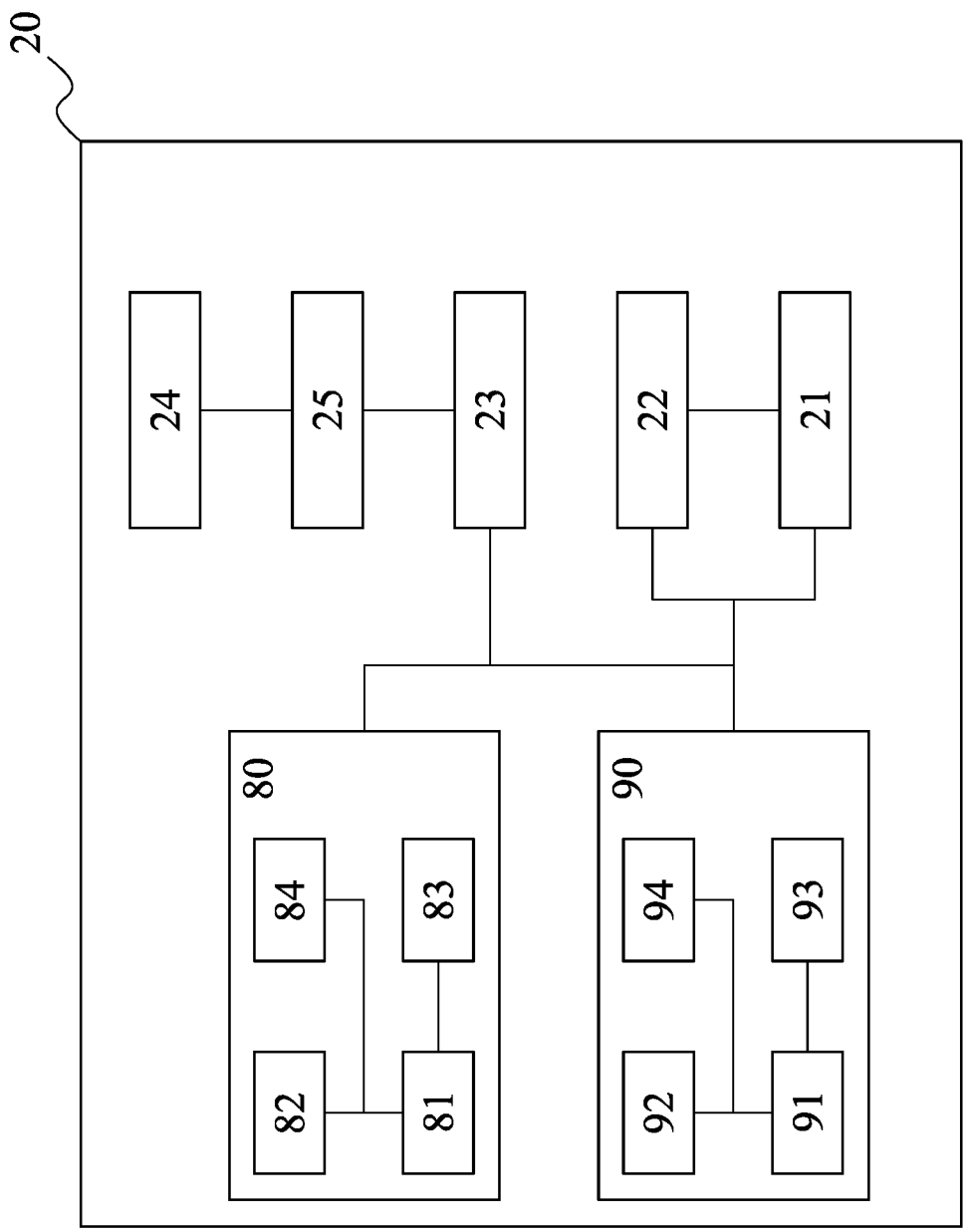
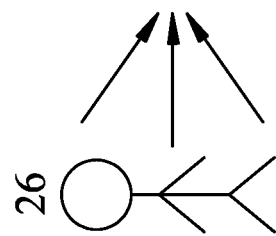
Fig. 25C

PHOTOGRAPHING OPTICAL LENS ASSEMBLY

RELATED APPLICATIONS

The present application is a continuation of U.S. application Ser. No. 17/465,995, filed on Sep. 3, 2021, U.S. Pat. No. 11,927,729 issued on Mar. 12, 2024, which is a continuation of U.S. application Ser. No. 16/382,648, filed on Apr. 12, 2019, U.S. Pat. No. 11,137,576 issued on Oct. 5, 2021, which claims priority to Taiwan Application Serial Number 107123175, filed on Jul. 4, 2018, which are herein incorporated by reference.

BACKGROUND

Technical Field

The present disclosure relates to a photographing optical lens assembly and an imaging apparatus. More particularly, the present disclosure relates to a photographing optical lens assembly and an imaging apparatus with a compact size applicable to electronic devices.

Description of Related Art

With the advanced semiconductor manufacturing technologies, the performances of image sensors are enhanced, and the pixel size is minified. Therefore, photographing optical lens assemblies with high image quality become indispensable.

Moreover, with the rapid scientific and technological progress, the application scope of electronic devices equipped with photographing optical lens assemblies becomes wider, and the requirements for photographing optical lens assemblies are more diverse. However, it is hard for balancing the requirements, such as image quality, sensitivity, aperture size, volume and field of view, in conventional photographing optical lens assemblies. Therefore, a photographing optical lens assembly is provided by the present disclosure to satisfy the desired requirement.

SUMMARY

According to one aspect of the present disclosure, a photographing optical lens assembly includes eight lens elements, the eight lens elements being, in order from an object side to an image side, a first lens element, a second lens element, a third lens element, a fourth lens element, a fifth lens element, a sixth lens element, a seventh lens element and an eighth lens element. Each of the eight lens elements has an object-side surface facing towards the object side and an image-side surface facing towards the image side. At least one surface of the object-side surface and the image-side surface of at least one lens element of the photographing optical lens assembly is aspheric and includes at least one inflection point. When a half of a maximum field of view of the photographing optical lens assembly is HFOV, and an axial distance between the object-side surface of the first lens element and an image surface is TL, the following conditions are satisfied:

55.0 degrees<HFOV; and 1.0 mm<$TL$<12.0 mm.

According to another aspect of the present disclosure, an imaging apparatus includes the photographing optical lens assembly of the aforementioned aspect and an image sensor, wherein the image sensor is disposed on the image surface of the photographing optical lens assembly.

According to another aspect of the present disclosure, an electronic device includes the imaging apparatus of the aforementioned aspect.

BRIEF DESCRIPTION OF THE DRAWINGS

The present disclosure can be more fully understood by reading the following detailed description of the embodiment, with reference made to the accompanying drawings as follows:

FIG. 25C is a system schematic view of the electronic device of FIG. 25A.

DETAILED DESCRIPTION

Figure 1:
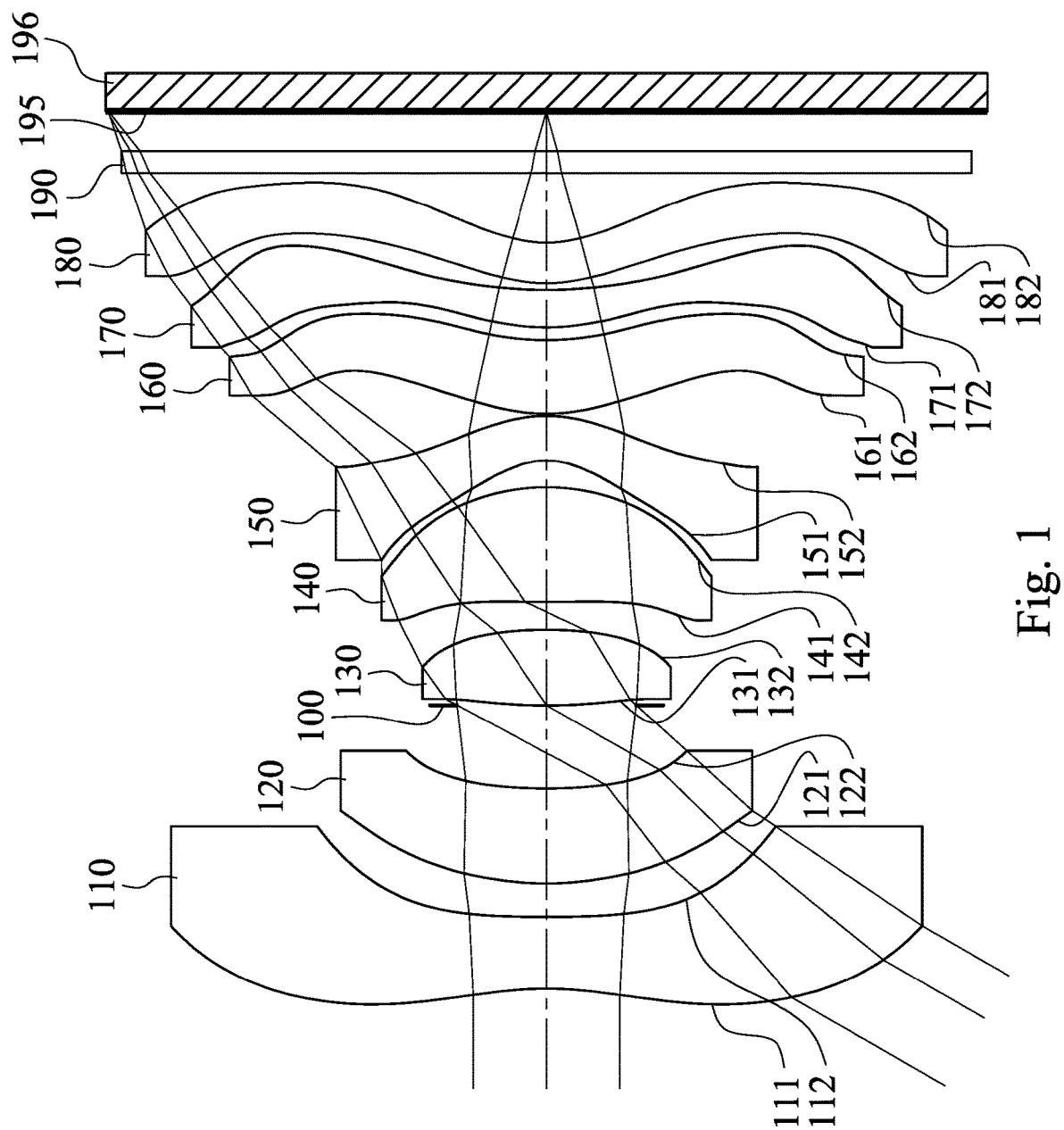
FIG. 1 is a schematic view of an imaging apparatus according to the 1st embodiment of the present disclosure.

A photographing optical lens assembly includes eight lens elements, the eight lens elements being, in order from an object side to an image side, a first lens element, a second lens element, a third lens element, a fourth lens element, a fifth lens element, a sixth lens element, a seventh lens element and an eighth lens element. Each of the eight lens elements has an object-side surface facing towards the object side and an image-side surface facing towards the image side.

The first lens element can have negative refractive power. Therefore, it is favorable for increasing the light intensity of the wide field of view so as to enlarge the field of view. The object-side surface of the first lens element can be planar or concave in a paraxial region thereof. Therefore, it is favorable for reducing the volume occupation of the first lens element and correcting aberrations under the design of the wide field of view.

The second lens element can have positive refractive power. Therefore, it is favorable for reducing the total track length and correcting aberrations resulted from enlarging the field of view by the first lens element.

The fourth lens element can have positive refractive power. Therefore, it is favorable for sharing the responsibility of reducing the total track length so as to reduce the sensitivity and decrease aberrations generated by a single lens element.

The object-side surface of the eighth lens element can be convex in a paraxial region thereof. Therefore, it is favorable for reducing aberrations, such as the field curvature, by adjusting the surface shape of the eighth lens element. The image-side surface of the eighth lens element can be concave in a paraxial region thereof, so that the photographing optical lens assembly can have the back focal length with a proper length.

At least one surface of the object-side surface and the image-side surface of at least one lens element of the photographing optical lens assembly includes at least one inflection point. That is, at least one surface among from the object-side surface of the first lens element to the image-side surface of the eighth lens element includes at least one inflection point. Therefore, it is favorable for enhancing aspheric changes so as to reduce aberrations, improve the image quality and reduce the volume. Moreover, each surface of at least two or three surfaces among from the object-side surface of the first lens element to the image-side surface of the eighth lens element can include at least one inflection point. Furthermore, at least one surface of the object-side surface and the image-side surface of each lens element of at least four, five, or six lens elements of the photographing optical lens assembly can include at least one inflection point.

At least one surface of the object-side surface and the image-side surface of at least one lens element of the photographing optical lens assembly can include at least one critical point in an off-axis region thereof. That is, at least one surface among from the object-side surface of the first lens element to the image-side surface of the eighth lens element can include at least one critical point in an off-axis region thereof. Therefore, it is favorable for adjusting the refractive angle of the light to reduce the surface reflection, so that the illuminance of the light on an image surface can be raised, the aberration corrections can be enhanced, and the stray light can be reduced. Moreover, the object-side surface of the first lens element can include at least one critical point in an off-axis region thereof. Moreover, at least one surface among from the object-side surface of the seventh lens element to the image-side surface of the eighth lens element can include at least one critical point in an off-axis region thereof. Furthermore, the object-side surface of the first lens element can include at least one convex critical point in an off-axis region thereof. Furthermore, at least one surface of the image-side surface of the seventh lens element and the image-side surface of the eighth lens element can include at least one critical point in an off-axis region thereof. When the object-side surface of the first lens element includes at least one critical point in an off-axis region thereof, it is favorable for reducing the incident angle of the wide angle light on the first lens element so as to decrease the surface reflection. When the object-side surface of the first lens element includes at least one convex critical point in an off-axis region thereof, the aforementioned effects can be enhanced. When the image-side surface of the seventh lens element includes at least one critical point in an off-axis region thereof, it is favorable for adjusting the incident angle of the light on the eighth lens element so as to reduce the stray light and raise the illuminance of the light on the image surface. When the image-side surface of the eighth lens element includes at least one critical point in an off-axis region thereof, it is favorable for adjusting the incident angle of the light on the image surface so as to increase the response efficiency of an image sensor and correct peripheral aberrations.

One lens element of the photographing optical lens assembly can be made of a plastic material. Moreover, at least five lens elements of the photographing optical lens assembly can be made of plastic materials. Moreover, at least six lens elements of the photographing optical lens assembly can be made of plastic materials. Furthermore, any surface of the object-side surface and the image-side surface of the lens element made of the plastic material can or cannot include at least one inflection point, and can or cannot include at least one critical point.

At least two lens elements of the photographing optical lens assembly can be made of plastic materials. The at least two lens elements are located adjacent to each other and aspheric cemented. Aspheric coefficients of the at least two lens elements are different. Therefore, cemented lens elements are advantageous in increasing the stability, the yield rate and environmental adaptability. Cemented surfaces being aspheric surfaces with different aspheric coefficients are beneficial to correct aberrations so as to enhance the image quality.

When a half of a maximum field of view of the photographing optical lens assembly is HFOV, the following condition is satisfied: 55.0 degrees<HFOV. Therefore, it is favorable for the photographing optical lens assembly to be featured with a wide field of view so as to expand the application range. Moreover, the following condition can be satisfied: 55.0 degrees<HFOV<80.0 degrees. Therefore, the excessive distortion can be avoided.

When an axial distance between the object-side surface of the first lens element and the image surface is TL, the following condition is satisfied: 1.0 mm<TL<12.0 mm. Therefore, it is favorable for maintaining the short total track length of the photographing optical lens assembly and increasing the manufacturing and assembling yield rates. Moreover, the following condition can be satisfied: 2.0 mm<TL<7.0 mm.

When a vertical distance between the critical point in the off-axis region on the image-side surface of the eighth lens element and an optical axis is Yc82, and a vertical distance between a maximum effective diameter position of the image-side surface of the eighth lens element and the optical axis is Y82, the following condition is satisfied: 0.10<Yc82/Y82<0.90. Therefore, it is favorable for further correcting aberrations by adjusting the position of the critical point.

When a central thickness of the sixth lens element is CT6, a central thickness of the seventh lens element is CT7, and a central thickness of the eighth lens element is CT8, the following condition is satisfied: 0<(CT7+CT8)/CT6<2.20. Therefore, it is favorable for the lens elements located near the image side of the photographing optical lens assembly to cooperate with each other so as to correct peripheral aberrations, such as the field curvature.

When an axial distance between the first lens element and the second lens element is T12, and a central thickness of the second lens element is CT2, the following condition is satisfied: 0<T12/CT2<2.5. Therefore, it is favorable for balancing the field of view and the volume by adjusting the lens thickness and the space between the first lens element and the second lens element. Moreover, the following condition can be satisfied: 0.40<T12/CT2<1.7.

When an axial distance between the fifth lens element and the sixth lens element is T56, and an average value of axial distances between every adjacent lens elements of the photographing optical lens assembly is Tavg, the following condition is satisfied: 0<T56/Tavg<1.30. Therefore, it is favorable for avoiding an overly large space between the fifth lens element and the sixth lens element and adjusting spaces between every adjacent lens elements simultaneously so as to reduce the volume. Moreover, the following condition can be satisfied: 0<T56/Tavg<0.90.

When the axial distance between the object-side surface of the first lens element and the image surface is TL, and an entrance pupil diameter of the photographing optical lens assembly is EPD, the following condition is satisfied: 2.40<TL/EPD<8.50. Therefore, it is favorable for balancing the total track length and the size of the aperture stop of the photographing optical lens assembly. Moreover, the following condition can be satisfied: 4.00<TL/EPD<7.50.

When the axial distance between the object-side surface of the first lens element and the image surface is TL, and a focal length of the photographing optical lens assembly is f, the following condition is satisfied: 1.70<TL/f<12.0. Therefore, it is favorable for maintaining a proper total track length while enlarging the field of view of the photographing optical lens assembly. Moreover, the following condition can be satisfied: 2.40<TL/f<10.0.

When the axial distance between the object-side surface of the first lens element and the image surface is TL, and a maximum image height of the photographing optical lens assembly is ImgH, the following condition is satisfied: 1.0<TL/ImgH<6.0. Therefore, it is favorable for maintaining the image quality while reducing the total track length and enlarging the area of the image surface. Moreover, the following condition can be satisfied: 1.8<TL/ImgH<5.4.

When a vertical distance between a maximum effective diameter position of the object-side surface of the first lens element and the optical axis is Y11, and the vertical distance between the maximum effective diameter position of the image-side surface of the eighth lens element and the optical axis is Y82, the following condition is satisfied: 0.45<Y11/Y82<3.0. Therefore, it is favorable for adjusting the ratio between the outer diameter of the object side and the outer diameter of the image side of the photographing optical lens assembly so as to balance the field of view, the image quality and the volume thereof.

When a curvature radius of the object-side surface of the first lens element is R1, and a curvature radius of the image-side surface of the first lens element is R2, the following condition is satisfied: −1.0<(R1+R2)/(R1−R2)<4.5. Therefore, it is favorable for providing a proper incident angle and a proper exit angle of the light on the first lens element by adjusting the surface shape of the first lens element. Moreover, the following condition can be satisfied: −0.70<(R1+R2)/(R1−R2)<3.5.

When the focal length of the photographing optical lens assembly is f, and a composite focal length of the first lens element and the second lens element is f12, the following condition is satisfied: −0.90<f/f12<0.60. Therefore, it is favorable for reducing aberrations by the cooperation between the first lens element and the second lens element.

When the focal length of the photographing optical lens assembly is f, and a composite focal length of the first lens element, the second lens element and the third lens element is f123, the following condition is satisfied: −0.14<f/f123<0.54. Therefore, it is favorable for preventing the photographing optical lens assembly from excessive aberrations caused by overly refractive power of the object side so as to enhance the image quality.

When the focal length of the photographing optical lens assembly is f, and the curvature radius of the object-side surface of the first lens element is R1, the following condition is satisfied: f/|R1|<1.60. Therefore, it is favorable for the photographing optical lens assembly to be applicable to the design of a wide field of view by adjusting the first lens element and the focal length of the photographing optical lens assembly. Moreover, the following condition can be satisfied: f/|R1|<1.20.

When the focal length of the photographing optical lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the eighth lens element is f8, and a maximum value among |f/f1|, |f/f2|, |f/f3|, |f/f4|, |f/f5|, |f/f6|, |f/f7| and |f/f8| is |P|max, the following condition is satisfied: |P|max≤ 1.0. Therefore, it is favorable for avoiding a single lens element with overly refractive power so as to reduce the sensitivity of each lens element and increase the yield rate.

When the maximum image height of the photographing optical lens assembly is ImgH, and the focal length of the photographing optical lens assembly is f, the following condition is satisfied: 1.0<ImgH/f<3.0. Therefore, it is favorable for balancing the image quality and the application range by adjusting the field of view and the size of the image surface. Moreover, the following condition can be satisfied: 1.1<ImgH/f<2.7.

When a refractive index of the fourth lens element is N4, the following condition is satisfied: 1.20<N4<1.60. Therefore, it is favorable for the fourth lens element with the proper material so as to enhance aberration corrections.

When an axial distance between the object-side surface of the first lens element and the image-side surface of the eighth lens element is TD, a central thickness of the third lens element is CT3, a central thickness of the fourth lens element is CT4, a central thickness of the fifth lens element is CT5, an axial distance between the third lens element and the fourth lens element is T34, and an axial distance between the fourth lens element and the fifth lens element is T45, the following condition is satisfied: 1.80<TD/(CT3+T34+CT4+T45+CT5)<3.80. Therefore, it is favorable for adjusting the light path by configuring the lens elements so as to reduce the total track length.

When a minimum value among Abbe numbers of the lens elements of the photographing optical lens assembly is Vmin, the following condition is satisfied: 10.0<Vmin<20.0. A lens material with a lower Abbe number is generally featured with a better light refracting ability, so that chromatic aberration and other kinds of aberrations can be corrected by configuring the lens material with the lower Abbe number.

The photographing optical lens assembly can further include an aperture stop, which is disposed on the image side of the first lens element. Therefore, it is favorable for balancing the field of view and the volume by adjusting the position of the aperture stop.

When an axial distance between the aperture stop and the image surface is SL, and the axial distance between the object-side surface of the first lens element and the image surface is TL, the following condition is satisfied: 0<SL/TL<1.10. Therefore, the total track length can be reduced by adjusting the position of the aperture stop. Moreover, the following condition can be satisfied: 0.30<SL/TL≤ 0.86. Therefore, the design of the short total track length and the wide field of view can be achieved by further adjusting the position of the aperture stop. Furthermore, the following condition can be satisfied: 0.50<SL/TL≤ 0.86.

When the focal length of the photographing optical lens assembly is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, the focal length of the seventh lens element is f7, and the focal length of the eighth lens element is f8, at least one of the following conditions is satisfied: −1.50<f/f1<0.55; −0.55<f/f2<1.50; −1.00<f/f3<1.00; −1.50<f/f4<2.00; −1.50<f/f5<1.80; −1.50<f/f6<1.50; −1.50<f/f7<1.50; and −1.50<f/f8<1.00. Therefore, it is favorable for providing the lens element with the proper strength of refractive power so as to avoid excessive aberrations while enlarging the field of view and reducing the volume. Moreover, at least one of the following conditions can be satisfied: −1.10<f/f1<−0.05; 0.05<f/f2<1.20; −0.70<f/f3<0.80; 0.02≤ f/f4<1.70; −1.20<f/f5<1.50; −1.10<f/f6<1.20; −0.90<f/f7<1.10; and −1.10<f/f8<0.50.

When the focal length of the photographing optical lens assembly is f, the following condition is satisfied: 0 mm<f<2.4 mm. Therefore, it is favorable for enlarging the field of view.

When the focal length of the photographing optical lens assembly is f, and the entrance pupil diameter of the photographing optical lens assembly is EPD, the following condition is satisfied: 1.0<f/EPD<2.2. Therefore, it is favorable for providing the aperture stop with the proper size and the proper field of view of the photographing optical lens assembly by adjusting the size of the aperture stop and the focal length of the photographing optical lens assembly.

When an incident angle of a chief ray at the maximum image height on the image surface of the photographing optical lens assembly is CRA, the following condition is satisfied: 25.0 degrees<CRA<45.0 degrees. Therefore, it is favorable for providing the incident angle with the proper value of the light on the image surface so as to increase the response efficiency of an image sensor.

When the maximum image height of the photographing optical lens assembly is ImgH, the following condition is satisfied: 0.50 mm<ImgH<5.0 mm. Therefore, it is favorable for providing an image sensor with a proper size to the photographing optical lens assembly.

When the vertical distance between the maximum effective diameter position of the image-side surface of the eighth lens element and the optical axis is Y82, and the central thickness of the eighth lens element is CT8, the following condition is satisfied: 3.80<Y82/CT8<15.0. Therefore, it is favorable for the eighth lens element to occupy a smaller volume while correcting aberrations by adjusting the surface shape of the eighth lens element.

When the vertical distance between the maximum effective diameter position of the image-side surface of the eighth lens element and the optical axis is Y82, and the focal length of the photographing optical lens assembly is f, the following condition is satisfied: 1.0<Y82/f<3.0. Therefore, it is favorable for balancing the field of view and the volume by adjusting the eighth lens element and the focal length of the photographing optical lens assembly.

Each of the aforementioned features of the photographing optical lens assembly can be utilized in numerous combinations, so as to achieve the corresponding functionality.

According to the photographing optical lens assembly of the present disclosure, the lens elements of the photographing optical lens assembly can be made of either glass or plastic material. When the lens elements are made of glass material, the refractive power distribution of the photographing optical lens assembly may be more flexible. The glass lens element can either be made by grinding or molding. When the lens elements are made of plastic material, the manufacturing cost can be effectively reduced. Furthermore, surfaces of each lens element can be arranged to be aspheric (ASP), which allows for more controllable variables for eliminating the aberration thereof, the required number of the lens elements can be decreased, and the total track length of the photographing optical lens assembly can be effectively reduced. The aspheric surfaces may be formed by plastic injection molding or glass molding.

According to the photographing optical lens assembly of the present disclosure, one or more of the lens material may optionally include an additive which alters the lens transmittance in a specific range of wavelength for reducing unwanted stray light or color deviation. For example, the additive may optionally filter out light in the wavelength range of 600 nm~800 nm for reducing excessive red light and/or near infra-red light, or may optionally filter out light in the wavelength range of 350 nm~450 nm to reduce excessive blue light and/or near ultra-violet light from interfering the final image. The additive may be homogenously mixed with a plastic material to be used in manufacturing a mixed-material lens element by injection molding.

According to the photographing optical lens assembly of the present disclosure, when a surface of a lens element is aspheric, it indicates that the complete optical effective area or a partial of the optical effective area of the surface of the lens element can be aspheric.

According to the photographing optical lens assembly of the present disclosure, each of an object-side surface and an image-side surface of a lens element has a paraxial region and an off-axis region. The paraxial region refers to the region of the surface where light rays travel close to the optical axis, and the off-axis region refers to the region of the surface away from the paraxial region. Particularly unless otherwise specified, when the lens element has a convex surface, it indicates that the surface can be convex in the paraxial region thereof; when the lens element has a concave surface, it indicates that the surface can be concave in the paraxial region thereof. According to the photographing optical lens assembly of the present disclosure, the refractive power of a lens element being positive or negative, or the focal length of the lens element may refer to the refractive power or the focal length in the paraxial region of the lens element.

According to the photographing optical lens assembly of the present disclosure, an inflection point is defined as a point where curvature is shifted from positive to negative or from negative to positive.

According to the photographing optical lens assembly of the present disclosure, a critical point is a non-axial point of the lens surface where its tangent is perpendicular to the optical axis, wherein a convex critical point is a critical point located on a convex shape of the lens surface, and a concave critical point is a critical point located on a concave shape of the lens surface.

According to the photographing optical lens assembly of the present disclosure, the image surface, depending on the corresponding image sensor, can be a planar surface or a curved surface, particularly a curved surface being concave toward the object side. According to the photographing optical lens assembly of the present disclosure, at least one image correcting element (such as a field flattener) can be selectively disposed between a lens element closest to the image surface and the image surface so as to correct image aberrations (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin plano-concave element having a concave surface facing toward the object side and is disposed close to the image surface.

According to the photographing optical lens assembly of the present disclosure, the photographing optical lens assembly can include at least one stop. The stop can be a glare stop, a field stop, etc. Therefore, the stray light can be eliminated, and the image quality can be improved.

According to the photographing optical lens assembly of the present disclosure, an aperture stop can be configured as a front stop or a middle stop. A front stop is disposed between an imaged object and the first lens element, and a middle stop is disposed between the first lens element and the image surface. The front stop can provide a longer distance between an exit pupil of the photographing optical lens assembly and the image surface to enable a telecentric effect, and thereby can improve the image-sensing efficiency of an image sensor. The middle stop is favorable for enlarging the field of view of the photographing optical lens assembly and thereby provides a wider field of view for the same.

According to the photographing optical lens assembly of the present disclosure, a variable aperture element can be properly configured. The variable aperture element can be a mechanical part or a light control part, and the dimension and the shape of the variable aperture element can be electrically controlled. The mechanical part can include a moveable component such a blade group or a shielding plate. The light control part can include a screen component such as a light filter, an electrochromic material, a liquid crystal layer or the like. The amount of incoming light or the exposure time of the image can be controlled by the variable aperture element to enhance the image moderation ability. In addition, the variable aperture element can be the aperture stop of the photographing optical lens assembly according to the present disclosure, so as to moderate the image properties by changing f-number to control the depth of field or the exposure speed.

According to the photographing optical lens assembly of the present disclosure, the photographing optical lens assembly can be applied to 3D (three-dimensional) image capturing applications, in products such as digital cameras, mobile devices, digital tablets, smart TVs, network monitoring devices, motion sensing input devices, driving recorders, rear view camera systems, wearable devices, unmanned aerial vehicles, and other electronic imaging products.

According to the present disclosure, an imaging apparatus is provided. The imaging apparatus includes the aforementioned photographing optical lens assembly according to the present disclosure and an image sensor, wherein the image sensor is disposed on or near the image surface of the aforementioned photographing optical lens assembly. It is favorable for providing the design of the thin form and the large aperture stop by properly arranging the surface shapes of the lens elements, so that the photographing optical lens assembly can be featured with the wide field of view to expand the application range, maintain the short total track length, and increase the manufacturing and the assembling yield rates. Moreover, the imaging apparatus can further include a barrel member, a holder member or a combination thereof.

According to the present disclosure, an electronic device is provided, wherein the electronic device includes the aforementioned imaging apparatus. Therefore, it is favorable for enhancing the image quality. Moreover, the electronic device can further include, but not limited to, a control unit, a display, a storage unit, a random access memory unit (RAM) or a combination thereof.

According to the above description of the present disclosure, the following 1st-13th specific embodiments are provided for further explanation.

1ST EMBODIMENT

Figure 2:
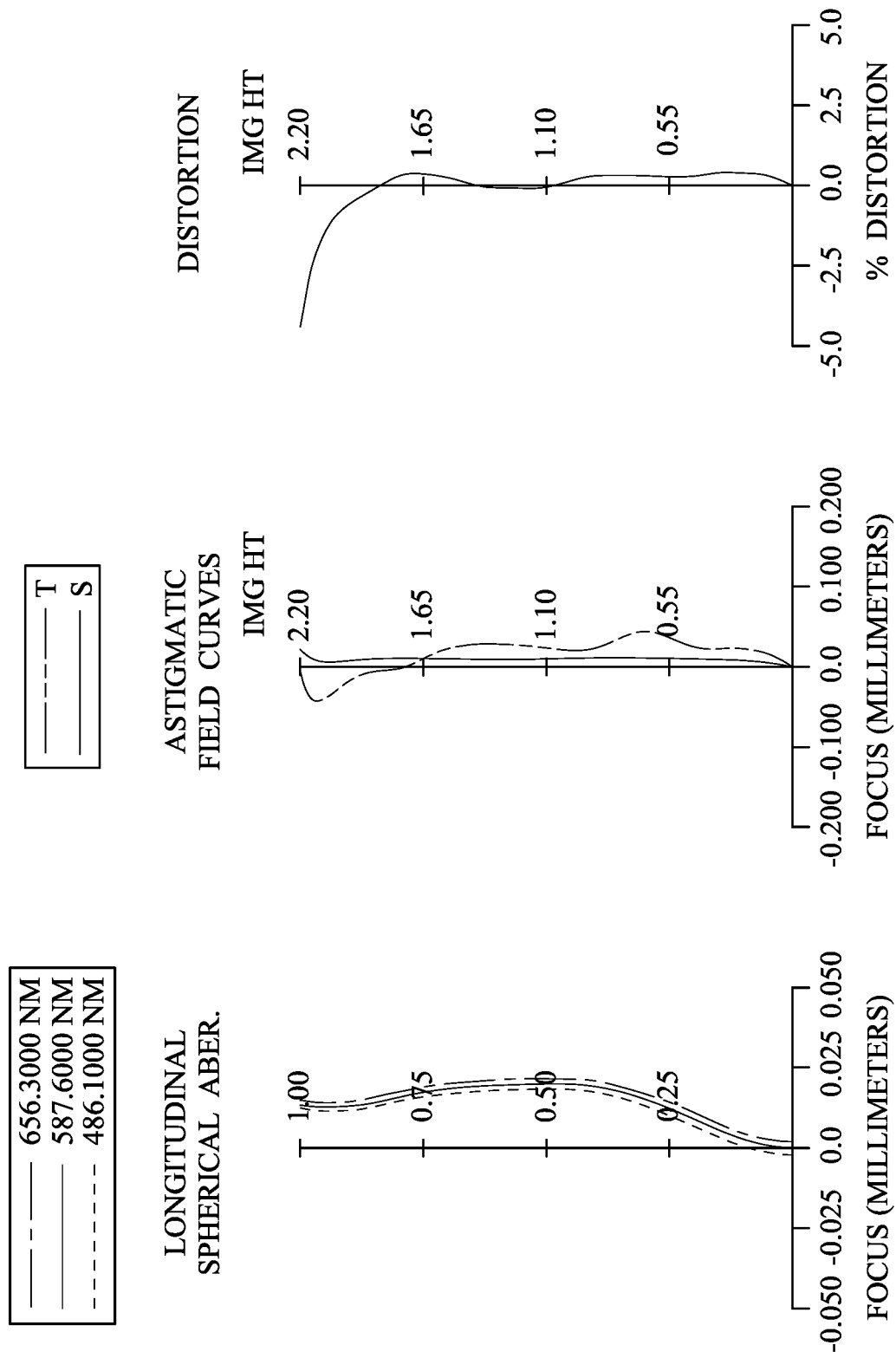
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes a photographing optical lens assembly (its reference numeral is omitted) and an image sensor 196. The photographing optical lens assembly includes, in order from an object side to an image side, a first lens element 110, a second lens element 120, an aperture stop 100, a third lens element 130, a fourth lens element 140, a fifth lens element 150, a sixth lens element 160, a seventh lens element 170, an eighth lens element 180, a filter 190 and an image surface 195. The image sensor 196 is disposed on the image surface 195 of the photographing optical lens assembly. The photographing optical lens assembly includes eight lens elements (110, 120, 130, 140, 150, 160, 170 and 180) without additional one or more lens elements inserted between the first lens element 110 and the eighth lens element 180.

Figure 21:
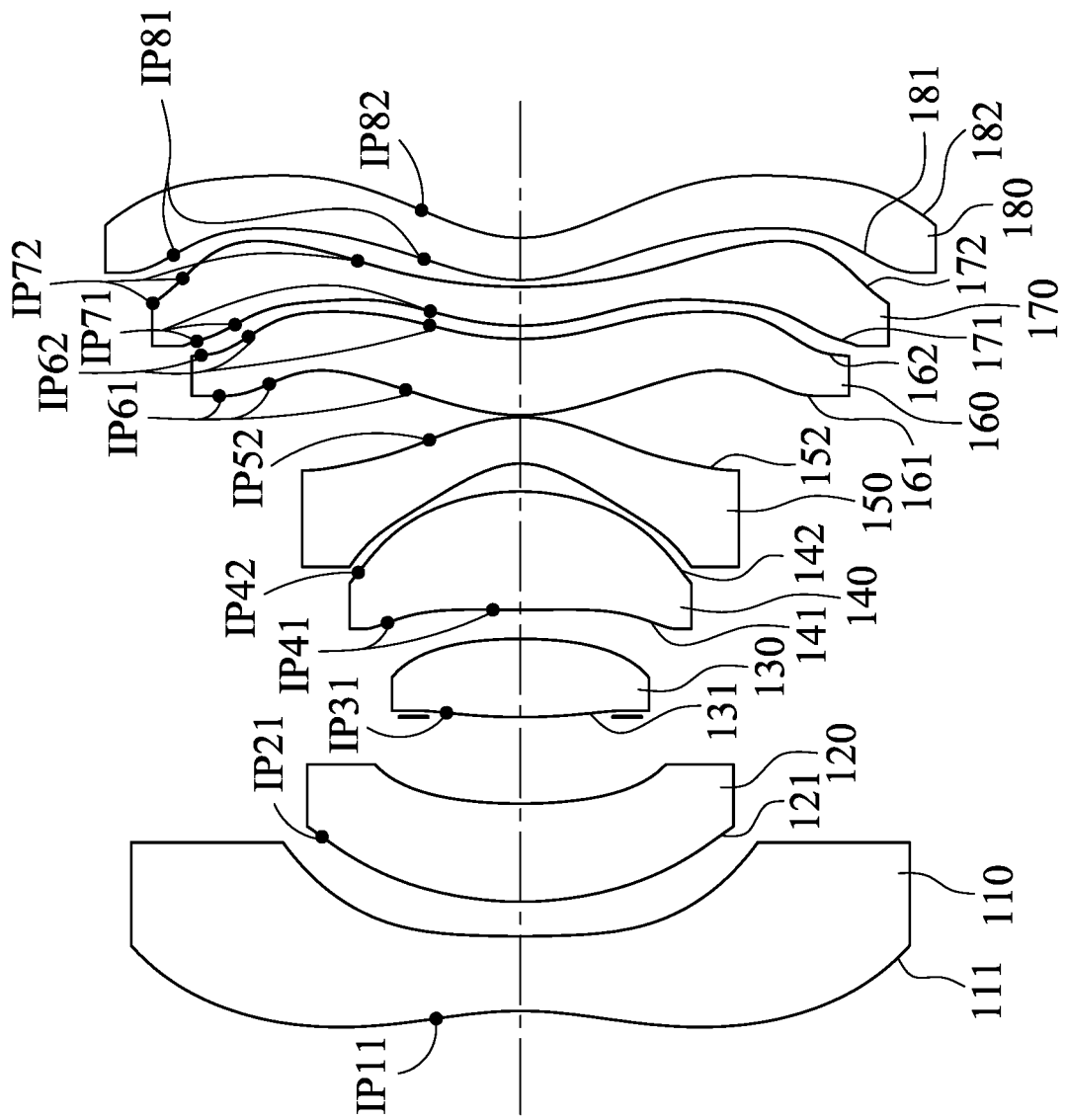
FIG. 21 shows a schematic view of inflection points according to the 1st embodiment of FIG. 1.
Figure 22:
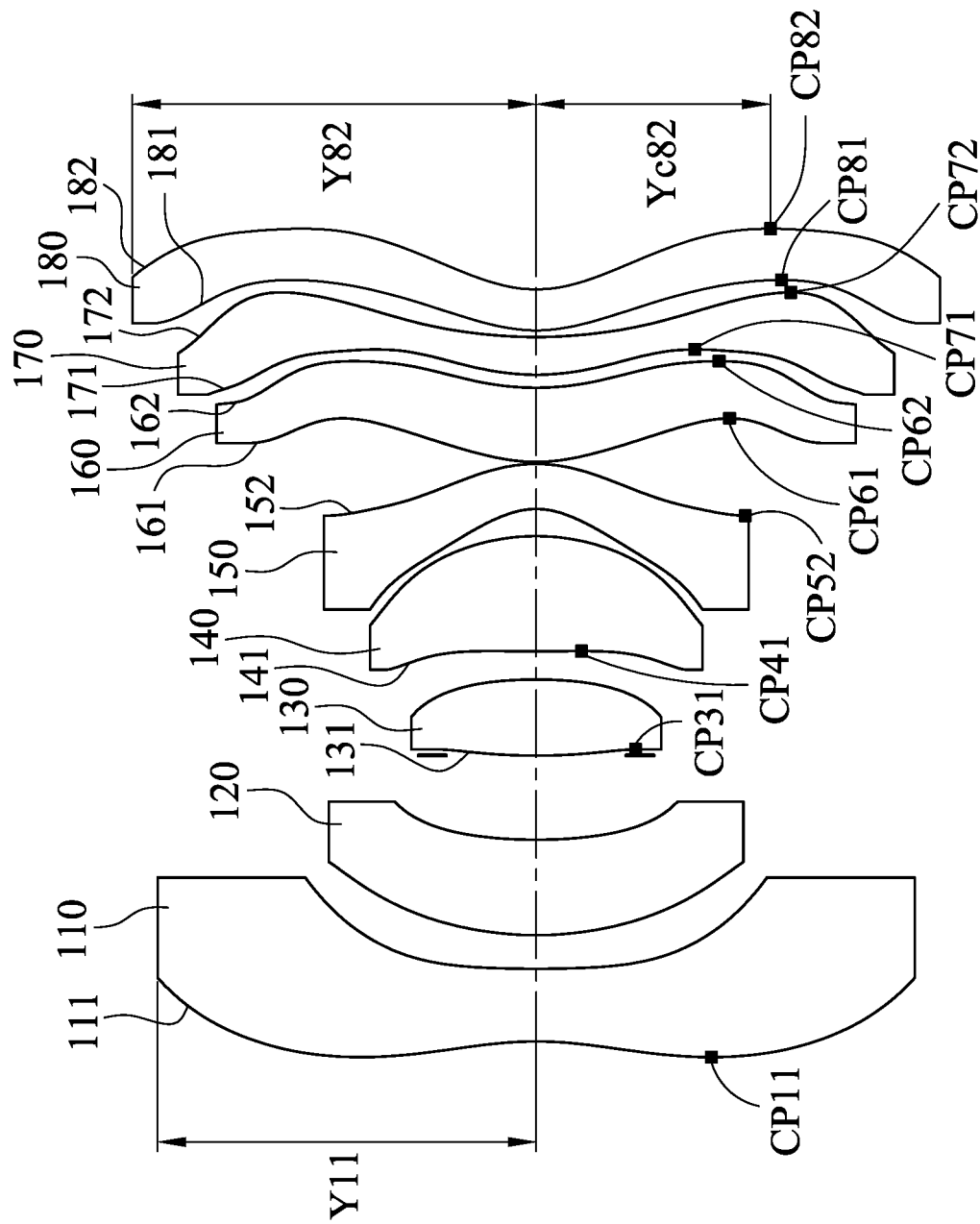
FIG. 22 shows a schematic view of critical points and parameters Y11, Y82, Yc82 according to the 1st embodiment of FIG. 1.

The first lens element 110 with negative refractive power has an object-side surface 111 being concave in a paraxial region thereof and an image-side surface 112 being concave in a paraxial region thereof. The first lens element 110 is made of a plastic material, and has the object-side surface 111 and the image-side surface 112 being both aspheric. Furthermore, FIG. 21 shows a schematic view of inflection points according to the 1st embodiment of FIG. 1, and FIG. 22 shows a schematic view of critical points and parameters Y11, Y82, Yc82 according to the 1st embodiment of FIG. 1. In FIG. 21 and FIG. 22, the object-side surface 111 of the first lens element 110 includes at least one inflection point IP11 and at least one critical point CP11, which is at least one convex critical point, in an off-axis region thereof.

The second lens element 120 with positive refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric. Furthermore, the object-side surface 121 of the second lens element 120 includes at least one inflection point IP21.

The third lens element 130 with positive refractive power has an object-side surface 131 being convex in a paraxial region thereof and an image-side surface 132 being convex in a paraxial region thereof. The third lens element 130 is made of a plastic material, and has the object-side surface 131 and the image-side surface 132 being both aspheric. Furthermore, the object-side surface 131 of the third lens element 130 includes at least one inflection point IP31 and at least one critical point CP31 in an off-axis region thereof.

The fourth lens element 140 with positive refractive power has an object-side surface 141 being convex in a paraxial region thereof and an image-side surface 142 being convex in a paraxial region thereof. The fourth lens element 140 is made of a plastic material, and has the object-side surface 141 and the image-side surface 142 being both aspheric. Furthermore, the object-side surface 141 of the fourth lens element 140 includes at least one inflection point IP41 and at least one critical point CP41 in an off-axis region thereof. The image-side surface 142 of the fourth lens element 140 includes at least one inflection point IP42.

The fifth lens element 150 with negative refractive power has an object-side surface 151 being concave in a paraxial region thereof and an image-side surface 152 being convex in a paraxial region thereof. The fifth lens element 150 is made of a plastic material, and has the object-side surface 151 and the image-side surface 152 being both aspheric. Furthermore, the image-side surface 152 of the fifth lens element 150 includes at least one inflection point IP52 and at least one critical point CP52 in an off-axis region thereof.

The sixth lens element 160 with positive refractive power has an object-side surface 161 being convex in a paraxial region thereof and an image-side surface 162 being concave in a paraxial region thereof. The sixth lens element 160 is made of a plastic material, and has the object-side surface 161 and the image-side surface 162 being both aspheric. Furthermore, the object-side surface 161 of the sixth lens element 160 includes at least one inflection point IP61 and at least one critical point CP61 in an off-axis region thereof. The image-side surface 162 of the sixth lens element 160 includes at least one inflection point IP62 and at least one critical point CP62 in an off-axis region thereof.

The seventh lens element 170 with positive refractive power has an object-side surface 171 being convex in a paraxial region thereof and an image-side surface 172 being concave in a paraxial region thereof. The seventh lens element 170 is made of a plastic material, and has the object-side surface 171 and the image-side surface 172 being both aspheric. Furthermore, the object-side surface 171 of the seventh lens element 170 includes at least one inflection point IP71 and at least one critical point CP71 in an off-axis region thereof. The image-side surface 172 of the seventh lens element 170 includes at least one inflection point IP72 and at least one critical point CP72 in an off-axis region thereof.

The eighth lens element 180 with negative refractive power has an object-side surface 181 being convex in a paraxial region thereof and an image-side surface 182 being concave in a paraxial region thereof. The eighth lens element 180 is made of a plastic material, and has the object-side surface 181 and the image-side surface 182 being both aspheric. Furthermore, the object-side surface 181 of the eighth lens element 180 includes at least one inflection point IP81 and at least one critical point CP81 in an off-axis region thereof. The image-side surface 182 of the eighth lens element 180 includes at least one inflection point IP82 and at least one critical point CP82 in an off-axis region thereof.

The filter 190 is made of a glass material and located between the eighth lens element 180 and the image surface 195, and will not affect the focal length of the photographing optical lens assembly.

The equation of the aspheric surface profiles of the aforementioned lens elements of the 1st embodiment is expressed as follows:

$$X(Y) = (Y^2/R)/(1+sqrt(1-(1+k)\times(Y/R)^2)) + \sum_i (Ai)\times(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing optical lens assembly according to the 1st embodiment, when a focal length of the photographing optical lens assembly is f, an f-number of the photographing optical lens assembly is Fno, and a half of a maximum field of view of the photographing optical lens assembly is HFOV, these parameters have the following values: f=1.32 mm; Fno=1.80; and HFOV=60.0 degrees.

In the photographing optical lens assembly according to the 1st embodiment, when a refractive index of the fourth lens element 140 is N4, the following condition is satisfied: N4=1.54.

In the photographing optical lens assembly according to the 1st embodiment, when an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, an Abbe number of the sixth lens element 160 is V6, an Abbe number of the seventh lens element 170 is V7, an Abbe number of the eighth lens element 180 is V8, and a minimum value among Abbe numbers of the lens elements of the photographing optical lens assembly is Vmin (i.e. a minimum value among V1, V2, V3, V4, V5, V6, V7 and V8, and Vmin=V5 in the 1st embodiment), the following condition is satisfied: Vmin=19.4.

In the photographing optical lens assembly according to the 1st embodiment, when a central thickness of the sixth lens element 160 is CT6, a central thickness of the seventh lens element 170 is CT7, and a central thickness of the eighth lens element 180 is CT8, the following condition is satisfied: (CT7+CT8)/CT6=1.06.

In the photographing optical lens assembly according to the 1st embodiment, when an axial distance between the first lens element 110 and the second lens element 120 is T12, and a central thickness of the second lens element 120 is CT2, the following condition is satisfied: T12/CT2=0.35.

In the photographing optical lens assembly according to the 1st embodiment, when the axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, an axial distance between the sixth lens element 160 and the seventh lens element 170 is T67, an axial distance between the seventh lens element 170 and the eighth lens element 180 is T78, and an average value of axial distances between every adjacent lens elements of the photographing optical lens assembly is Tavg, i.e. Tavg=(T12+T23+T34+T45+T56+T67+T78)/7, the following condition is satisfied: T56/Tavg=0.07.

In the photographing optical lens assembly according to the 1st embodiment, when an axial distance between the object-side surface 111 of the first lens element 110 and the image-side surface 182 of the eighth lens element 180 is TD, a central thickness of the third lens element 130 is CT3, a central thickness of the fourth lens element 140 is CT4, a central thickness of the fifth lens element 150 is CT5, the axial distance between the third lens element 130 and the fourth lens element 140 is T34, and the axial distance between the fourth lens element 140 and the fifth lens element 150 is T45, the following condition is satisfied: TD/(CT3+T34+CT4+T45+CT5)=2.58.

In the photographing optical lens assembly according to the 1st embodiment, when an axial distance between the aperture stop 100 and the image surface 195 is SL, an axial distance between the object-side surface 111 of the first lens element 110 and the image surface 195 is TL, an entrance pupil diameter of the photographing optical lens assembly is EPD, the focal length of the photographing optical lens assembly is f, and a maximum image height of the photographing optical lens assembly is ImgH, the following conditions are satisfied: SL/TL=0.68; TL=4.40 mm; TL/EPD=5.98; TL/f=3.32; TL/ImgH=2.00; f/EPD=1.80; ImgH=2.20 mm; and ImgH/f=1.66.

In the photographing optical lens assembly according to the 1st embodiment, when a curvature radius of the object-side surface 111 of the first lens element 110 is R1, a curvature radius of the image-side surface 112 of the first lens element 110 is R2, and the focal length of the photographing optical lens assembly is f, the following conditions are satisfied: (R1+R2)/(R1−R2)=−0.58; and f/|R1|=0.75.

In the photographing optical lens assembly according to the 1st embodiment, when the focal length of the photographing optical lens assembly is f, a focal length of the first lens element 110 is f1, a focal length of the second lens element 120 is f2, a focal length of the third lens element 130 is f3, a focal length of the fourth lens element 140 is f4, a focal length of the fifth lens element 150 is f5, a focal length of the sixth lens element 160 is f6, a focal length of the seventh lens element 170 is f7, a focal length of the eighth lens element 180 is f8, and a maximum value among |f/f1|, |f/f2|, |f/f3|, |f/f4|, |f/f5|, |f/f6|, |f/f7| and |f/f8| is P|max (|P|max=|f/f5| in the 1st embodiment), the following conditions are satisfied: f/f1=−0.51; f/f2=0.24; f/f3=0.58; f/f4=0.75; f/f5=−0.93; f/f6=0.43; f/f7=0.32; f/f8=−0.09; and |P|max=0.93.

In the photographing optical lens assembly according to the 1st embodiment, when the focal length of the photographing optical lens assembly is f, a composite focal length of the first lens element 110 and the second lens element 120 is f12, and a composite focal length of the first lens element 110, the second lens element 120 and the third lens element 130 is f123, the following conditions are satisfied: f/f12=−0.27; and f/f123=0.44.

Figure 23:
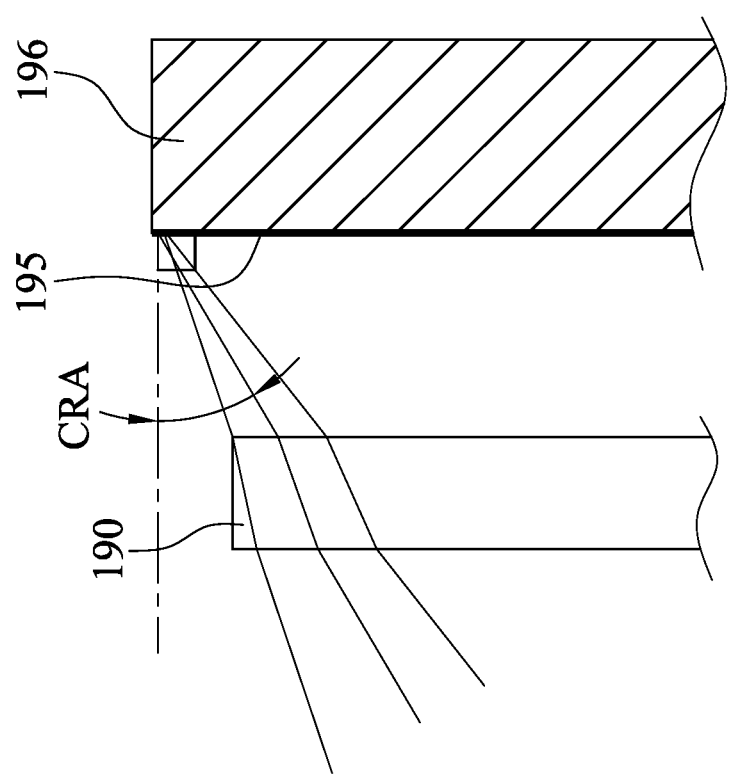
FIG. 23 shows a schematic view of the parameter CRA according to the 1st embodiment of FIG. 1.

FIG. 23 shows a schematic view of the parameter CRA according to the 1st embodiment of FIG. 1. In FIG. 23, when an incident angle of a chief ray at the maximum image height on the image surface 195 of the photographing optical lens assembly is CRA, the following condition is satisfied: CRA=30.5 degrees.

In FIG. 22, when a vertical distance between a maximum effective diameter position of the object-side surface 111 of the first lens element 110 and the optical axis is Y11, a vertical distance between a maximum effective diameter position of the image-side surface 182 of the eighth lens element 180 and the optical axis is Y82, the central thickness of the eighth lens element 180 is CT8, the focal length of the photographing optical lens assembly is f, a vertical distance between the critical point CP82 in the off-axis region on the image-side surface 182 of the eighth lens element 180 and the optical axis is Yc82, the following conditions are satisfied: Y11/Y82=0.94; Y82/CT8=9.84; Y82/f=1.51; and Yc82/Y82=0.58.

The detailed optical data of the 1st embodiment are shown in TABLE 1 and the aspheric surface data are shown in TABLE 2 below.

TABLE 1

1st Embodiment
f = 1.32 mm, Fno = 1.80, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.755 | ASP | 0.361 | Plastic | 1.525 | 58.0 | −2.61 |
| 2 | | 6.634 | ASP | 0.167 | | | | |
| 3 | Lens 2 | 1.574 | ASP | 0.475 | Plastic | 1.639 | 23.2 | 5.52 |
| 4 | | 2.506 | ASP | 0.419 | | | | |
| 5 | Ape. Stop | Plano | | −0.001 | | | | |
| 6 | Lens 3 | 2.775 | ASP | 0.379 | Plastic | 1.544 | 56.0 | 2.28 |
| 7 | | −2.130 | ASP | 0.140 | | | | |
| 8 | Lens 4 | 11.544 | ASP | 0.573 | Plastic | 1.544 | 56.0 | 1.78 |
| 9 | | −1.037 | ASP | 0.135 | | | | |
| 10 | Lens 5 | −0.365 | ASP | 0.224 | Plastic | 1.669 | 19.4 | −1.43 |
| 11 | | −0.734 | ASP | 0.010 | | | | |
| 12 | Lens 6 | 0.826 | ASP | 0.369 | Plastic | 1.544 | 56.0 | 3.05 |
| 13 | | 1.385 | ASP | 0.064 | | | | |
| 14 | Lens 7 | 1.099 | ASP | 0.188 | Plastic | 1.544 | 56.0 | 4.13 |
| 15 | | 2.022 | ASP | 0.033 | | | | |
| 16 | Lens 8 | 0.776 | ASP | 0.204 | Plastic | 1.525 | 58.0 | −14.34 |
| 17 | | 0.640 | ASP | 0.350 | | | | |
| 18 | Filter | Plano | | 0.110 | Glass | 1.517 | 64.2 | — |
| 19 | | Plano | | 0.199 | | | | |
| 20 | Image | Plano | | — | | | | |

Reference wavelength is 587.6 nm (d-line).

TABLE 2

Aspheric Coefficients

| Surface # | 1 | 2 | 3 | 4 | 6 | 7 | 8 | 9 |
|---|---|---|---|---|---|---|---|---|
| k= | −1.2701E+01 | 1.7624E+01 | −3.4765E+00 | −1.1010E+01 | 1.1722E+01 | −8.3672E+01 | 9.0000E+01 | −1.0398E+00 |
| A4= | 1.7908E−01 | 9.7363E−02 | −1.8447E−01 | 2.4205E−01 | −1.5448E−01 | −1.3364E+00 | −3.8069E−01 | 1.9961E−01 |
| A6= | −1.1544E−01 | 5.5692E−01 | 1.1999E+00 | 5.4685E−01 | 3.8042E−02 | 4.3992E+00 | −8.3906E−01 | −2.7223E+00 |
| A8= | 5.4239E−02 | −1.0787E+00 | −2.4861E+00 | −1.7353E+00 | −4.0552E+00 | −1.7979E+01 | 2.3329E+00 | 1.1085E+01 |
| A10= | −1.5813E−02 | 9.9959E−01 | 2.8668E+00 | 3.5037E+00 | 1.3043E+01 | 4.0853E+01 | −5.7435E+00 | −2.7227E+01 |
| A12= | 2.6119E−03 | −4.6322E−01 | −1.7181E+00 | −1.4665E+00 | −3.0901E+01 | −4.3794E+01 | 1.2202E+01 | 3.1613E+01 |
| A14= | −1.7990E−04 | 8.6843E−02 | 4.0162E−01 | 2.8336E−01 | | | −8.2589E+00 | 1.3260E+01 |

| Surface # | 10 | 11 | 12 | 13 | 14 | 15 | 16 | 17 |
|---|---|---|---|---|---|---|---|---|
| k= | −2.8846E+00 | −9.7583E−01 | −9.1911E+00 | −7.7191E−01 | −2.2984E+01 | −9.0000E+01 | −5.0670E+00 | −3.1464E+00 |
| A4= | −2.9211E−01 | 6.1633E−01 | 1.6590E−01 | 1.5556E−01 | 8.6346E−01 | 3.2018E−01 | −1.9054E−01 | −2.0561E−01 |
| A6= | 1.2726E+00 | −1.9001E−01 | −5.9776E−01 | −1.9203E+00 | −3.1760E+00 | −2.7506E−01 | 1.5336E−01 | 5.7775E−02 |
| A8= | 2.7402E+00 | 1.2288E+00 | 1.0347E+00 | 3.3479E+00 | 4.4589E+00 | −4.9454E−02 | −1.1769E−01 | −1.7788E−02 |
| A10= | −2.1871E+01 | −3.6564E+00 | 1.1771E+00 | −2.8230E+00 | −3.2367E+00 | 1.9316E−01 | 7.3640E−02 | 2.0668E−02 |
| A12= | 4.3372E+01 | 3.9880E+00 | 7.0834E−01 | 1.2494E+00 | 1.2724E+00 | −1.1664E−01 | −3.0249E−02 | −1.0568E−02 |
| A14= | −4.0677E+01 | −1.8660E+00 | −2.0439E−01 | −2.7728E−01 | −2.5653E−01 | 2.9349E−02 | 6.5013E−03 | 2.2048E−03 |
| A16= | 1.5652E+01 | 3.1230E−01 | 2.2453E−02 | 2.4303E−02 | 2.0767E−02 | −2.7058E−03 | −5.4176E−04 | −1.6456E−04 |

In TABLE 1, the curvature radius, the thickness and the focal length are shown in millimeters (mm). Surface numbers 0-20 represent the surfaces sequentially arranged from the object-side to the image-side along the optical axis. In TABLE 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as TABLE 1 and TABLE 2 of the 1st embodiment. Therefore, an explanation in this regard will not be provided again.

In the photographing optical lens assembly according to the 1st embodiment, eight lens elements (110, 120, 130, 140, 150, 160, 170 and 180) are made of plastic materials. At least one surface of the object-side surface and the image-side surface of each lens element of the aforementioned eight lens elements is aspheric and includes at least one inflection point. The Abbe number V5 of the fifth lens element 150 is the minimum value Vmin among Abbe numbers of the lens elements of the photographing optical lens assembly.

Specifically, numbers of inflection points and critical points in the off-axis regions of the object-side surfaces and the image-side surfaces of the eight lens elements in the 1st embodiment are listed below.

1st Embodiment-Numbers of Inflection Points

|  | Lens 1 | Lens 2 | Lens 3 | Lens 4 | Lens 5 | Lens 6 | Lens 7 | Lens 8 |
|---|---|---|---|---|---|---|---|---|
| Object-side surface | 1 | 1 | 1 | 2 | 0 | 3 | 3 | 2 |
| Image-side surface | 0 | 0 | 0 | 1 | 1 | 3 | 3 | 1 |

1st Embodiment-Numbers of Critical Points

|  | Lens 1 | Lens 2 | Lens 3 | Lens 4 | Lens 5 | Lens 6 | Lens 7 | Lens 8 |
|---|---|---|---|---|---|---|---|---|
| Object-side surface | 1 | 0 | 1 | 1 | 0 | 1 | 1 | 1 |
| Image-side surface | 0 | 0 | 0 | 0 | 1 | 1 | 1 | 1 |

2ND EMBODIMENT

Figure 3:
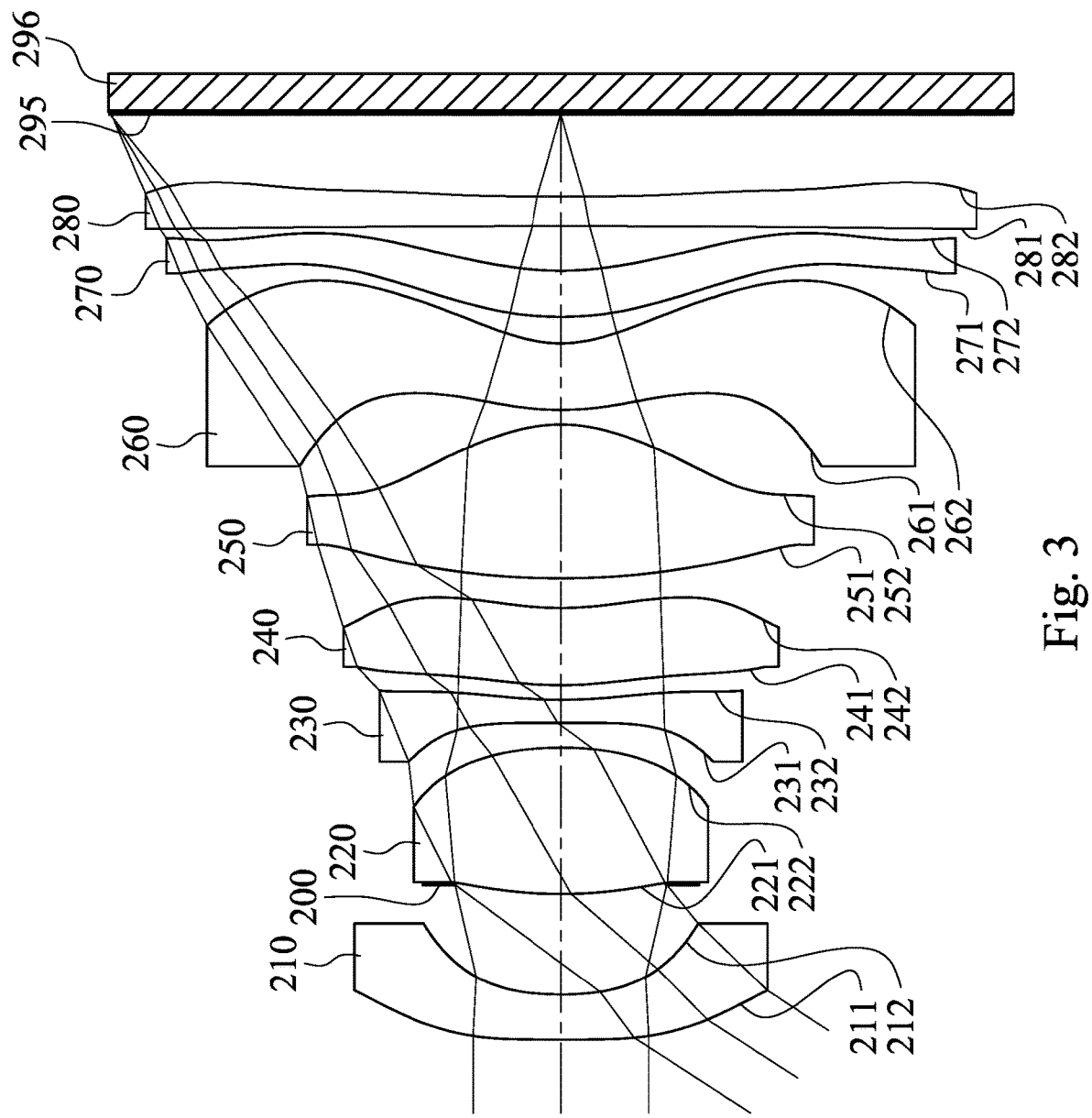
FIG. 3 is a schematic view of an imaging apparatus according to the 2nd embodiment of the present disclosure.
Figure 4:
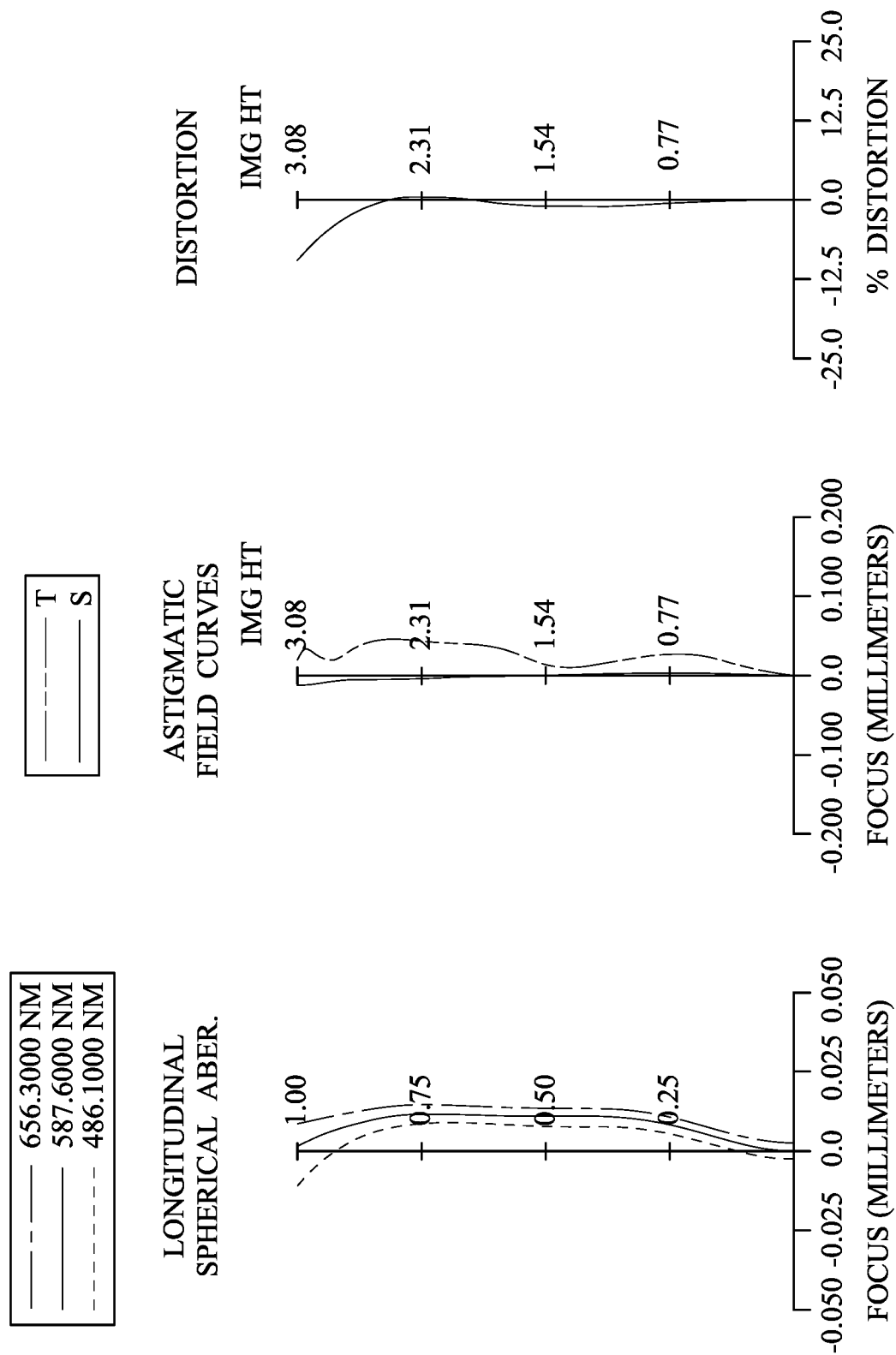
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the imaging apparatus according to the 2nd embodiment. In FIG. 3, the imaging apparatus includes a photographing optical lens assembly (its reference numeral is omitted) and an image sensor 296. The photographing optical lens assembly includes, in order from an object side to an image side, a first lens element 210, an aperture stop 200, a second lens element 220, a third lens element 230, a fourth lens element 240, a fifth lens element 250, a sixth lens element 260, a seventh lens element 270, an eighth lens element 280 and an image surface 295. The image sensor 296 is disposed on the image surface 295 of the photographing optical lens assembly. The photographing optical lens assembly includes eight lens elements (210, 220, 230, 240, 250, 260, 270 and 280) without additional one or more lens elements inserted between the first lens element 210 and the eighth lens element 280.

The first lens element 210 with negative refractive power has an object-side surface 211 being convex in a paraxial region thereof and an image-side surface 212 being concave in a paraxial region thereof. The first lens element 210 is made of a glass material, and has the object-side surface 211 and the image-side surface 212 being both aspheric. Furthermore, the object-side surface 211 of the first lens element 210 includes at least one inflection point.

The second lens element 220 with positive refractive power has an object-side surface 221 being convex in a paraxial region thereof and an image-side surface 222 being convex in a paraxial region thereof. The second lens element 220 is made of a plastic material, and has the object-side surface 221 and the image-side surface 222 being both aspheric. Furthermore, the object-side surface 221 of the second lens element 220 includes at least one inflection point.

The third lens element 230 with negative refractive power has an object-side surface 231 being concave in a paraxial region thereof and an image-side surface 232 being concave in a paraxial region thereof. The third lens element 230 is made of a plastic material, and has the object-side surface 231 and the image-side surface 232 being both aspheric. Furthermore, the object-side surface 231 of the third lens element 230 includes at least one inflection point. The image-side surface 232 of the third lens element 230 includes at least one inflection point and at least one critical point in an off-axis region thereof.

The fourth lens element 240 with negative refractive power has an object-side surface 241 being convex in a paraxial region thereof and an image-side surface 242 being concave in a paraxial region thereof. The fourth lens element 240 is made of a plastic material, and has the object-side surface 241 and the image-side surface 242 being both aspheric. Furthermore, the object-side surface 241 of the fourth lens element 240 includes at least one inflection point. The image-side surface 242 of the fourth lens element 240 includes at least one inflection point and at least one critical point in an off-axis region thereof.

The fifth lens element 250 with positive refractive power has an object-side surface 251 being convex in a paraxial region thereof and an image-side surface 252 being convex in a paraxial region thereof. The fifth lens element 250 is made of a plastic material, and has the object-side surface 251 and the image-side surface 252 being both aspheric. Furthermore, the object-side surface 251 of the fifth lens element 250 includes at least one inflection point and at least one critical point in an off-axis region thereof. The image-side surface 252 of the fifth lens element 250 includes at least one inflection point.

The sixth lens element 260 with negative refractive power has an object-side surface 261 being convex in a paraxial region thereof and an image-side surface 262 being concave in a paraxial region thereof. The sixth lens element 260 is made of a plastic material, and has the object-side surface 261 and the image-side surface 262 being both aspheric. Furthermore, the object-side surface 261 of the sixth lens element 260 includes at least one inflection point and at least one critical point in an off-axis region thereof. The image-side surface 262 of the sixth lens element 260 includes at least one inflection point and at least one critical point in an off-axis region thereof.

The seventh lens element 270 with negative refractive power has an object-side surface 271 being convex in a paraxial region thereof and an image-side surface 272 being concave in a paraxial region thereof. The seventh lens element 270 is made of a plastic material, and has the object-side surface 271 and the image-side surface 272 being both aspheric. Furthermore, the object-side surface 271 of the seventh lens element 270 includes at least one inflection point and at least one critical point in an off-axis region thereof. The image-side surface 272 of the seventh lens element 270 includes at least one inflection point and at least one critical point in an off-axis region thereof.

The eighth lens element 280 with negative refractive power has an object-side surface 281 being concave in a paraxial region thereof and an image-side surface 282 being concave in a paraxial region thereof. The eighth lens element 280 is made of a plastic material, and has the object-side surface 281 being spherical and the image-side surface 282 being aspheric. Furthermore, the image-side surface 282 of the eighth lens element 280 includes at least one inflection point and at least one critical point in an off-axis region thereof.

The detailed optical data of the 2nd embodiment are shown in TABLE 3 and the aspheric surface data are shown in TABLE 4 below.

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from TABLE 3 and TABLE 4 as the following values and satisfy the following conditions:

TABLE 3

2nd Embodiment
f = 2.21 mm, Fno = 1.84, HFOV = 57.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 198.550 | ASP | 0.308 | Glass | 1.518 | 63.5 | −4.02 |
| 2 | | 2.057 | ASP | 0.751 | | | | |
| 3 | Ape. Stop | Plano | | −0.063 | | | | |
| 4 | Lens 2 | 3.167 | ASP | 0.997 | Plastic | 1.544 | 56.0 | 2.64 |
| 5 | | −2.339 | ASP | 0.169 | | | | |
| 6 | Lens 3 | −200.000 | ASP | 0.162 | Plastic | 1.614 | 26.0 | −5.40 |
| 7 | | 3.374 | ASP | 0.099 | | | | |
| 8 | Lens 4 | 2.278 | ASP | 0.526 | Plastic | 1.544 | 56.0 | −110.15 |
| 9 | | 2.016 | ASP | 0.202 | | | | |
| 10 | Lens 5 | 5.429 | ASP | 1.051 | Plastic | 1.544 | 56.0 | 1.80 |
| 11 | | −1.113 | ASP | 0.100 | | | | |
| 12 | Lens 6 | 1.862 | ASP | 0.455 | Plastic | 1.680 | 18.4 | −3.40 |
| 13 | | 0.930 | ASP | 0.179 | | | | |
| 14 | Lens 7 | 2.167 | ASP | 0.314 | Plastic | 1.544 | 56.0 | −110.40 |
| 15 | | 1.985 | ASP | 0.304 | | | | |
| 16 | Lens 8 | −200.000 | | 0.202 | Plastic | 1.544 | 56.0 | −183.78 |
| 17 | | 200.000 | ASP | 0.576 | | | | |
| 18 | Image | Plano | | — | | | | |

Reference wavelength is 587.6 nm (d-line).

TABLE 4

Aspheric Coefficients

| Surface # | 1 | 2 | 4 | 5 | 6 | 7 | 8 | 9 |
|---|---|---|---|---|---|---|---|---|
| k= | −3.3817E+00 | −2.2546E+01 | 3.6586E+00 | 3.1083E+00 | 9.0000E+01 | −1.0000E+00 | −3.2634E+01 | −1.7402E+01 |
| A4= | 2.5358E−01 | 6.8983E−01 | −9.4666E−0 | −1.0109E−01 | −5.6068E−02 | −8.5585E−02 | −1.0473E−01 | −1.0669E−01 |
| A6= | −2.2741E−01 | −7.4658E−01 | −3.5426E−04 | −2.7290E−02 | −6.0580E−01 | −1.3182E−01 | 1.7615E−01 | 2.9689E−02 |
| A8= | 1.8841E−01 | 1.0686E+00 | −1.7383E−01 | 1.7488E−01 | 1.1044E+00 | 2.5613E−01 | −2.6127E−01 | −8.1464E−03 |
| A10= | −1.1458E−01 | −8.3074E−01 | 3.2511E−01 | −3.5417E−01 | −1.0876E+00 | −2.0083E−011 | 2.4616E−01 | −1.8002E−02 |
| A12= | 4.1956E−02 | 3.3590E−01 | −3.9214E−01 | 3.0770E−01 | 4.6624E−01 | 8.2154E−02 | −1.2833E−01 | 1.3836E−02 |
| A14= | −8.4305E−03 | −6.0503E−02 | 6.7974E−02 | −1.1307E−01 | −4.5302E−02 | −1.3585E−02 | 3.4836E−02 | −2.9673E−03 |
| A16= | 7.2362E−04 | | | | | | −3.8741E−03 | 1.7187E−04 |

| Surface # | 10 | 11 | 12 | 13 | 14 | 15 | 17 |
|---|---|---|---|---|---|---|---|
| k= | 3.7251E+00 | −1.6220E+00 | −1.1502E+00 | −1.0371E+00 | −8.0166E+00 | −1.8781E+01 | −9.0000E+01 |
| A4= | 1.9885E−02 | 1.4422E−01 | −1.6823E−01 | −3.9620E−01 | 8.4549E−02 | 3.6949E−02 | 6.3729E−02 |
| A6= | −6.3285E−02 | −2.0207E−01 | −3.6261E−02 | 2.4864E−01 | −1.1196E−01 | −3.2997E−02 | −6.1975E−02 |
| A8= | 7.1849E−02 | 2.4993E−01 | 1.1129E−01 | −1.1408E−01 | 7.0612E−02 | 1.0318E−02 | 2.7116E−02 |
| A10= | −4.3604E−02 | −2.2508E−01 | −8.3144E−02 | 3.7468E−02 | −2.8178E−02 | −1.9984E−03 | −6.2946E−03 |
| A12= | 1.5264E−02 | 1.5802E−01 | 3.1506E−02 | −9.3946E−03 | 7.1313E−03 | 2.6279E−04 | 8.0891E−04 |
| A14= | −2.9237E−03 | −7.6018E−02 | −6.9221E−03 | 1.8012E−03 | −1.1288E−03 | −2.0197E−05 | −6.4746E−05 |
| A16= | 2.2321E−04 | 2.2363E−02 | 8.9863E−04 | −2.4071E−04 | 1.0831E−04 | 6.4775E−07 | 1.5265E−06 |
| A18= | | −3.6002E−03 | −6.3069E−05 | 1.9072E−05 | −5.7790E−06 | | |
| A20= | | 2.4311E−04 | 1.7970E−06 | −6.5673E−07 | 1.3211E−07 | | |

| 2nd Embodiment | | | |
|---|---|---|---|
| f [mm] | 2.21 | f/f3 | −0.41 |
| Fno | 1.84 | f/f4 | −0.02 |
| HFOV [deg.] | 57.0 | f/f5 | 1.23 |
| N4 | 1.54 | f/f6 | −0.65 |
| Vmin | 18.4 | f/f7 | −0.02 |
| (CT7 + CT8)/CT6 | 1.13 | f/f8 | −0.01 |
| SL/TL | 0.83 | f/f12 | 0.51 |
| T12/CT2 | 0.69 | f/f123 | 0.05 |
| T56/Tavg | 0.40 | f/|R1| | 0.01 |
| TD/(CT3 + T34 + CT4 + T45 + CT5) | 2.82 | |P|max | 1.23 |
| TL [mm] | 6.33 | CRA [deg.] | 30.9 |
| TL/EPD | 5.28 | ImgH [mm] | 3.08 |
| TL/f | 2.87 | ImgH/f | 1.40 |
| TL/ImgH | 2.06 | Y11/Y82 | 0.50 |
| (R1 + R2)/(R1 − R2) | 1.02 | Y82/CT8 | 14.04 |
| f/EPD | 1.84 | Y82/f | 1.28 |
| f/f1 | −0.55 | Yc82/Y82 | 0.84 |
| f/f2 | 0.84 | | |

In the photographing optical lens assembly according to the 2nd embodiment, seven lens elements (220, 230, 240, 250, 260, 270 and 280) are made of plastic materials. At least one surface of the object-side surface and the image-side surface of each lens element of the aforementioned seven lens elements is aspheric and includes at least one inflection point. The Abbe number of the sixth lens element 260 is the minimum value Vmin among Abbe numbers of the lens elements of the photographing optical lens assembly.

Specifically, numbers of inflection points and critical points in the off-axis regions of the object-side surfaces and the image-side surfaces of the eight lens elements in the 2nd embodiment are listed below.

| 2nd Embodiment-Numbers of Inflection Points | | | | | | | | |
|---|---|---|---|---|---|---|---|---|
| | Lens 1 | Lens 2 | Lens 3 | Lens 4 | Lens 5 | Lens 6 | Lens 7 | Lens 8 |
| Object-side surface | 1 | 1 | 1 | 2 | 1 | 1 | 3 | 0 |
| Image-side surface | 0 | 0 | 2 | 2 | 2 | 1 | 3 | 3 |

| 2nd Embodiment-Numbers of Critical Points | | | | | | | | |
|---|---|---|---|---|---|---|---|---|
| | Lens 1 | Lens 2 | Lens 3 | Lens 4 | Lens 5 | Lens 6 | Lens 7 | Lens 8 |
| Object-side surface | 0 | 0 | 0 | 0 | 1 | 1 | 1 | 0 |
| Image-side surface | 0 | 0 | 2 | 1 | 0 | 1 | 2 | 1 |

3RD EMBODIMENT

Figure 5:
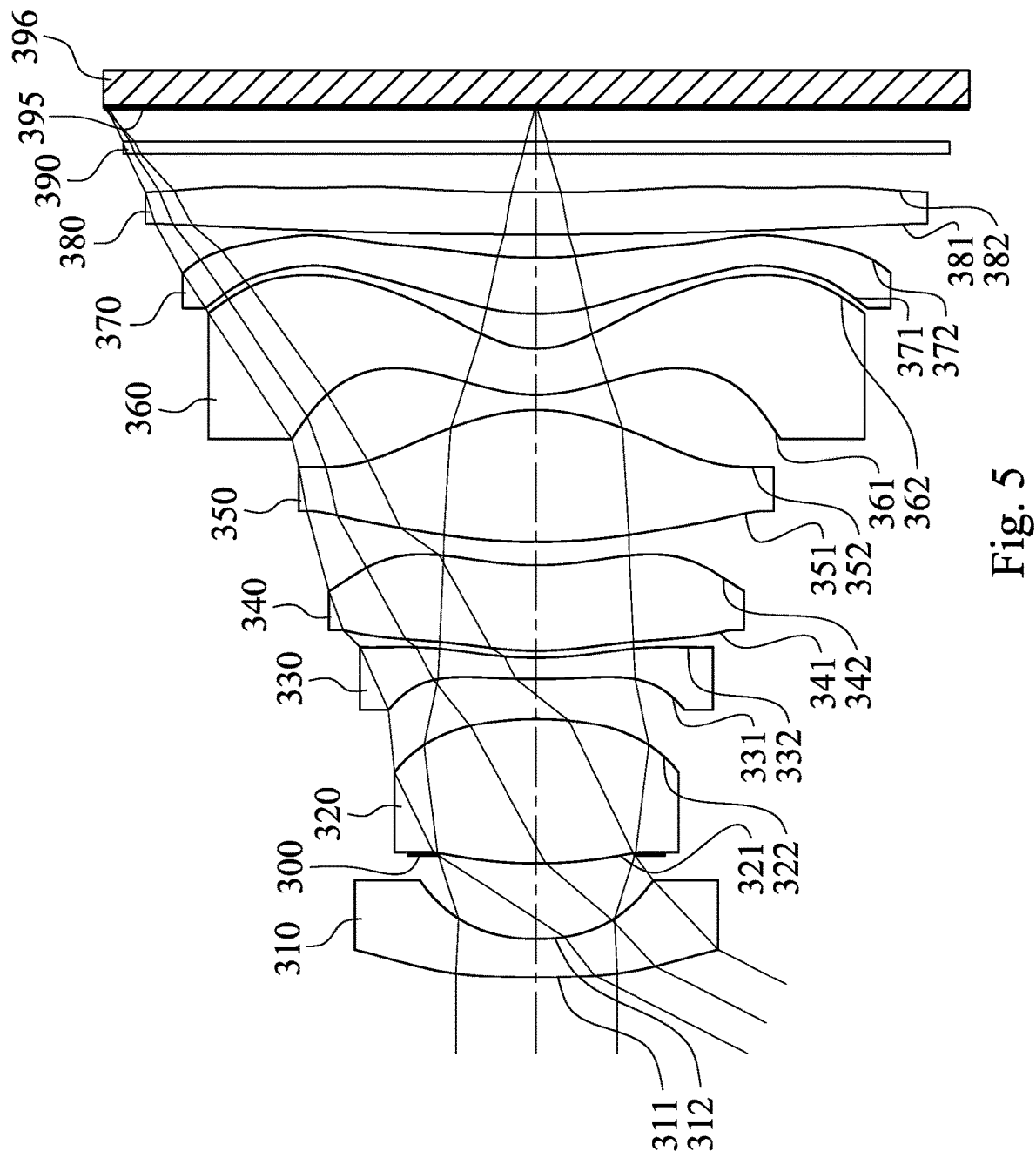
FIG. 5 is a schematic view of an imaging apparatus according to the 3rd embodiment of the present disclosure.
Figure 6:
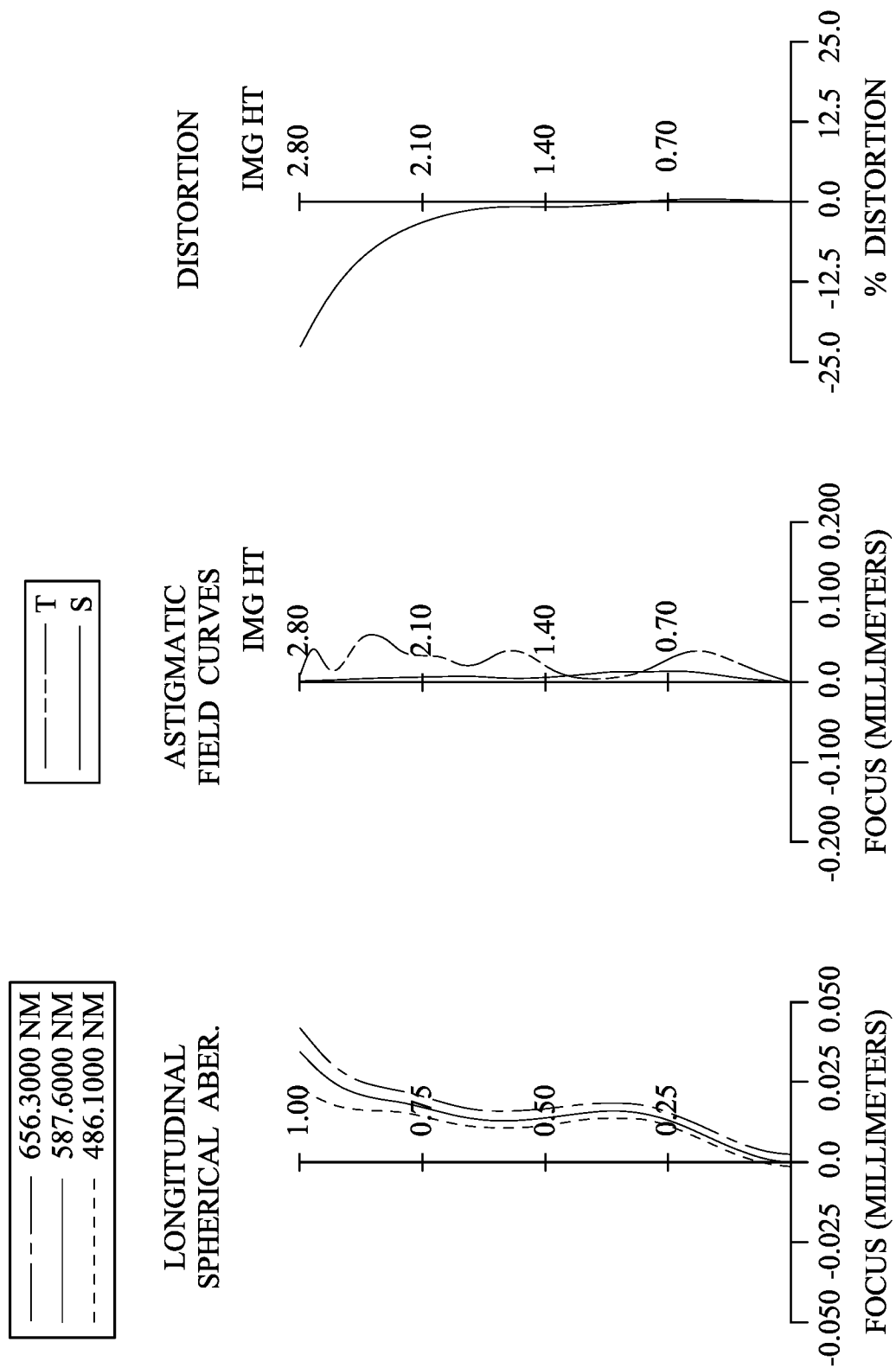
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes a photographing optical lens assembly (its reference numeral is omitted) and an image sensor 396. The photographing optical lens assembly includes, in order from an object side to an image side, a first lens element 310, an aperture stop 300, a second lens element 320, a third lens element 330, a fourth lens element 340, a fifth lens element 350, a sixth lens element 360, a seventh lens element 370, an eighth lens element 380, a filter 390 and an image surface 395. The image sensor 396 is disposed on the image surface 395 of the photographing optical lens assembly. The photographing optical lens assembly includes eight lens elements (310, 320, 330, 340, 350, 360, 370 and 380) without additional one or more lens elements inserted between the first lens element 310 and the eighth lens element 380.

The first lens element 310 with negative refractive power has an object-side surface 311 being convex in a paraxial region thereof and an image-side surface 312 being concave in a paraxial region thereof. The first lens element 310 is made of a plastic material, and has the object-side surface 311 and the image-side surface 312 being both aspheric. Furthermore, the object-side surface 311 of the first lens element 310 includes at least one inflection point.

The second lens element 320 with positive refractive power has an object-side surface 321 being convex in a paraxial region thereof and an image-side surface 322 being convex in a paraxial region thereof. The second lens element 320 is made of a glass material, and has the object-side surface 321 and the image-side surface 322 being both aspheric. Furthermore, the object-side surface 321 of the second lens element 320 includes at least one inflection point.

The third lens element 330 with negative refractive power has an object-side surface 331 being convex in a paraxial region thereof and an image-side surface 332 being concave in a paraxial region thereof. The third lens element 330 is made of a plastic material, and has the object-side surface 331 and the image-side surface 332 being both aspheric. Furthermore, the object-side surface 331 of the third lens element 330 includes at least one inflection point and at least one critical point in an off-axis region thereof. The image-side surface 332 of the third lens element 330 includes at least one inflection point and at least one critical point in an off-axis region thereof.

The fourth lens element 340 with positive refractive power has an object-side surface 341 being convex in a paraxial region thereof and an image-side surface 342 being concave in a paraxial region thereof. The fourth lens element 340 is made of a plastic material, and has the object-side surface 341 and the image-side surface 342 being both aspheric. Furthermore, the object-side surface 341 of the fourth lens element 340 includes at least one inflection point. The image-side surface 342 of the fourth lens element 340 includes at least one inflection point and at least one critical point in an off-axis region thereof.

The fifth lens element 350 with positive refractive power has an object-side surface 351 being convex in a paraxial region thereof and an image-side surface 352 being convex in a paraxial region thereof. The fifth lens element 350 is made of a plastic material, and has the object-side surface 351 and the image-side surface 352 being both aspheric. Furthermore, the object-side surface 351 of the fifth lens element 350 includes at least one inflection point and at least one critical point in an off-axis region thereof. The image-side surface 352 of the fifth lens element 350 includes at least one inflection point and at least one critical point in an off-axis region thereof.

The sixth lens element 360 with negative refractive power has an object-side surface 361 being convex in a paraxial region thereof and an image-side surface 362 being concave in a paraxial region thereof. The sixth lens element 360 is made of a plastic material, and has the object-side surface 361 and the image-side surface 362 being both aspheric. Furthermore, the object-side surface 361 of the sixth lens element 360 includes at least one inflection point and at least one critical point in an off-axis region thereof. The image-side surface 362 of the sixth lens element 360 includes at least one inflection point and at least one critical point in an off-axis region thereof.

The seventh lens element 370 with positive refractive power has an object-side surface 371 being convex in a paraxial region thereof and an image-side surface 372 being concave in a paraxial region thereof. The seventh lens element 370 is made of a plastic material, and has the object-side surface 371 and the image-side surface 372 being both aspheric. Furthermore, the object-side surface 371 of the seventh lens element 370 includes at least one inflection point and at least one critical point in an off-axis region thereof. The image-side surface 372 of the seventh lens element 370 includes at least one inflection point and at least one critical point in an off-axis region thereof.

The eighth lens element 380 with positive refractive power has an object-side surface 381 being convex in a paraxial region thereof and an image-side surface 382 being concave in a paraxial region thereof. The eighth lens element 380 is made of a plastic material, and has the object-side surface 381 and the image-side surface 382 being both aspheric. Furthermore, the image-side surface 382 of the eighth lens element 380 includes at least one inflection point and at least one critical point in an off-axis region thereof.

The filter 390 is made of a glass material and located between the eighth lens element 380 and the image surface 395, and will not affect the focal length of the photographing optical lens assembly.

The detailed optical data of the 3rd embodiment are shown in TABLE 5 and the aspheric surface data are shown in TABLE 6 below.

TABLE 5

3rd Embodiment
f = 1.85 mm, Fno = 1.75, HFOV = 62.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 14.529 | ASP | 0.251 | Plastic | 1.545 | 56.1 | −2.59 |
| 2 | | 1.278 | ASP | 0.546 | | | | |
| 3 | Ape. Stop | Plano | | −0.052 | | | | |
| 4 | Lens 2 | 2.934 | ASP | 0.946 | Glass | 1.610 | 57.9 | 2.28 |
| 5 | | −2.325 | ASP | 0.261 | | | | |
| 6 | Lens 3 | 5.926 | ASP | 0.138 | Plastic | 1.639 | 23.5 | −0.48 |
| 7 | | 2.415 | ASP | 0.046 | | | | |
| 8 | Lens 4 | 1.869 | ASP | 0.558 | Plastic | 1.544 | 56.0 | 75.04 |
| 9 | | 1.753 | ASP | 0.154 | | | | |
| 10 | Lens 5 | 4.311 | ASP | 0.863 | Plastic | 1.544 | 56.0 | 1.77 |
| 11 | | −1.150 | ASP | 0.100 | | | | |
| 12 | Lens 6 | 1.079 | ASP | 0.300 | Plastic | 1.688 | 18.7 | −2.67 |
| 13 | | 0.603 | ASP | 0.228 | | | | |
| 14 | Lens 7 | 1.511 | ASP | 0.367 | Plastic | 1.544 | 56.0 | 5.13 |
| 15 | | 3.016 | ASP | 0.151 | | | | |
| 16 | Lens 8 | 40.268 | ASP | 0.278 | Plastic | 1.544 | 56.0 | 92.52 |
| 17 | | 200.839 | ASP | 0.250 | | | | |
| 18 | Filter | Plano | | 0.080 | Glass | 1.517 | 64.2 | — |
| 19 | | Plano | | 0.223 | | | | |
| 20 | Image | Plano | | — | | | | |

Reference wavelength is 587.6 nm (d-line).

TABLE 6

Aspheric Coefficients

| Surface # | 1 | 2 | 4 | 5 | 6 | 7 | 8 | 9 |
|---|---|---|---|---|---|---|---|---|
| k= | −2.1480E+01 | −9.0518E+00 | 2.6994E+00 | 8.4943E−01 | 2.5057E+01 | −1.0000E+00 | −2.8438E+01 | −1.3092E+01 |
| A4= | 2.9122E−01 | 9.9644E−01 | −1.0115E−02 | −1.5472E−01 | 6.4127E−02 | 1.2784E−02 | −6.3377E−02 | −1.3342E−01 |
| A6= | −3.9749E−01 | −1.2560E+00 | 1.1088E−02 | −1.0299E−01 | −1.3075E+00 | −7.7902E−01 | −1.2064E−01 | 2.7583E−02 |
| A8= | 3.8056E−01 | 2.0464E+00 | −3.7912E−01 | 3.7390E−01 | 2.2082E+00 | 1.4141E+00 | 2.5126E−01 | −8.4024E−02 |
| A10= | −2.6901E−01 | −1.9002E+00 | 8.5051E−01 | −8.3933E−01 | −2.0227E+00 | −1.2551E+00 | −9.6077E−02 | 5.3845E−02 |
| A12= | 1.1971E−01 | 9.5837E−01 | −1.1188E+00 | 8.7790E−01 | 6.0539E−01 | 5.8011E−01 | −6.3727E−02 | −8.5831E−03 |
| A14= | −2.9104E−02 | −2.0687E−01 | 2.3467E−01 | −3.9033E−01 | 1.0239E−01 | −1.0958E−01 | 6.0129E−02 | |
| A16= | 3.0227E−03 | | | | | | | −1.3381E−02 |

TABLE 6-continued

Aspheric Coefficients

| Surface # | 10 | 11 | 12 | 13 | 14 | 15 | 16 | 17 |
|---|---|---|---|---|---|---|---|---|
| k= | −1.5023E+00 | −1.6513E+00 | −1.5711E+00 | −1.0764E+00 | −5.4001E+00 | −4.5285E+01 | −9.0000E+01 | −9.0000E+01 |
| A4= | 4.5136E−02 | 2.3724E−01 | −3.1706E−01 | −7.6967E−01 | 3.1471E−01 | 1.9069E−01 | | 1.4828E−01 |
| A6= | −9.7941E−02 | −3.9449E−01 | 4.7918E−02 | 6.0699E−01 | −1.0631E+00 | −6.7796E−01 | | −2.0836E−01 |
| A8= | 6.1445E−02 | 4.6595E−01 | 5.7278E−02 | −3.3553E−01 | 1.4026E+00 | 9.1909E−01 | | 1.2540E−01 |
| A10= | −1.3520E−02 | −3.3603E−01 | −4.9801E−02 | 1.3176E−01 | −1.0028E+00 | −6.4480E−01 | | −4.0898E−02 |
| A12= | 2.6971E−04 | 2.0823E−01 | 1.5149E−02 | −3.9043E−02 | 4.2449E−01 | 2.6141E−01 | | 7.7850E−03 |
| A14= | | −1.1063E−01 | −1.8985E−03 | 9.0856E−03 | −1.0959E−01 | −6.3907E−02 | | −8.6846E−04 |
| A16= | | 4.0910E−02 | 8.0788E−05 | −1.5694E−03 | 1.6957E−02 | 9.3282E−03 | | 5.2846E−05 |
| A18= | | −8.5961E−03 | | 1.6951E−04 | −1.4455E−03 | −7.5059E−04 | | −1.3593E−05 |
| A20= | | 7.5875E−04 | | −8.1663E−06 | 5.2214E−05 | 2.5670E−05 | | |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again. Furthermore, three values of parameter Yc82/Y82 in the following table are respectively corresponding to three critical points located from the axial vertex to the maximum effective diameter position in the off-axis region of the image-side surface 382 of the eighth lens element 380.

Moreover, these parameters can be calculated from TABLE 5 and TABLE 6 as the following values and satisfy the following conditions:

| 3rd Embodiment | | | |
|---|---|---|---|
| f [mm] | 1.85 | f/f3 | −0.28 |
| Fno | 1.75 | f/f4 | 0.02 |
| HFOV [deg.] | 62.9 | f/f5 | 1.04 |
| N4 | 1.54 | f/f6 | −0.69 |
| Vmin | 18.7 | f/f7 | 0.36 |
| (CT7 + CT8)/CT6 | 2.15 | f/f8 | 0.02 |
| SL/TL | 0.86 | f/f12 | 0.36 |
| T12/CT2 | 0.52 | f/f123 | 0.02 |
| T56/Tavg | 0.49 | f/|R1| | 0.13 |
| TD/(CT3 + T34 + CT4 + T45 + CT5) | 2.92 | |P|max | 1.04 |
| TL [mm] | 5.69 | CRA [deg.] | 33.2 |
| TL/EPD | 5.39 | ImgH [mm] | 2.80 |
| TL/f | 3.08 | ImgH/f | 1.52 |
| TL/ImgH | 2.03 | Y11/Y82 | 0.46 |
| (R1 + R2)/(R1 − R2) | 1.19 | Y82/CT8 | 9.19 |
| f/EPD | 1.75 | Y82/f | 1.38 |
| f/f1 | −0.71 | Yc82/Y82 | 0.43, |
| f/f2 | 0.81 | | 0.60, |
| | | | 0.76 |

In the photographing optical lens assembly according to the 3rd embodiment, seven lens elements (310, 330, 340, 350, 360, 370 and 380) are made of plastic materials. At least one surface of the object-side surface and the image-side surface of each lens element of the aforementioned seven lens elements is aspheric and includes at least one inflection point. The Abbe number of the sixth lens element 360 is the minimum value Vmin among Abbe numbers of the lens elements of the photographing optical lens assembly.

Specifically, numbers of inflection points and critical points in the off-axis regions of the object-side surfaces and the image-side surfaces of the eight lens elements in the 3rd embodiment are listed below.

| 3rd Embodiment—Numbers of Inflection Points | | | | | | | | |
|---|---|---|---|---|---|---|---|---|
| | Lens 1 | Lens 2 | Lens 3 | Lens 4 | Lens 5 | Lens 6 | Lens 7 | Lens 8 |
| Object-side surface | 1 | 1 | 1 | 3 | 1 | 1 | 3 | 0 |
| Image-side surface | 0 | 0 | 2 | 2 | 2 | 1 | 5 | 4 |

| 3rd Embodiment—Numbers of Critical Points | | | | | | | | |
|---|---|---|---|---|---|---|---|---|
| | Lens 1 | Lens 2 | Lens 3 | Lens 4 | Lens 5 | Lens 6 | Lens 7 | Lens 8 |
| Object-side surface | 0 | 0 | 1 | 0 | 1 | 1 | 1 | 0 |
| Image-side surface | 0 | 0 | 2 | 1 | 2 | 1 | 1 | 3 |

4TH EMBODIMENT

Figure 7:
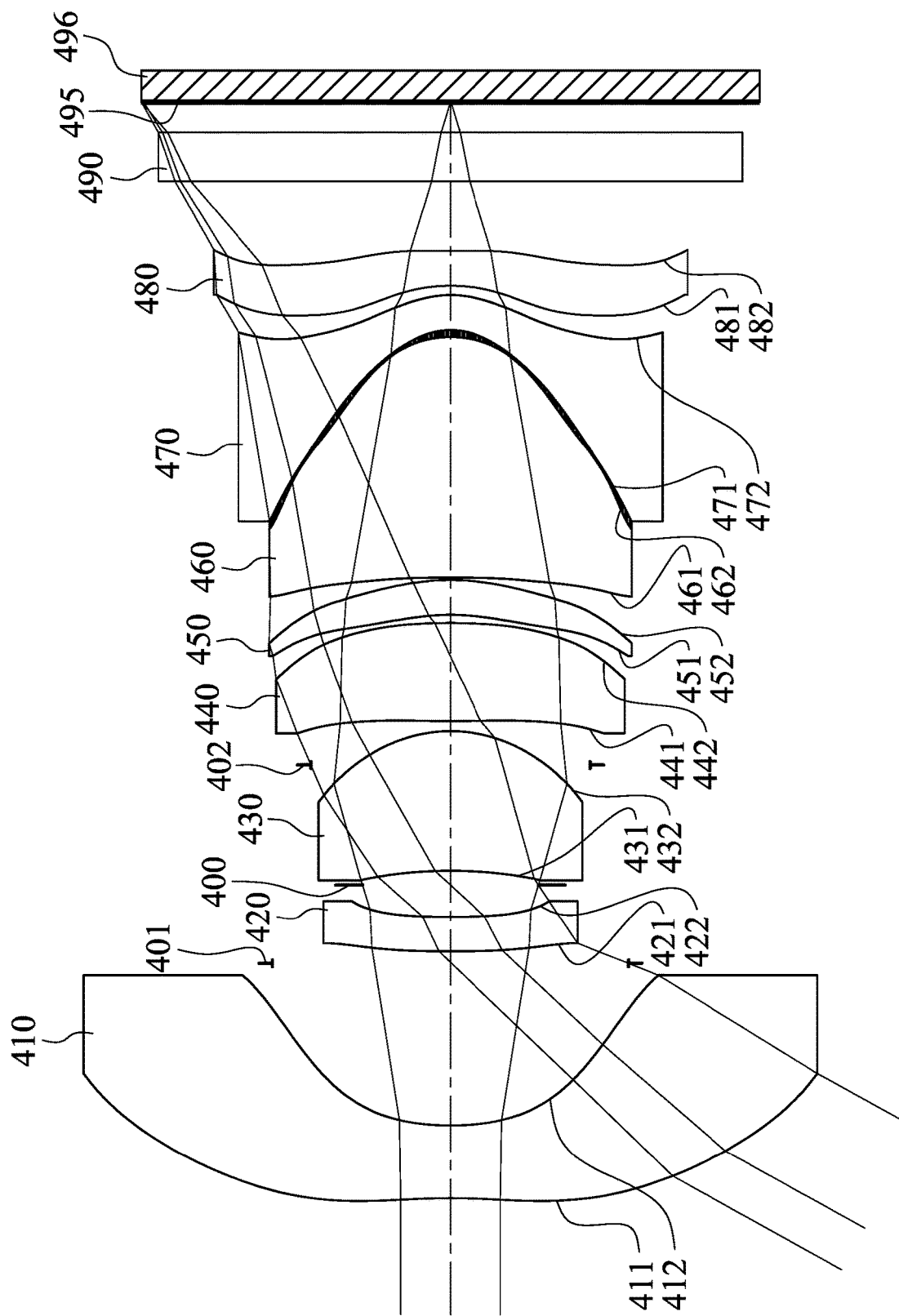
FIG. 7 is a schematic view of an imaging apparatus according to the 4th embodiment of the present disclosure.
Figure 8:
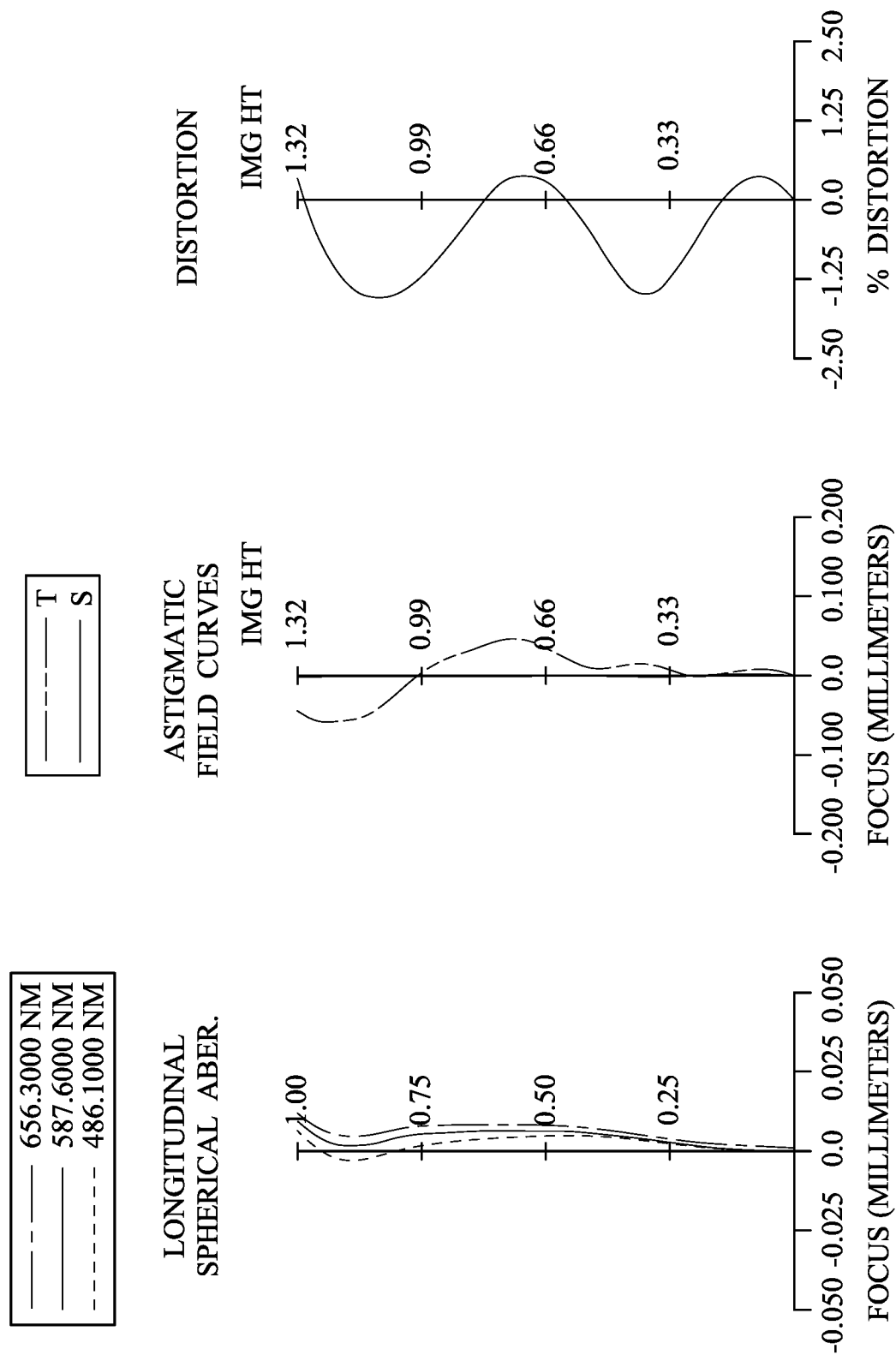
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes a photographing optical lens assembly (its reference numeral is omitted) and an image sensor 496. The photographing optical lens assembly includes, in order from an object side to an image side, a first lens element 410, a stop 401, a second lens element 420, an aperture stop 400, a third lens element 430, a stop 402, a fourth lens element 440, a fifth lens element 450, a sixth lens element 460, a seventh lens element 470, an eighth lens element 480, a filter 490 and an image surface 495. The image sensor 496 is disposed on the image surface 495 of the photographing optical lens assembly. The photographing optical lens assembly includes eight lens elements (410, 420, 430, 440, 450, 460, 470 and 480) without additional one or more lens elements inserted between the first lens element 410 and the eighth lens element 480.

The first lens element 410 with negative refractive power has an object-side surface 411 being concave in a paraxial region thereof and an image-side surface 412 being concave in a paraxial region thereof. The first lens element 410 is made of a plastic material, and has the object-side surface 411 and the image-side surface 412 being both aspheric. Furthermore, the object-side surface 411 of the first lens element 410 includes at least one inflection point and at least one convex critical point in an off-axis region thereof. The image-side surface 412 of the first lens element 410 includes at least one inflection point.

The second lens element 420 with negative refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric. Furthermore, the object-side surface 421 of the second lens element 420 includes at least one inflection point.

The third lens element 430 with positive refractive power has an object-side surface 431 being concave in a paraxial region thereof and an image-side surface 432 being convex in a paraxial region thereof. The third lens element 430 is made of a plastic material, and has the object-side surface 431 and the image-side surface 432 being both aspheric.

The fourth lens element 440 with positive refractive power has an object-side surface 441 being convex in a paraxial region thereof and an image-side surface 442 being convex in a paraxial region thereof. The fourth lens element 440 is made of a plastic material, and has the object-side surface 441 and the image-side surface 442 being both aspheric. Furthermore, the object-side surface 441 of the fourth lens element 440 includes at least one inflection point and at least one critical point in an off-axis region thereof.

The fifth lens element 450 with positive refractive power has an object-side surface 451 being concave in a paraxial region thereof and an image-side surface 452 being convex in a paraxial region thereof. The fifth lens element 450 is made of a plastic material, and has the object-side surface 451 and the image-side surface 452 being both aspheric. Furthermore, the object-side surface 451 of the fifth lens element 450 includes at least one inflection point.

The sixth lens element 460 with positive refractive power has an object-side surface 461 being concave in a paraxial region thereof and an image-side surface 462 being convex in a paraxial region thereof. The sixth lens element 460 is made of a plastic material, and has the object-side surface 461 and the image-side surface 462 being both aspheric. Furthermore, the object-side surface 461 of the sixth lens element 460 includes at least one inflection point. The image-side surface 462 of the sixth lens element 460 includes at least one inflection point.

The seventh lens element 470 with negative refractive power has an object-side surface 471 being concave in a paraxial region thereof and an image-side surface 472 being convex in a paraxial region thereof. The seventh lens element 470 is made of a plastic material, and has the object-side surface 471 and the image-side surface 472 being both aspheric. Furthermore, the object-side surface 471 of the seventh lens element 470 includes at least one inflection point. The image-side surface 472 of the seventh lens element 470 includes at least one inflection point and at least one critical point in an off-axis region thereof. Moreover, the image-side surface 462 of the sixth lens element 460 and the object-side surface 471 of the seventh lens element 470 are located adjacent to each other and aspheric cemented. The aspheric coefficients of the image-side surface 462 and the aspheric coefficients of the object-side surface 471 are different.

The eighth lens element 480 with negative refractive power has an object-side surface 481 being concave in a paraxial region thereof and an image-side surface 482 being concave in a paraxial region thereof. The eighth lens element 480 is made of a plastic material, and has the object-side surface 481 and the image-side surface 482 being both aspheric. Furthermore, the object-side surface 481 of the eighth lens element 480 includes at least one inflection point and at least one critical point in an off-axis region thereof. The image-side surface 482 of the eighth lens element 480 includes at least one inflection point and at least one critical point in an off-axis region thereof.

The filter 490 is made of a glass material and located between the eighth lens element 480 and the image surface 495, and will not affect the focal length of the photographing optical lens assembly.

The detailed optical data of the 4th embodiment are shown in TABLE 7 and the aspheric surface data are shown in TABLE 8 below.

TABLE 7

4th Embodiment
f = 0.73 mm, Fno = 1.70, HFOV = 61.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.625 | ASP | 0.314 | Plastic | 1.545 | 56.1 | −1.44 |
| 2 | | 1.170 | ASP | 0.697 | | | | |
| 3 | Stop | Plano | | 0.062 | | | | |
| 4 | Lens 2 | 5.967 | ASP | 0.150 | Plastic | 1.669 | 19.4 | −36.85 |
| 5 | | 4.756 | ASP | 0.136 | | | | |
| 6 | Ape. Stop | Plano | | 0.062 | | | | |
| 7 | Lens 3 | −1.937 | ASP | 0.600 | Plastic | 1.544 | 56.0 | 1.50 |
| 8 | | −0.636 | ASP | −0.146 | | | | |
| 9 | Stop | Plano | | 0.189 | | | | |
| 10 | Lens 4 | 4.897 | ASP | 0.424 | Plastic | 1.544 | 56.0 | 3.48 |
| 11 | | −2.962 | ASP | 0.035 | | | | |
| 12 | Lens 5 | −1.006 | ASP | 0.150 | Plastic | 1.669 | 19.4 | 27.54 |
| 13 | | −1.011 | ASP | 0.010 | | | | |
| 14 | Lens 6 | −15.223 | ASP | 1.036 | Plastic | 1.544 | 56.0 | 0.85 |
| 15 | | −0.459 | ASP | 0.030 | Cement | 1.485 | 53.2 | |
| 16 | Lens 7 | −0.292 | ASP | 0.150 | Plastic | 1.669 | 19.4 | −2.06 |
| 17 | | −0.447 | ASP | 0.040 | | | | |
| 18 | Lens 8 | −0.705 | ASP | 0.150 | Plastic | 1.584 | 28.2 | −1.12 |

TABLE 7-continued

4th Embodiment
f = 0.73 mm, Fno = 1.70, HFOV = 61.0 deg.

| Surface # | | Curvature Radius | | Thickness | Material | Index | Abbe # | Focal Length |
|---|---|---|---|---|---|---|---|---|
| 19 | | 9.947 | ASP | 0.300 | | | | |
| 20 | Filter | Plano | | 0.210 | Glass | 1.517 | 64.2 | |
| 21 | | Plano | | 0.132 | | | | |
| 22 | Image | Plano | | — | | | | |

Reference wavelength is 587.6 nm (d-line).
Effective radius of Surface 3 is 0.765 mm.
Effective radius of Surface 9 is 0.600 mm.

TABLE 8

Aspheric Coefficients

| Surface # | 1 | 2 | 4 | 5 | 7 | 8 | 10 | 11 |
|---|---|---|---|---|---|---|---|---|
| k= | −9.0000E+01 | 0.0000E+00 | −1.8305E+00 | −9.2965E+00 | −8.7644E+01 | −1.2552E+00 | −9.0000E+01 | 3.9619E−01 |
| A4= | 4.5087E−01 | 1.0240E+00 | 5.3295E−01 | 1.3714E+00 | −1.2066E+00 | −9.0041E−01 | −1.2641E+00 | −1.2882E+00 |
| A6= | −4.4954E−01 | −1.6651E−01 | −4.7647E−01 | −3.1440E+00 | 7.5025E+00 | 4.6398E+00 | 5.7629E+00 | 7.1974E+00 |
| A8= | 2.7989E−01 | −2.2267E−01 | −4.5979E+00 | 4.7177E+01 | −4.2330E+01 | −2.0771E+01 | −1.7121E+01 | −2.4113E+01 |
| A10= | −1.0667E−01 | −1.9899E+00 | −2.9138E−02 | −3.3691E+02 | 1.0216E+02 | 3.7808E+01 | 2.3888E+01 | 3.7509E+01 |
| A12= | 2.3174E−02 | 1.5442E+00 | 2.1159E+01 | 1.0593E+03 | | −2.9870E+01 | −1.1908E+01 | −2.6300E+01 |
| A14= | −2.1046E−03 | | −1.6342E+01 | | | | | 6.5039E+00 |

| Surface # | 12 | 13 | 14 | 15 | 16 | 17 | 18 | 19 |
|---|---|---|---|---|---|---|---|---|
| k= | −3.2607E+00 | −2.5448E+00 | −9.0000E+01 | −1.4917E+00 | −2.0179E+00 | −6.5858E+00 | −2.2265E+01 | 6.0267E+01 |
| A4= | 1.0113E+00 | −3.7604E−02 | −1.5230E+00 | −3.9324E+00 | −2.8893E+00 | −2.9112E+00 | −5.8910E+00 | −3.5563E+00 |
| A6= | −3.4038E−01 | 4.9853E+00 | 1.0259E+01 | 1.1920E+01 | 2.4444E+01 | 2.6157E+01 | 4.8475E+01 | 1.9936E+01 |
| A8= | −5.7190E+00 | −2.4415E+01 | −3.3627E+01 | −8.4093E+01 | −1.7222E+02 | −9.8199E+01 | −1.8030E+02 | −5.6116E+01 |
| A10= | 5.2898E+00 | 4.7478E+01 | 5.5648E+01 | 5.4713E+02 | 6.3906E+02 | 1.9141E−02 | 3.9006E+02 | 9.3816E+01 |
| A12= | 6.0847E+00 | −4.7716E+01 | −4.6456E+01 | −1.5342E+03 | −1.2235E+03 | −2.1279E+02 | −5.2863E+02 | −9.7762E+01 |
| A14= | −6.8847E+00 | 2.5438E+01 | 1.8323E+01 | 1.8687E+03 | 1.1540E+03 | 1.2425E+02 | 4.5711E+02 | 6.4008E+01 |
| A16= | | −5.7154E+00 | −2.6902E+00 | −8.2450E+02 | −4.2392E+02 | −2.9690E+01 | −2.4617E+02 | −2.5445E+01 |
| A18= | | | | | | | 7.5487E+01 | 5.5331E+00 |
| A20= | | | | | | | −1.0098E+01 | −4.9229E−01 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again. Furthermore, two values of parameter Yc82/Y82 in the following table are respectively corresponding to two critical points located from the axial vertex to the maximum effective diameter position in the off-axis region of the image-side surface 482 of the eighth lens element 480.

Moreover, these parameters can be calculated from TABLE 7 and TABLE 8 as the following values and satisfy the following conditions:

| 4th embodiment | | | |
|---|---|---|---|
| f [mm] | 0.73 | f/f3 | 0.49 |
| Fno | 1.70 | f/f4 | 0.21 |
| HFOV [deg.] | 61.0 | f/f5 | 0.03 |
| N4 | 1.64 | f/f6 | 0.86 |
| Vmin | 19.4 | f/f7 | −0.36 |
| (CT7 + CT8)/CT6 | 0.29 | f/f8 | −0.65 |
| SL/TL | 0.71 | f/f12 | −0.54 |
| T12/CT2 | 4.99 | f/f123 | 0.49 |
| T56/Tavg | 0.06 | f/|R1| | 0.28 |
| TD/(CT3 + T34 + CT4 + T45 + CT5) | 3.26 | |P|max | 0.86 |
| TL [mm] | 4.72 | CRA [deg.] | 31.7 |
| TL/EPD | 11.01 | ImgH [mm] | 1.32 |
| TL/f | 6.48 | ImgH/f | 1.81 |
| TL/ImgH | 3.58 | Y11/Y82 | 1.55 |
| (R1 + R2)/(R1 − R2) | 0.38 | Y82/CT8 | 6.79 |
| f/EPD | 1.70 | Y82/f | 1.40 |
| f/f1 | −0.61 | Yc82/Y82 | 0.09, 0.73 |
| f/f2 | −0.02 | | |

In the photographing optical lens assembly according to the 4th embodiment, eight lens elements (410, 420, 430, 440, 450, 460, 470 and 480) are made of plastic materials. At least one surface of the object-side surface and the image-side surface of each lens element of seven lens elements (410, 420, 440, 450, 460, 470 and 480) is aspheric and includes at least one inflection point. The Abbe numbers of the second lens element 420, the fifth lens element 450 and the seventh lens element 470 are the minimum values Vmin among Abbe numbers of the lens elements of the photographing optical lens assembly.

Specifically, numbers of inflection points and critical points in the off-axis regions of the object-side surfaces and the image-side surfaces of the eight lens elements in the 4th embodiment are listed below.

| 4th Embodiment—Numbers of Inflection Points | | | | | | | |
|---|---|---|---|---|---|---|---|
| | Lens 1 | Lens 2 | Lens 3 | Lens 4 | Lens 5 | Lens 6 | Lens 7 | Lens 8 |
| Object-side surface | 1 | 1 | 0 | 1 | 2 | 1 | 1 | 1 |
| Image-side surface | 1 | 0 | 0 | 0 | 0 | 3 | 1 | 2 |

| 4th Embodiment—Numbers of Critical Points | | | | | | | |
|---|---|---|---|---|---|---|---|
| | Lens 1 | Lens 2 | Lens 3 | Lens 4 | Lens 5 | Lens 6 | Lens 7 | Lens 8 |
| Object-side surface | 1 | 0 | 0 | 1 | 0 | 0 | 0 | 1 |
| Image-side surface | 0 | 0 | 0 | 0 | 0 | 0 | 1 | 2 |

5TH EMBODIMENT

Figure 9:
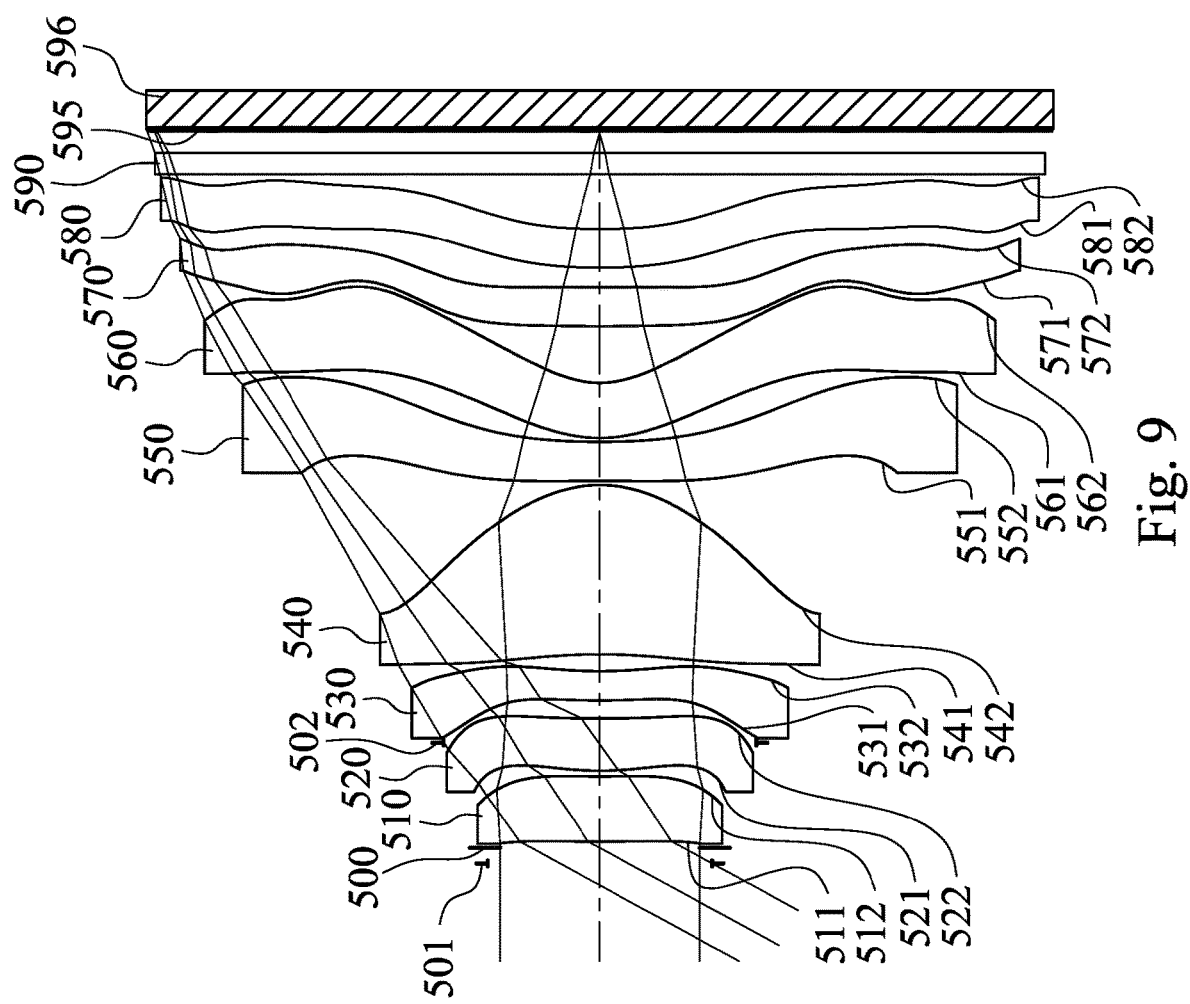
FIG. 9 is a schematic view of an imaging apparatus according to the 5th embodiment of the present disclosure.
Figure 10:
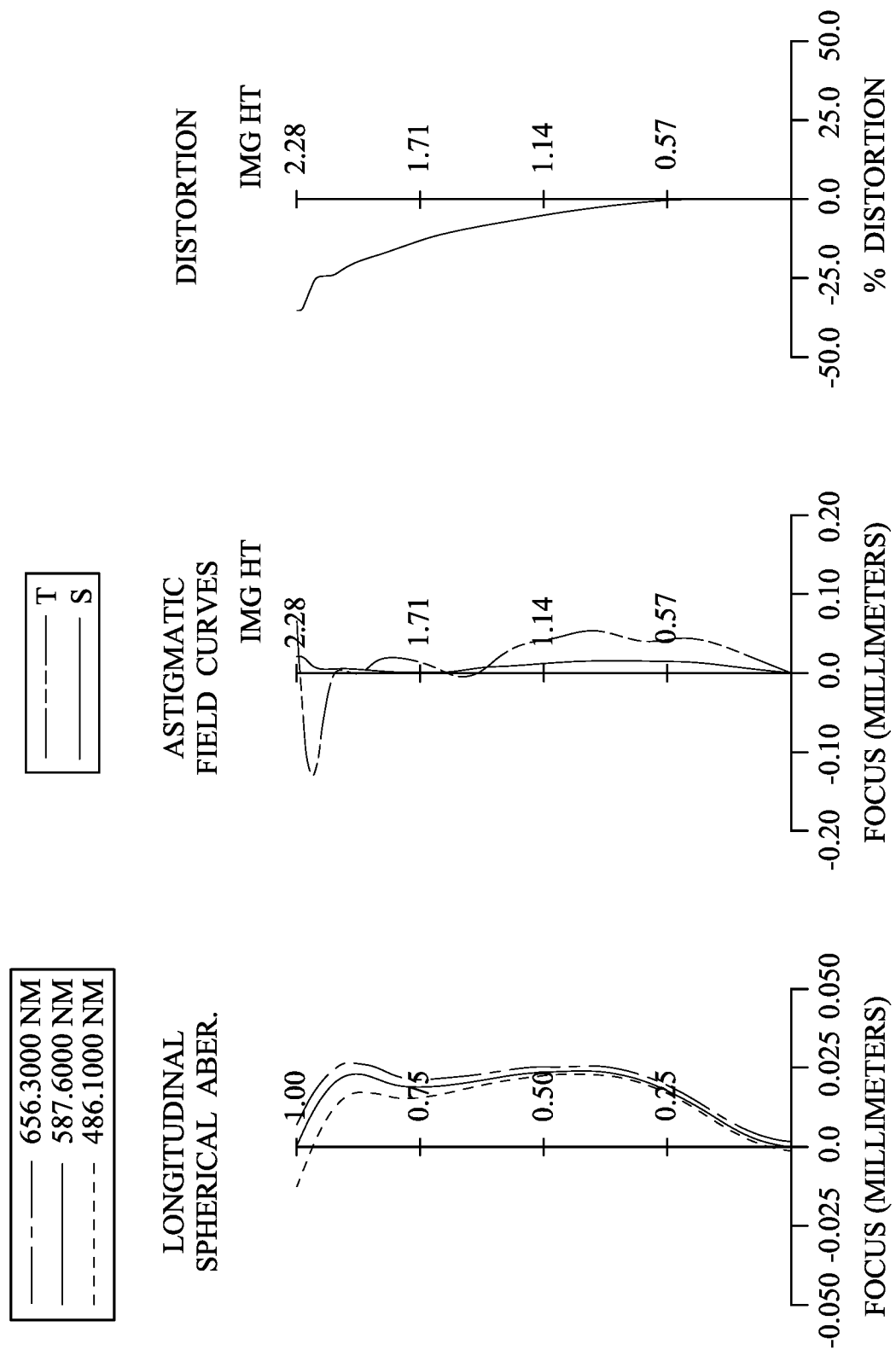
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes a photographing optical lens assembly (its reference numeral is omitted) and an image sensor 596. The photographing optical lens assembly includes, in order from an object side to an image side, a stop 501, an aperture stop 500, a first lens element 510, a second lens element 520, a stop 502, a third lens element 530, a fourth lens element 540, a fifth lens element 550, a sixth lens element 560, a seventh lens element 570, an eighth lens element 580, a filter 590 and an image surface 595. The image sensor 596 is disposed on the image surface 595 of the photographing optical lens assembly. The photographing optical lens assembly includes eight lens elements (510, 520, 530, 540, 550, 560, 570 and 580) without additional one or more lens elements inserted between the first lens element 510 and the eighth lens element 580.

The first lens element 510 with negative refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric. Furthermore, the object-side surface 511 of the first lens element 510 includes at least one inflection point and at least one critical point in an off-axis region thereof. The image-side surface 512 of the first lens element 510 includes at least one inflection point and at least one critical point in an off-axis region thereof.

The second lens element 520 with positive refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric. Furthermore, the object-side surface 521 of the second lens element 520 includes at least one inflection point and at least one critical point in an off-axis region thereof. The image-side surface 522 of the second lens element 520 includes at least one inflection point and at least one critical point in an off-axis region thereof.

The third lens element 530 with negative refractive power has an object-side surface 531 being convex in a paraxial region thereof and an image-side surface 532 being concave in a paraxial region thereof. The third lens element 530 is made of a plastic material, and has the object-side surface 531 and the image-side surface 532 being both aspheric. Furthermore, the object-side surface 531 of the third lens element 530 includes at least one inflection point and at least one critical point in an off-axis region thereof. The image-side surface 532 of the third lens element 530 includes at least one inflection point and at least one critical point in an off-axis region thereof.

The fourth lens element 540 with positive refractive power has an object-side surface 541 being concave in a paraxial region thereof and an image-side surface 542 being convex in a paraxial region thereof. The fourth lens element 540 is made of a plastic material, and has the object-side surface 541 and the image-side surface 542 being both aspheric. Furthermore, the object-side surface 541 of the fourth lens element 540 includes at least one inflection point. The image-side surface 542 of the fourth lens element 540 includes at least one inflection point.

The fifth lens element 550 with negative refractive power has an object-side surface 551 being concave in a paraxial region thereof and an image-side surface 552 being concave in a paraxial region thereof. The fifth lens element 550 is made of a plastic material, and has the object-side surface 551 and the image-side surface 552 being both aspheric. Furthermore, the object-side surface 551 of the fifth lens element 550 includes at least one inflection point and at least one critical point in an off-axis region thereof. The image-side surface 552 of the fifth lens element 550 includes at least one inflection point and at least one critical point in an off-axis region thereof.

The sixth lens element 560 with negative refractive power has an object-side surface 561 being convex in a paraxial region thereof and an image-side surface 562 being concave in a paraxial region thereof. The sixth lens element 560 is made of a plastic material, and has the object-side surface 561 and the image-side surface 562 being both aspheric. Furthermore, the object-side surface 561 of the sixth lens element 560 includes at least one inflection point and at least one critical point in an off-axis region thereof. The image-side surface 562 of the sixth lens element 560 includes at least one inflection point and at least one critical point in an off-axis region thereof.

The seventh lens element 570 with positive refractive power has an object-side surface 571 being convex in a paraxial region thereof and an image-side surface 572 being concave in a paraxial region thereof. The seventh lens element 570 is made of a plastic material, and has the object-side surface 571 and the image-side surface 572 being both aspheric. Furthermore, the object-side surface 571 of the seventh lens element 570 includes at least one inflection point and at least one critical point in an off-axis region thereof. The image-side surface 572 of the seventh lens element 570 includes at least one inflection point and at least one critical point in an off-axis region thereof.

The eighth lens element 580 with positive refractive power has an object-side surface 581 being convex in a paraxial region thereof and an image-side surface 582 being concave in a paraxial region thereof. The eighth lens element 580 is made of a plastic material, and has the object-side surface 581 and the image-side surface 582 being both aspheric. Furthermore, the object-side surface 581 of the eighth lens element 580 includes at least one inflection point and at least one critical point in an off-axis region thereof. The image-side surface 582 of the eighth lens element 580 includes at least one inflection point and at least one critical point in an off-axis region thereof.

The filter 590 is made of a glass material and located between the eighth lens element 580 and the image surface 595, and will not affect the focal length of the photographing optical lens assembly.

The detailed optical data of the 5th embodiment are shown in TABLE 9 and the aspheric surface data are shown in TABLE 10 below.

TABLE 9

5th Embodiment
f = 1.91 mm, Fno 7. 1.87, HFOV = 61.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | 0.080 | | | | |
| 2 | Ape. Stop | Plano | | 0.032 | | | | |
| 3 | Lens 1 | 14.428 | ASP | 0.335 | Plastic | 1.666 | 37.4 | −20.06 |
| 4 | | 6.302 | ASP | 0.030 | | | | |
| 5 | Lens 2 | 1.602 | ASP | 0.268 | Plastic | 1.544 | 66.0 | 3.61 |
| 6 | | 8.149 | ASP | −0.124 | | | | |
| 7 | Stop | Plano | | 0.215 | | | | |
| 8 | Lens 3 | 3.181 | ASP | 0.160 | Plastic | 1.660 | 20.4 | −12.11 |
| 9 | | 2.233 | ASP | 0.087 | | | | |
| 10 | Lens 4 | −2.841 | ASP | 0.869 | Plastic | 1.544 | 56.0 | 1.41 |
| 11 | | −0.668 | ASP | 0.020 | | | | |
| 12 | Lens 5 | −20.314 | ASP | 0.200 | Plastic | 1.680 | 18,4 | −4.92 |
| 13 | | 4.021 | ASP | 0.020 | | | | |
| 14 | Lens 6 | 0.738 | ASP | 0.283 | Plastic | 1.544 | 66.0 | −4.97 |
| 15 | | 0.601 | ASP | 0.288 | | | | |
| 16 | Lens 7 | 10.077 | ASP | 0.200 | Plastic | 1.544 | 56.0 | 41.18 |
| 17 | | 18.189 | ASP | 0.101 | | | | |
| 18 | Lens 8 | 2.993 | ASP | 0.200 | Plastic | 1.544 | 56.0 | 58.11 |
| 19 | | 3.229 | ASP | 0.280 | | | | |
| 20 | Filter | Plano | | 0.110 | Glass | 1.617 | 64.2 | — |
| 21 | | Plano | | 0.121 | | | | |
| 22 | Image | Plano | | — | | | | |

Reference wavelength is 587.6 nm (d-line).
Effective radius of Surface 1 is 0.575 mm.
Effective radius of Surface 7 is 0.800 mm.
Effective radius of Surface 10 is 1.030 mm.

TABLE 10

Aspheric Coefficients

| Surface # | 3 | 4 | 5 | 6 | 8 | 9 | 10 | 11 |
|---|---|---|---|---|---|---|---|---|
| k= | 0.0000E+00 | 5.1674E+01 | −4.6407E+01 | 6.4126E+01 | −9.0000E+01 | −2.3566E+01 | −5.7208E+01 | −2.0661E+00 |
| A4= | −1.6037E−01 | −1.1441E+00 | 5.5137E−01 | 2.6443E−01 | −4.4203E−01 | −1.5074E−01 | −7.2248E−02 | −2.4736E−01 |
| A6= | −4.0633E−01 | −6.4865E−01 | −8.3682E+00 | −1.3446E+00 | −2.3248E+00 | −1.6872E+00 | 4.4967E−01 | 1.3017E−01 |
| A8= | 1.1394E+00 | 2.8435E+00 | 3.4699E+01 | −1.5855E+00 | 4.5330E+00 | 4.4330E+00 | −6.0695E−01 | 6.9909E−02 |
| A10= | −4.9458E+00 | −8.7455E−01 | −1.2021E+02 | 7.2333E+00 | −1.0115E+00 | −4.4450E+00 | 3.6238E−01 | −2.6440E−01 |
| A12= | | −7.9114E+00 | 2.5954E+02 | −1.1186E+01 | −2.1853E+00 | 1.8916E+00 | −1.0476E−01 | 4.2020E−01 |
| A14= | | | −2.5800E+02 | 5.5459E+00 | 1.0183E+00 | −2.8774E−01 | 1.1550E−02 | −2.3423E−01 |
| A16= | | | | | | | | 4.1233E−02 |

| Surface # | 12 | 13 | 14 | 15 | 16 | 17 | 18 | 19 |
|---|---|---|---|---|---|---|---|---|
| k= | −9.0000E+01 | 2.8912E−01 | −2.2681E+00 | −2.3216E+00 | 1.5406E+01 | 3.7723E+01 | −3.3203E+01 | −5.7933E+00 |
| A4= | 1.9467E−01 | 2.3585E−01 | −3.1699E−01 | −3.3984E−01 | −2.1511E−01 | −4.1480E−01 | 4.8928E−01 | 5.2533E−01 |
| A6= | −1.0880E−02 | −2.2680E−01 | 3.0171E−01 | 2.4191E−01 | 1.1333E+00 | 1.8400E+00 | −7.5749E−01 | −9.2949E−01 |
| A8= | −1.3883E−01 | 9.3228E−02 | −2.3188E−01 | 2.1659E−01 | −1.3339E+00 | −2.5337E+00 | 4.7814E−01 | 6.6598E−01 |
| A10= | 9.5830E−02 | −2.6454E−02 | 1.0865E−01 | −4.9599E−01 | 7.0036E−01 | 1.7860E+00 | −1.5307E−01 | −2.4984E−01 |
| A12= | −2.7409E−02 | 6.2721E−03 | −2.7927E−02 | 3.3941E−01 | −1.8893E−01 | −7.3945E−01 | 2.5179E−02 | 5.1277E−02 |
| A14= | 2.9745E−03 | −1.0196E−03 | 3.6350E−03 | −1.1643E−01 | 2.4910E−01 | 1.8728E−01 | −1.8800E−03 | −5.4383E−03 |
| A16= | −4.4182E−06 | 6.9638E−05 | −1.8740E−04 | 2.1702E−02 | −8.7180E−04 | −2.8600E−02 | 3.9277E−05 | 2.3280E−04 |
| A18= | | | | −2.0980E−03 | −1.2173E−04 | 2.4245E−03 | | |
| A20= | | | | 8.2338E−05 | 9.5155E−06 | −8.7874E−05 | | |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again. Furthermore, three values of parameter Yc82/Y82 in the following table are respectively corresponding to three critical points located from the axial vertex to the maximum effective diameter position in the off-axis region of the image-side surface 582 of the eighth lens element 580.

Moreover, these parameters can be calculated from TABLE 9 and TABLE 10 as the following values and satisfy the following conditions:

| 5th Embodiment | | | |
|---|---|---|---|
| f [mm] | 1.91 | f/f3 | −0.16 |
| Fno | 1.87 | f/f4 | 1.36 |
| HFOV [deg.] | 61.4 | f/f5 | −0.39 |
| N4 | 1.54 | f/f6 | −0.39 |
| Vmin | 18.4 | f/f7 | 0.05 |
| (CT7 + CT8)/CT6 | 1.41 | f/f8 | 0.03 |
| SL/TL | 1.01 | f/f12 | 0.43 |
| T12/CT2 | 0.11 | f/f123 | 0.30 |
| T56/Tavg | 0.22 | f/|R1| | 0.13 |
| TD/(CT3 + T34 + CT4 + T45 + CT5) | 2.37 | |P|max | 1.36 |
| TL [mm] | 3.65 | CRA [deg.] | 21.5 |
| TL/EPD | 3.57 | ImgH [mm] | 2.29 |
| TL/f | 1.91 | ImgH/f | 1.19 |
| TL/ImgH | 1.60 | Y11/Y82 | 0.23 |
| (R1 + R2)/(R1 − R2) | 2.55 | Y82/CT8 | 11.24 |
| f/EPD | 1.87 | Y82/f | 1.17 |
| f/f1 | −0.10 | Yc82/Y82 | 0.74, |
| f/f2 | 0.53 | | 0.88, |
| | | | 1.00 |

In the photographing optical lens assembly according to the 5th embodiment, eight lens elements (510, 520, 530, 540, 550, 560, 570 and 580) are made of plastic materials. At least one surface of the object-side surface and the image-side surface of each lens element of the aforementioned eight lens elements is aspheric and includes at least one inflection point. The Abbe number of the fifth lens element 550 is the minimum value Vmin among Abbe numbers of the lens elements of the photographing optical lens assembly.

Specifically, numbers of inflection points and critical points in the off-axis regions of the object-side surfaces and the image-side surfaces of the eight lens elements in the 5th embodiment are listed below.

| 5th Embodiment—Numbers of Inflection Points | | | | | | | |
|---|---|---|---|---|---|---|---|
| | Lens 1 | Lens 2 | Lens 3 | Lens 4 | Lens 5 | Lens 6 | Lens 7 | Lens 8 |
| Object-side surface | 1 | 1 | 2 | 2 | 2 | 3 | 5 | 5 |
| Image-side surface | 1 | 1 | 1 | 1 | 1 | 4 | 5 | 5 |

| 5th Embodiment—Numbers of Critical Points | | | | | | | |
|---|---|---|---|---|---|---|---|
| | Lens 1 | Lens 2 | Lens 3 | Lens 4 | Lens 5 | Lens 6 | Lens 7 | Lens 8 |
| Object-side surface | 1 | 1 | 1 | 0 | 2 | 1 | 2 | 2 |
| Image-side surface | 1 | 1 | 1 | 0 | 1 | 3 | 4 | 3 |

6TH EMBODIMENT

Figure 11:
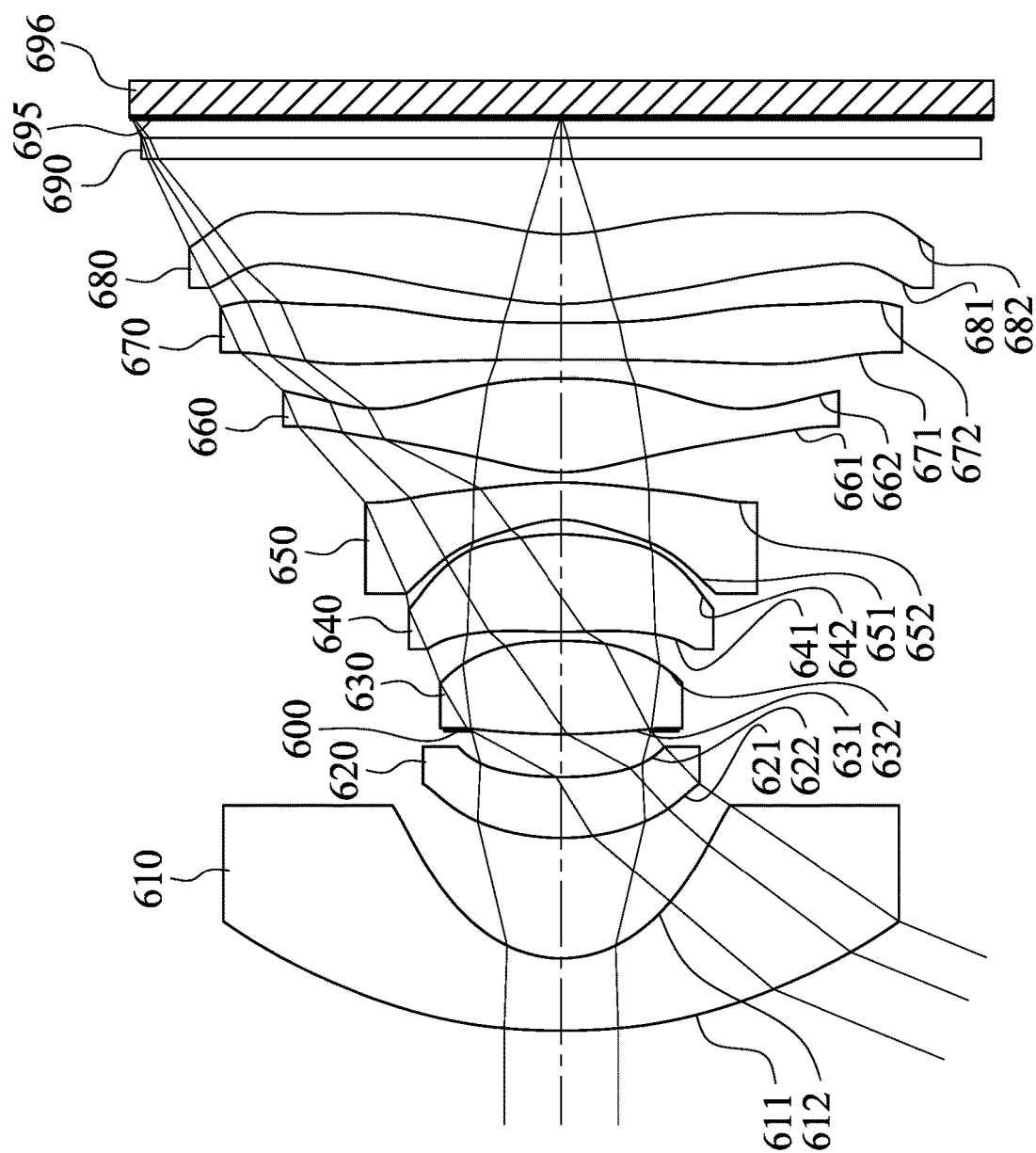
FIG. 11 is a schematic view of an imaging apparatus according to the 6th embodiment of the present disclosure.
Figure 12:
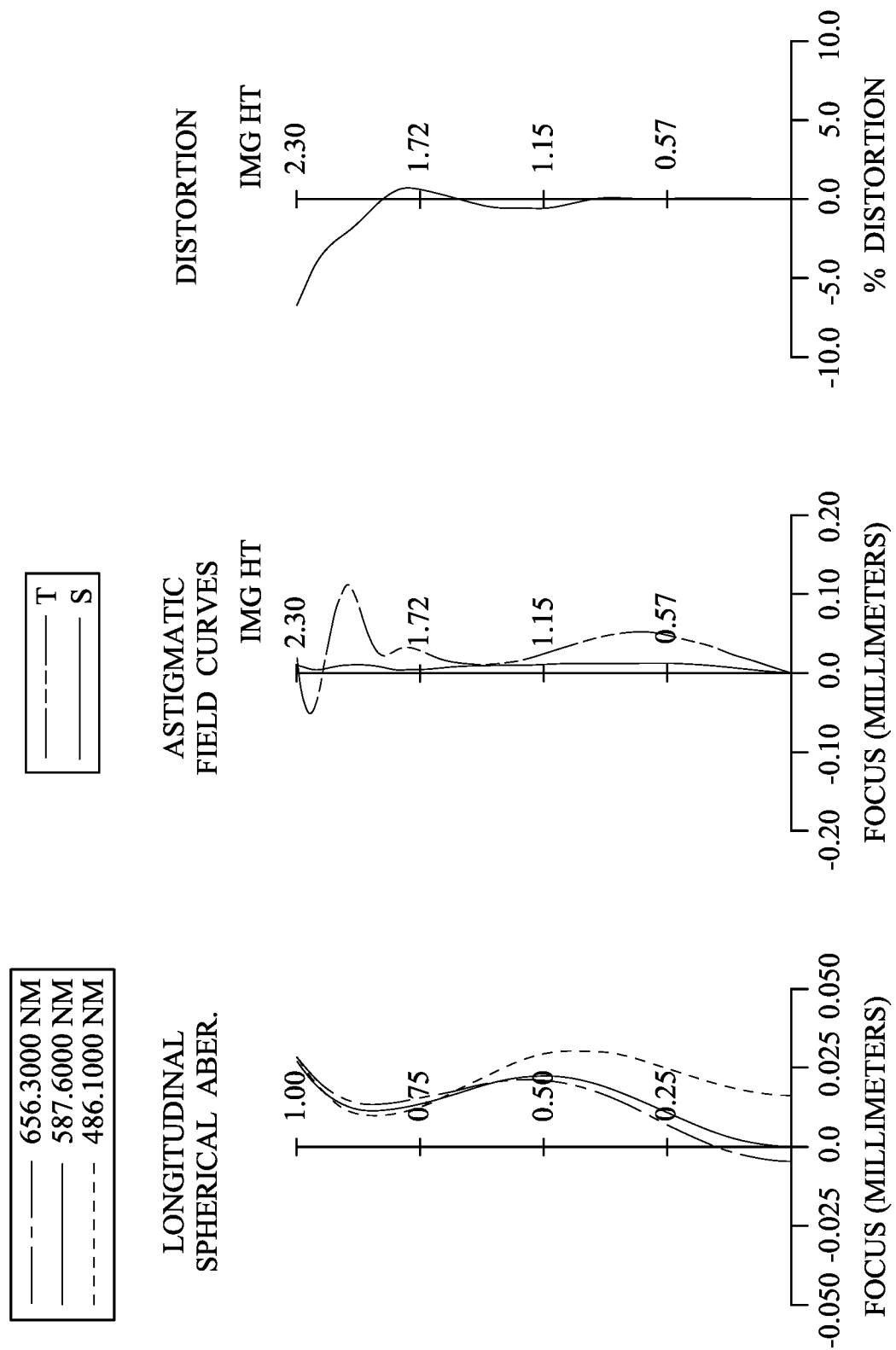
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes a photographing optical lens assembly (its reference numeral is omitted) and an image sensor 696. The photographing optical lens assembly includes, in order from an object side to an image side, a first lens element 610, a second lens element 620, an aperture stop 600, a third lens element 630, a fourth lens element 640, a fifth lens element 650, a sixth lens element 660, a seventh lens element 670, an eighth lens element 680, a filter 690 and an image surface 695. The image sensor 696 is disposed on the image surface 695 of the photographing optical lens assembly. The photographing optical lens assembly includes eight lens elements (610, 620, 630, 640, 650, 660, 670 and 680) without additional one or more lens elements inserted between the first lens element 610 and the eighth lens element 680.

The first lens element 610 with negative refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric. Furthermore, the image-side surface 612 of the first lens element 610 includes at least one inflection point.

The second lens element 620 with positive refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric. Furthermore, the object-side surface 621 of the second lens element 620 includes at least one inflection point.

The third lens element 630 with positive refractive power has an object-side surface 631 being convex in a paraxial region thereof and an image-side surface 632 being convex in a paraxial region thereof. The third lens element 630 is made of a plastic material, and has the object-side surface 631 and the image-side surface 632 being both aspheric. Furthermore, the object-side surface 631 of the third lens element 630 includes at least one inflection point.

The fourth lens element 640 with positive refractive power has an object-side surface 641 being convex in a paraxial region thereof and an image-side surface 642 being convex in a paraxial region thereof. The fourth lens element 640 is made of a plastic material, and has the object-side surface 641 and the image-side surface 642 being both aspheric. Furthermore, the object-side surface 641 of the fourth lens element 640 includes at least one inflection point and at least one critical point in an off-axis region thereof. The image-side surface 642 of the fourth lens element 640 includes at least one inflection point.

The fifth lens element 650 with negative refractive power has an object-side surface 651 being concave in a paraxial region thereof and an image-side surface 652 being convex in a paraxial region thereof. The fifth lens element 650 is made of a plastic material, and has the object-side surface 651 and the image-side surface 652 being both aspheric. Furthermore, the object-side surface 651 of the fifth lens element 650 includes at least one inflection point. The image-side surface 652 of the fifth lens element 650 includes at least one inflection point.

The sixth lens element 660 with positive refractive power has an object-side surface 661 being convex in a paraxial region thereof and an image-side surface 662 being convex in a paraxial region thereof. The sixth lens element 660 is made of a plastic material, and has the object-side surface 661 and the image-side surface 662 being both aspheric. Furthermore, the object-side surface 661 of the sixth lens element 660 includes at least one inflection point. The image-side surface 662 of the sixth lens element 660 includes at least one inflection point and at least one critical point in an off-axis region thereof.

The seventh lens element 670 with negative refractive power has an object-side surface 671 being concave in a paraxial region thereof and an image-side surface 672 being concave in a paraxial region thereof. The seventh lens element 670 is made of a plastic material, and has the object-side surface 671 and the image-side surface 672 being both aspheric. Furthermore, the object-side surface 671 of the seventh lens element 670 includes at least one inflection point and at least one critical point in an off-axis region thereof. The image-side surface 672 of the seventh lens element 670 includes at least one inflection point and at least one critical point in an off-axis region thereof.

The eighth lens element 680 with negative refractive power has an object-side surface 681 being convex in a paraxial region thereof and an image-side surface 682 being concave in a paraxial region thereof. The eighth lens element 680 is made of a plastic material, and has the object-side surface 681 and the image-side surface 682 being both aspheric. Furthermore, the object-side surface 681 of the eighth lens element 680 includes at least one inflection point and at least one critical point in an off-axis region thereof. The image-side surface 682 of the eighth lens element 680 includes at least one inflection point and at least one critical point in an off-axis region thereof.

The filter 690 is made of a glass material and located between the eighth lens element 680 and the image surface 695, and will not affect the focal length of the photographing optical lens assembly.

The detailed optical data of the 6th embodiment are shown in TABLE 11 and the aspheric surface data are shown in TABLE 12 below.

TABLE 11

6th Embodiment
f = 1.01 mm, Fno = 1.65, HFOV = 67.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.785 | ASP | 0.385 | Plastic | 1.545 | 56.1 | −1.49 |
| 2 | | 0.696 | ASP | 0.643 | | | | |
| 3 | Lens 2 | 1.259 | ASP | 0.325 | Plastic | 1.656 | 21.3 | 5.10 |
| 4 | | 1.813 | ASP | 0.246 | | | | |
| 5 | Ape. Stop | Plano | | −0.018 | | | | |
| 6 | Lens 3 | 3.913 | ASP | 0.498 | Plastic | 1.534 | 55.9 | 2.82 |
| 7 | | −2.342 | ASP | 0.047 | | | | |
| 8 | Lens 4 | 2.740 | ASP | 0.522 | Plastic | 1.534 | 55.9 | 1.62 |
| 9 | | −1.177 | ASP | 0.077 | | | | |
| 10 | Lens 5 | −0.504 | ASP | 0.200 | Plastic | 1.669 | 19.4 | −1.06 |
| 11 | | −1.998 | ASP | 0.054 | | | | |
| 12 | Lens 6 | 0.770 | ASP | 0.499 | Plastic | 1.544 | 56.0 | 1.19 |
| 13 | | −3.150 | ASP | 0.100 | | | | |
| 14 | Lens 7 | −200.000 | ASP | 0.200 | Plastic | 1.669 | 19.4 | −22.84 |
| 15 | | 16.551 | ASP | 0.100 | | | | |
| 16 | Lens 8 | 1.369 | ASP | 0.372 | Plastic | 1.544 | 56.0 | −15.17 |
| 17 | | 1.062 | ASP | 0.400 | | | | |
| 18 | Filter | Plano | | 0.110 | Glass | 1.517 | 64.2 | — |
| 19 | | Plano | | 0.110 | | | | |
| 20 | Image | Plano | | — | | | | |

Reference wavelength is 587.6 nm (d-line).

TABLE 12

Aspheric Coefficients

| Surface # | 1 | 2 | 3 | 4 | 6 | 7 | 8 | 9 |
|---|---|---|---|---|---|---|---|---|
| k= | −1.2132E+01 | −8.5943E−01 | −1.0655E+00 | −3.8411E+00 | −1.3441E+01 | −2.6835E+00 | −6.8074E+01 | −5.2218E−01 |
| A4= | 1.1576E−01 | 2.6058E−01 | 1.4575E−01 | 4.5484E−01 | 4.1737E−02 | −1.8495E+00 | −1.4948E+00 | 1.4999E+00 |
| A6= | −1.0035E−01 | 3.4169E−01 | 4.5242E−01 | 1.6637E+00 | −5.2556E−01 | 6.9189E+00 | 5.7514E+00 | −5.39055+00 |
| A8= | 5.7698E−02 | −1.5560E+00 | −2.0936E−02 | −1.2528E+01 | 4.1208E+00 | −1.8814E+01 | −1.8366E+00 | −5.2629E+00 |
| A10= | −2.0362E−02 | 2.9019E+00 | 4.3183E+00 | 9.2962E+01 | −1.4067E+00 | 2.7162E+01 | 4.7174E+01 | 4.6979E+01 |

TABLE 12-continued

| Aspheric Coefficients | | | | | | | | |
|---|---|---|---|---|---|---|---|---|
| A12= | 3.9877E−03 | −1.9804E+00 | 1.3404E+01 | −2.8533E+02 | 1.5078E+01 | −1.8117E+01 | −8.0674E+01 | −7A889E+01 |
| A14= | −3.2594E−04 | 2.5945E−02 | −1.6285E+01 | 3.6115E+02 | | | 5.7211E+01 | 4.0737E+01 |

| Surface # | 10 | 11 | 12 | 13 | 14 | 15 | 16 | 17 |
|---|---|---|---|---|---|---|---|---|
| k= | −6.0558E+00 | −7.3661E+01 | −9.4966E−00 | −3.3346E+00 | −1.0000E+00 | −8.1690E+01 | −7.8808E+00 | −8.8775E+00 |
| A4= | 9.2233E−01 | −1.7923E−01 | −3.2875E−01 | −4.2163E−01 | −1.0086E−01 | 1.8010E−01 | −4.9642E−01 | −4.0576E−01 |
| A6= | −1.4510E+00 | 7.8097E−01 | 6.4659E−01 | 6.5314E−01 | 2.1646E−01 | −1.0729E−01 | 1.0689E+00 | 5.9534E−01 |
| A8= | −2.0716E+01 | −1.0877E+00 | −7.7674E−01 | −1.7419E−01 | −2.6356E−01 | −1.0622E−01 | −1.1252E+00 | −5.4060E−01 |
| A10= | 9.5409E+01 | −7.5144E−01 | 5.7926E−01 | 1.7084E−01 | 1.8792E−01 | 1.3540E−01 | 6.4352E−01 | 2.9270E−01 |
| A12= | −1.8979E+02 | 3.0199E+00 | −2.5325E−01 | 1.3895E−01 | −7.2371E−02 | −5.5762E−02 | −2.0322E−01 | −8.8635E−02 |
| A14= | 1.8861E+02 | −2.4105E+00 | 5.6315E−02 | −3.9052E−02 | 1.3919E−02 | 1.0149E−02 | 3.3111E−02 | 1.3698E−02 |
| A16= | −7.5240E+01 | 6.1906E−01 | −5.3932E−03 | 4.0197E−03 | −1.0499E−03 | −6.9329E−04 | −2.1671E−03 | 8.3906E−04 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again. Furthermore, three values of parameter Yc82/Y82 in the following table are respectively corresponding to three critical points located from the axial vertex to the maximum effective diameter position in the off-axis region of the image-side surface 682 of the eighth lens element 680.

Moreover, these parameters can be calculated from TABLE 11 and

| 6th Embodiment | | | |
|---|---|---|---|
| f [mm] | 1.01 | f/f3 | 0.36 |
| Fno | 1.65 | f/f4 | 0.62 |
| HFOV [deg.] | 67.7 | f/f5 | −0.95 |
| N4 | 1.53 | f/f6 | 0.84 |
| Vmin | 19.4 | f/f7 | −0.04 |
| (CT7 + CT8)/CT6 | 1.15 | f/f8 | −0.07 |
| SL/TL | 0.67 | f/f12 | −0.45 |
| T12/CT2 | 1.98 | f/f123 | 0.12 |
| T56/Tavg | 0.30 | f/|R1| | 0.27 |
| TD/(CT3 + T34 + CT4 + T45 + CT5) | 3.16 | |P|max | 0.95 |
| TL [mm] | 4.87 | CRA [deg.] | 32.6 |
| TL/EPD | 7.99 | ImgH [mm] | 2.29 |
| TL/f | 4.84 | ImgH/f | 2.28 |
| TL/ImgH | 2.12 | Y11/Y82 | 0.91 |
| (R1 + R2)/(R1 − R2) | 1.41 | Y82/CT8 | 5.33 |
| f/EPD | 1.65 | Y82/f | 1.97 |
| f/f1 | −0.67 | Yc82/Y82 | 0.50, 0.66, |
| f/f2 | 0.20 | | 0.80 |

In the photographing optical lens assembly according to the 6th embodiment, eight lens elements (610, 620, 630, 640, 650, 660, 670 and 680) are made of plastic materials. At least one surface of the object-side surface and the image-side surface of each lens element of the aforementioned eight lens elements is aspheric and includes at least one inflection point. The Abbe numbers of the fifth lens element 650 and the seventh lens element 670 are the minimum values Vmin among Abbe numbers of the lens elements of the photographing optical lens assembly.

Specifically, numbers of inflection points and critical points in the off-axis regions of the object-side surfaces and the image-side surfaces of the eight lens elements in the 6th embodiment are listed below.

| 6th Embodiment—Numbers of Inflection Points | | | | | | | | |
|---|---|---|---|---|---|---|---|---|
| | Lens 1 | Lens 2 | Lens 3 | Lens 4 | Lens 5 | Lens 6 | Lens 7 | Lens 8 |
| Object-side surface | 0 | 1 | 1 | 2 | 2 | 3 | 3 | 4 |
| Image-side surface | 1 | 0 | 0 | 1 | 2 | 2 | 3 | 4 |

| 6th Embodiment—Numbers of Critical Points | | | | | | | | |
|---|---|---|---|---|---|---|---|---|
| | Lens 1 | Lens 2 | Lens 3 | Lens 4 | Lens 5 | Lens 6 | Lens 7 | Lens 8 |
| Object-side surface | 0 | 0 | 0 | 1 | 0 | 0 | 1 | 1 |
| Image-side surface | 0 | 0 | 0 | 0 | 0 | 1 | 1 | 3 |

7TH EMBODIMENT

Figure 13:
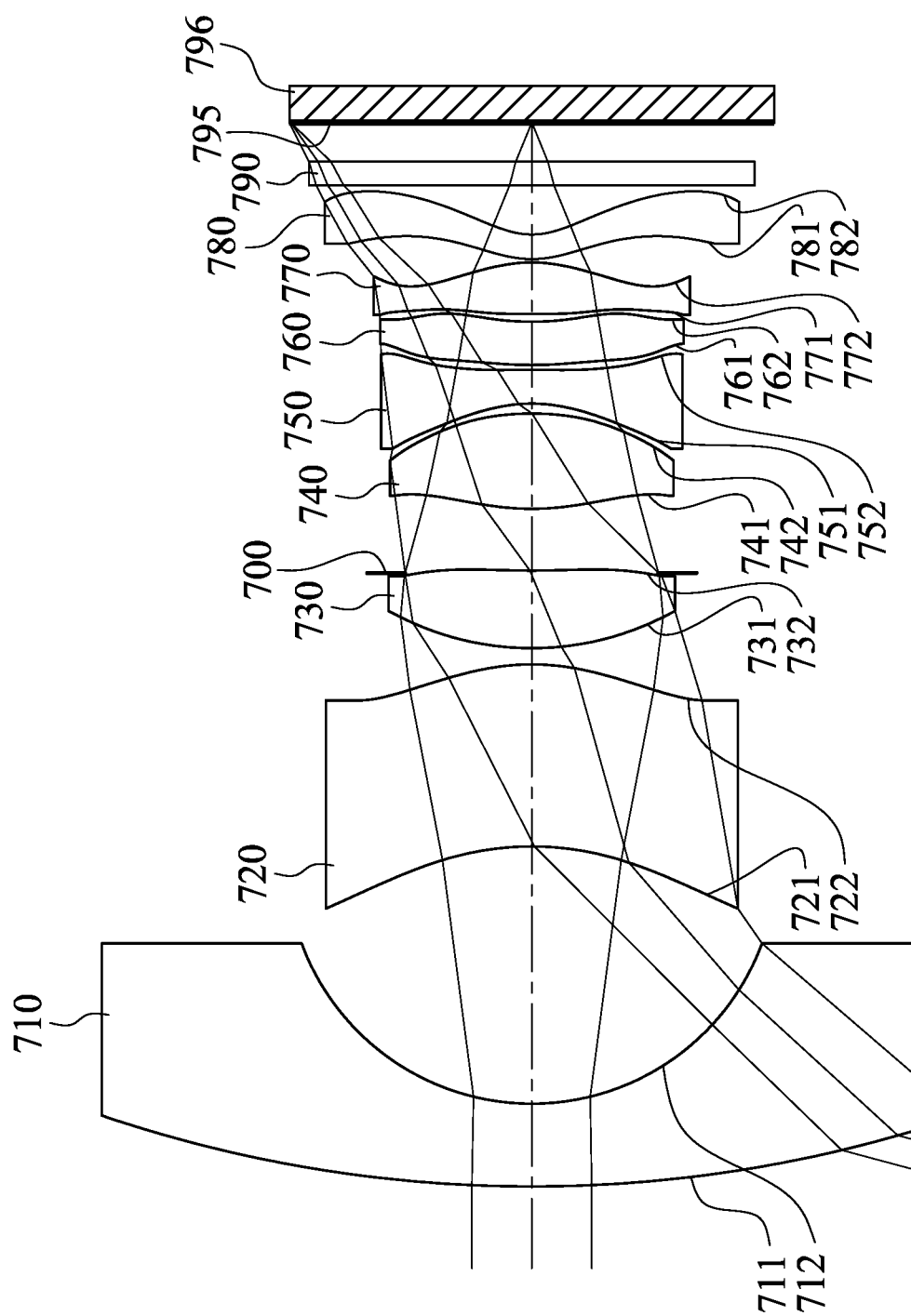
FIG. 13 is a schematic view of an imaging apparatus according to the 7th embodiment of the present disclosure.
Figure 14:
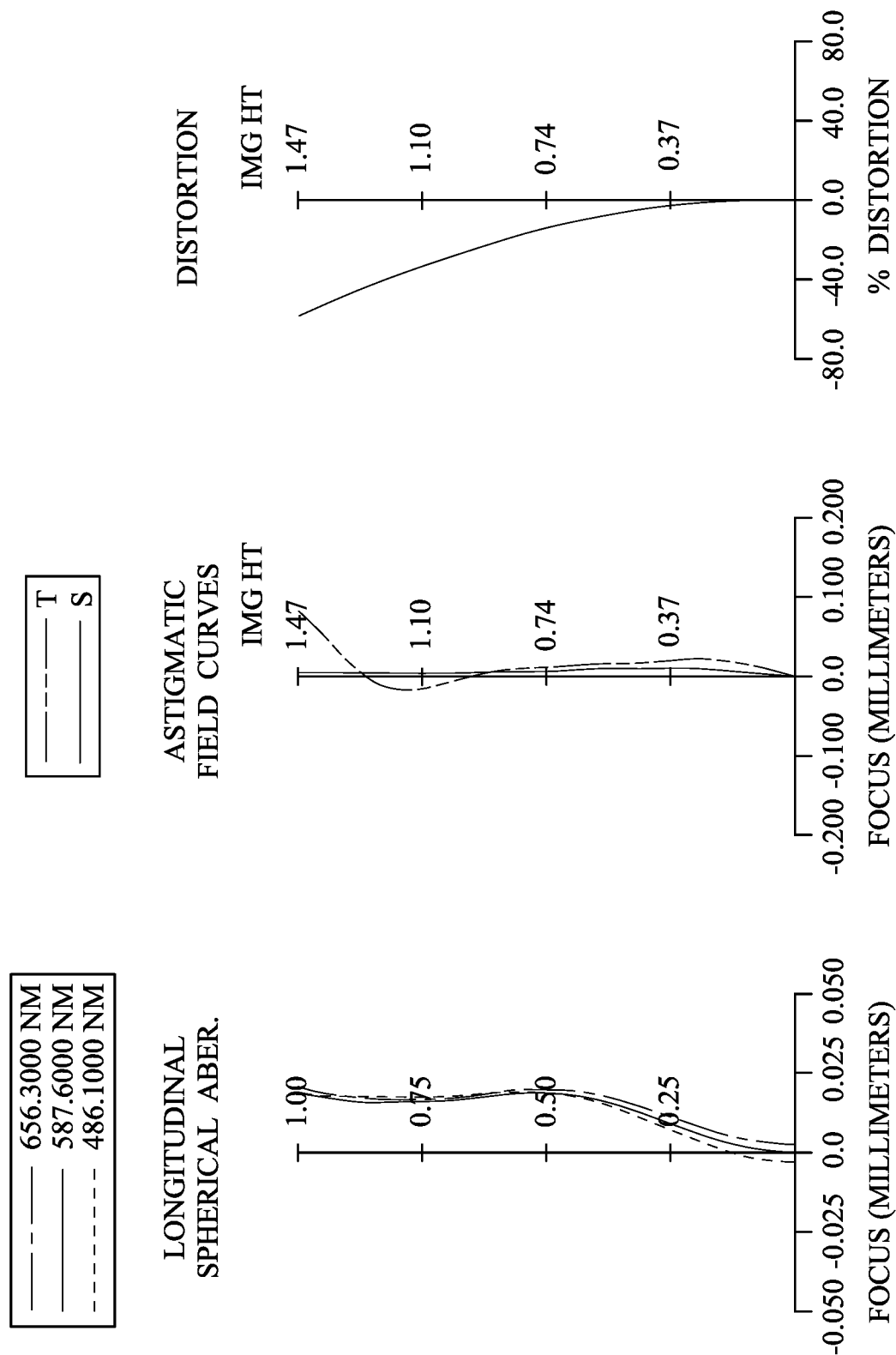
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes a photographing optical lens assembly (its reference numeral is omitted) and an image sensor 796. The photographing optical lens assembly includes, in order from an object side to an image side, a first lens element 710, a second lens element 720, a third lens element 730, an aperture stop 700, a fourth lens element 740, a fifth lens element 750, a sixth lens element 760, a seventh lens element 770, an eighth lens element 780, a filter 790 and an image surface 795. The image sensor 796 is disposed on the image surface 795 of the photographing optical lens assembly. The photographing optical lens assembly includes eight lens elements (710, 720, 730, 740, 750, 760, 770 and 780) without additional one or more lens elements inserted between the first lens element 710 and the eighth lens element 780.

The first lens element 710 with negative refractive power has an object-side surface 711 being convex in a paraxial region thereof and an image-side surface 712 being concave in a paraxial region thereof. The first lens element 710 is made of a glass material, and has the object-side surface 711 and the image-side surface 712 being both spherical.

The second lens element 720 with positive refractive power has an object-side surface 721 being concave in a paraxial region thereof and an image-side surface 722 being convex in a paraxial region thereof. The second lens element 720 is made of a plastic material, and has the object-side surface 721 and the image-side surface 722 being both aspheric. Furthermore, the object-side surface 721 of the second lens element 720 includes at least one inflection point. The image-side surface 722 of the second lens element 720 includes at least one inflection point.

The third lens element 730 with positive refractive power has an object-side surface 731 being convex in a paraxial region thereof and an image-side surface 732 being concave in a paraxial region thereof. The third lens element 730 is made of a plastic material, and has the object-side surface 731 and the image-side surface 732 being both aspheric. Furthermore, the image-side surface 732 of the third lens element 730 includes at least one inflection point and at least one critical point in an off-axis region thereof.

The fourth lens element 740 with positive refractive power has an object-side surface 741 being convex in a paraxial region thereof and an image-side surface 742 being convex in a paraxial region thereof. The fourth lens element 740 is made of a plastic material, and has the object-side surface 741 and the image-side surface 742 being both aspheric. Furthermore, the object-side surface 741 of the fourth lens element 740 includes at least one inflection point and at least one critical point in an off-axis region thereof.

The fifth lens element 750 with negative refractive power has an object-side surface 751 being concave in a paraxial region thereof and an image-side surface 752 being convex in a paraxial region thereof. The fifth lens element 750 is made of a plastic material, and has the object-side surface 751 and the image-side surface 752 being both aspheric. Furthermore, the image-side surface 752 of the fifth lens element 750 includes at least one inflection point and at least one critical point in an off-axis region thereof.

The sixth lens element 760 with negative refractive power has an object-side surface 761 being convex in a paraxial region thereof and an image-side surface 762 being concave in a paraxial region thereof. The sixth lens element 760 is made of a plastic material, and has the object-side surface 761 and the image-side surface 762 being both aspheric. Furthermore, the object-side surface 761 of the sixth lens element 760 includes at least one inflection point. The image-side surface 762 of the sixth lens element 760 includes at least one inflection point and at least one critical point in an off-axis region thereof.

The seventh lens element 770 with positive refractive power has an object-side surface 771 being convex in a paraxial region thereof and an image-side surface 772 being convex in a paraxial region thereof. The seventh lens element 770 is made of a plastic material, and has the object-side surface 771 and the image-side surface 772 being both aspheric. Furthermore, the object-side surface 771 of the seventh lens element 770 includes at least one inflection point and at least one critical point in an off-axis region thereof. The image-side surface 772 of the seventh lens element 770 includes at least one inflection point and at least one critical point in an off-axis region thereof.

The eighth lens element 780 with negative refractive power has an object-side surface 781 being convex in a paraxial region thereof and an image-side surface 782 being concave in a paraxial region thereof. The eighth lens element 780 is made of a plastic material, and has the object-side surface 781 and the image-side surface 782 being both aspheric. Furthermore, the object-side surface 781 of the eighth lens element 780 includes at least one inflection point and at least one critical point in an off-axis region thereof. The image-side surface 782 of the eighth lens element 780 includes at least one inflection point and at least one critical point in an off-axis region thereof.

The filter 790 is made of a glass material and located between the eighth lens element 780 and the image surface 795, and will not affect the focal length of the photographing optical lens assembly.

The detailed optical data of the 7th embodiment are shown in TABLE 13 and the aspheric surface data are shown in TABLE 14 below.

TABLE 13

7th Embodiment
f = 0.95 mm, Fno = 1.30, HFOV = 75.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 8.157 | | 0.506 | Glass | 1.639 | 55.4 | −2.96 |
| 2 | | 1.497 | | 1.572 | | | | |
| 3 | Lens 2 | −1.790 | ASP | 1.113 | Plastic | 1.544 | 56.0 | 5.87 |
| 4 | | −1.399 | ASP | 0.099 | | | | |
| 5 | Lens 3 | 1.770 | ASP | 0.474 | Plastic | 1.544 | 56.0 | 4.94 |
| 6 | | 4.704 | ASP | −0.015 | | | | |
| 7 | Ape. Stop | Plano | | 0.393 | | | | |
| 8 | Lens 4 | 1.582 | ASP | 0.582 | Plastic | 1.544 | 56.0 | 1.64 |
| 9 | | −1.770 | ASP | 0.061 | | | | |
| 10 | Lens 5 | −0.924 | ASP | 0.206 | Plastic | 1.660 | 20.4 | −1.59 |
| 11 | | −8.496 | ASP | 0.030 | | | | |
| 12 | Lens 6 | 2.446 | ASP | 0.264 | Plastic | 1.544 | 56.0 | −12.50 |
| 13 | | 1.731 | ASP | 0.048 | | | | |
| 14 | Lens 7 | 193.096 | ASP | 0.315 | Plastic | 1.544 | 56.0 | 1.53 |
| 15 | | −0.834 | ASP | 0.020 | | | | |
| 16 | Lens 8 | 0.616 | ASP | 0.150 | Plastic | 1.534 | 55.9 | −3.66 |
| 17 | | 0.429 | ASP | 0.300 | | | | |

TABLE 13-continued

7th Embodiment
f = 0.95 mm, Fno = 1.30, HFOV = 75.0 deg.

| Surface # | | Curvature Radius | Thickness | Material | Index | Abbe # | Focal Length |
|---|---|---|---|---|---|---|---|
| 18 | Filter | Plano | 0.145 | Glass | 1.517 | 64.2 | — |
| 19 | | Plano | 0.239 | | | | |
| 20 | Image | Plano | — | | | | |

Reference wavelength is 587.6 nm (d-line).

TABLE 14

Aspheric Coefficients

| Surface # | 3 | 4 | 5 | 6 | 8 | 9 | 10 |
|---|---|---|---|---|---|---|---|
| k = | −2.1685E+00 | 2.0949E−01 | 1.2043E+00 | 2.4835E+01 | −5.8656E+00 | −1.1755E+00 | −5.9490E+00 |
| A4 = | −4.1865E−02 | 2.1003E−01 | −4.7135E−02 | −4.9439E−01 | −1.3980E−01 | −4.1408E−01 | −1.0896E−01 |
| A6 = | 4.7373E−02 | −3.0037E−02 | 4.3628E−02 | 4.6321E−01 | 2.8497E−03 | 5.8551E−01 | −5.4572E−01 |
| A8 = | −1.2190E−02 | 3.1169E−02 | −6.2507E−02 | −2.7257E−01 | −2.2811E−01 | 4.8796E−01 | 3.0143E+00 |
| A10 = | 5.6481E−04 | 1.3711E−02 | | | 1.6590E−01 | −1.9397E+00 | −4.7345E+00 |
| A12 = | | | | | | 1.1995E+00 | 2.3636E+00 |

| Surface # | 11 | 12 | 13 | 14 | 15 | 16 | 17 |
|---|---|---|---|---|---|---|---|
| k = | 5.6151E+01 | −1.8967E+00 | −4.0305E−02 | 9.0000E+01 | −9.7341E+00 | −4.1304E+00 | −3.6284E+00 |
| A4 = | 1.0633E+00 | −3.4854E−01 | 3.0892E−01 | 1.6401E+00 | −2.1087E−01 | −8.0484E−01 | −5.1450E−01 |
| A6 = | −3.7499E+00 | −4.6475E−01 | −4.5815E+00 | −7.8603E+00 | 5.8406E−01 | 1.0741E+00 | 6.1666E−01 |
| A8 = | 8.1599E+00 | 3.2032E+00 | 8.8148E+00 | 1.4646E+01 | 1.1872E−01 | −8.5350E−01 | −4.8020E−01 |
| A10 = | −8.3542E+00 | −3.5114E+00 | −6.5073E+00 | −1.2228E+01 | −4.3673E−01 | 3.5925E−01 | 2.0717E−01 |
| A12 = | 3.0202E+00 | 1.0195E+00 | 1.6598E+00 | 3.7538E+00 | 1.3435E−01 | −5.8642E−02 | −3.9845E−02 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from TABLE 13 and TABLE 14 as the following values and satisfy the following conditions:

| 7th Embodiment | | | |
|---|---|---|---|
| f [mm] | 0.95 | f/f3 | 0.19 |
| Fno | 1.30 | f/f4 | 0.58 |
| HFOV [deg.] | 75.0 | f/f5 | −0.60 |
| N4 | 1.54 | f/f6 | −0.08 |
| Vmin | 20.4 | f/f7 | 0.62 |
| (CT7 + CT8)/CT6 | 1.76 | f/f8 | −0.26 |
| SL/TL | 0.42 | f/f12 | 0.01 |
| T12/CT2 | 1.41 | f/f123 | 0.41 |
| T56/Tavg | 0.10 | f/|R1| | 0.12 |
| TD/(CT3 + T34 + CT4 + T45 + CT5) | 3.42 | |P|max | 0.62 |
| TL [mm] | 6.50 | CRA [deg.] | 35.0 |
| TL/EPD | 8.89 | ImgH [mm] | 1.47 |
| TL/f | 6.84 | ImgH/f | 1.55 |
| TL/ImgH | 4.42 | Y11/Y82 | 2.08 |

| 7th Embodiment | | | |
|---|---|---|---|
| (R1 + R2)/(R1 − R2) | 1.46 | Y82/CT8 | 8.43 |
| f/EPD | 1.30 | Y82/f | 1.33 |
| f/f1 | −0.32 | Yc82/Y82 | 0.78 |
| f/f2 | 0.16 | | |

In the photographing optical lens assembly according to the 7th embodiment, seven lens elements (720, 730, 740, 750, 760, 770 and 780) are made of plastic materials. At least one surface of the object-side surface and the image-side surface of each lens element of the aforementioned seven lens elements is aspheric and includes at least one inflection point. The Abbe number of the fifth lens element 750 is the minimum value Vmin among Abbe numbers of the lens elements of the photographing optical lens assembly.

Specifically, numbers of inflection points and critical points in the off-axis regions of the object-side surfaces and the image-side surfaces of the eight lens elements in the 7th embodiment are listed below.

| 7th Embodiment-Numbers of Inflection Points | | | | | | | | |
|---|---|---|---|---|---|---|---|---|
| | Lens 1 | Lens 2 | Lens 3 | Lens 4 | Lens 5 | Lens 6 | Lens 7 | Lens 8 |
| Object-side surface | 0 | 1 | 0 | 1 | 0 | 3 | 3 | 2 |
| Image-side surface | 0 | 1 | 1 | 0 | 2 | 3 | 1 | 1 |

| 7th Embodiment-Numbers of Critical Points | | | | | | | | |
|---|---|---|---|---|---|---|---|---|
| | Lens 1 | Lens 2 | Lens 3 | Lens 4 | Lens 5 | Lens 6 | Lens 7 | Lens 8 |
| Object-side surface | 0 | 0 | 0 | 1 | 0 | 0 | 1 | 1 |
| Image-side surface | 0 | 0 | 1 | 0 | 2 | 2 | 1 | 1 |

8TH EMBODIMENT

Figure 15:
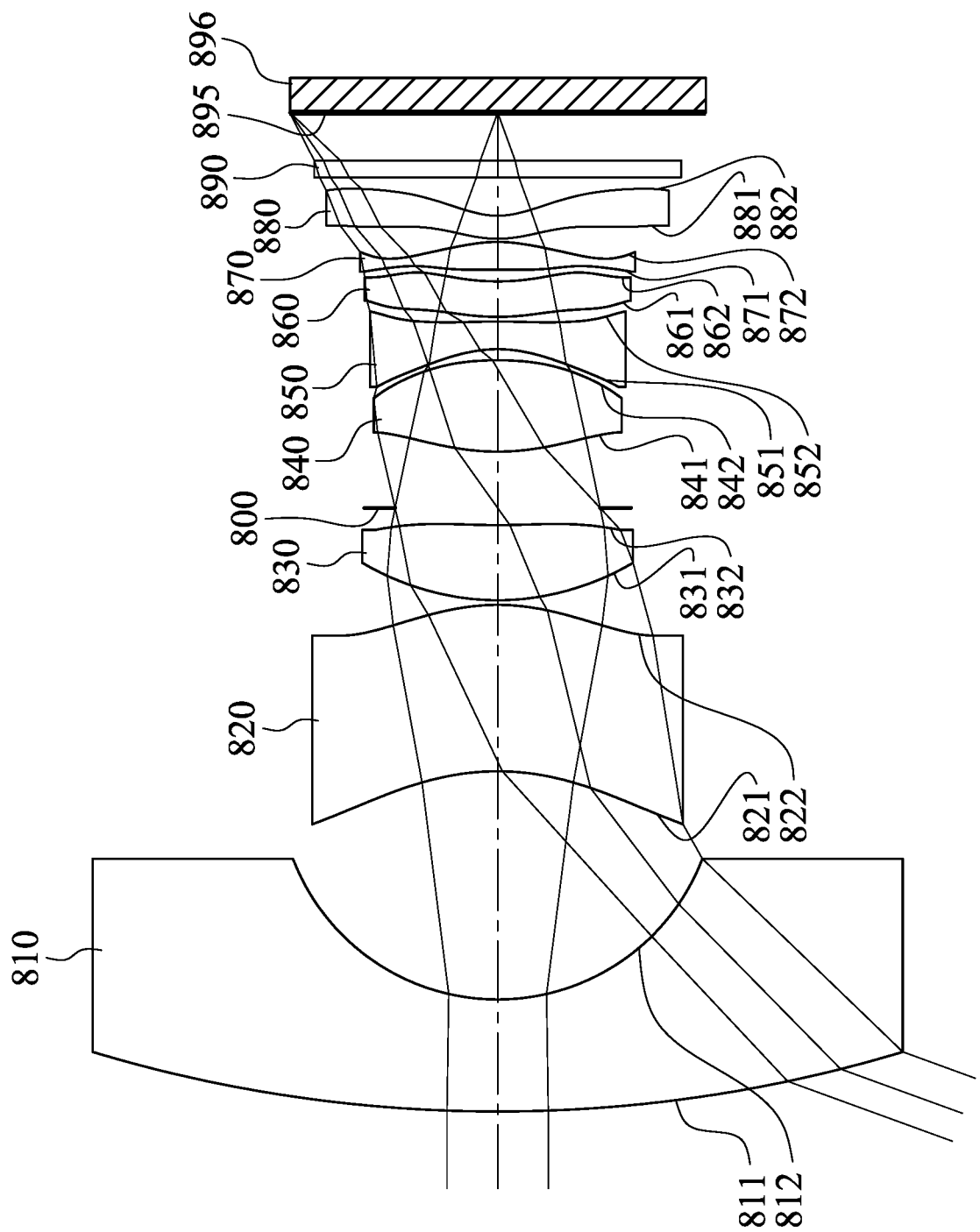
FIG. 15 is a schematic view of an imaging apparatus according to the 8th embodiment of the present disclosure.
Figure 16:
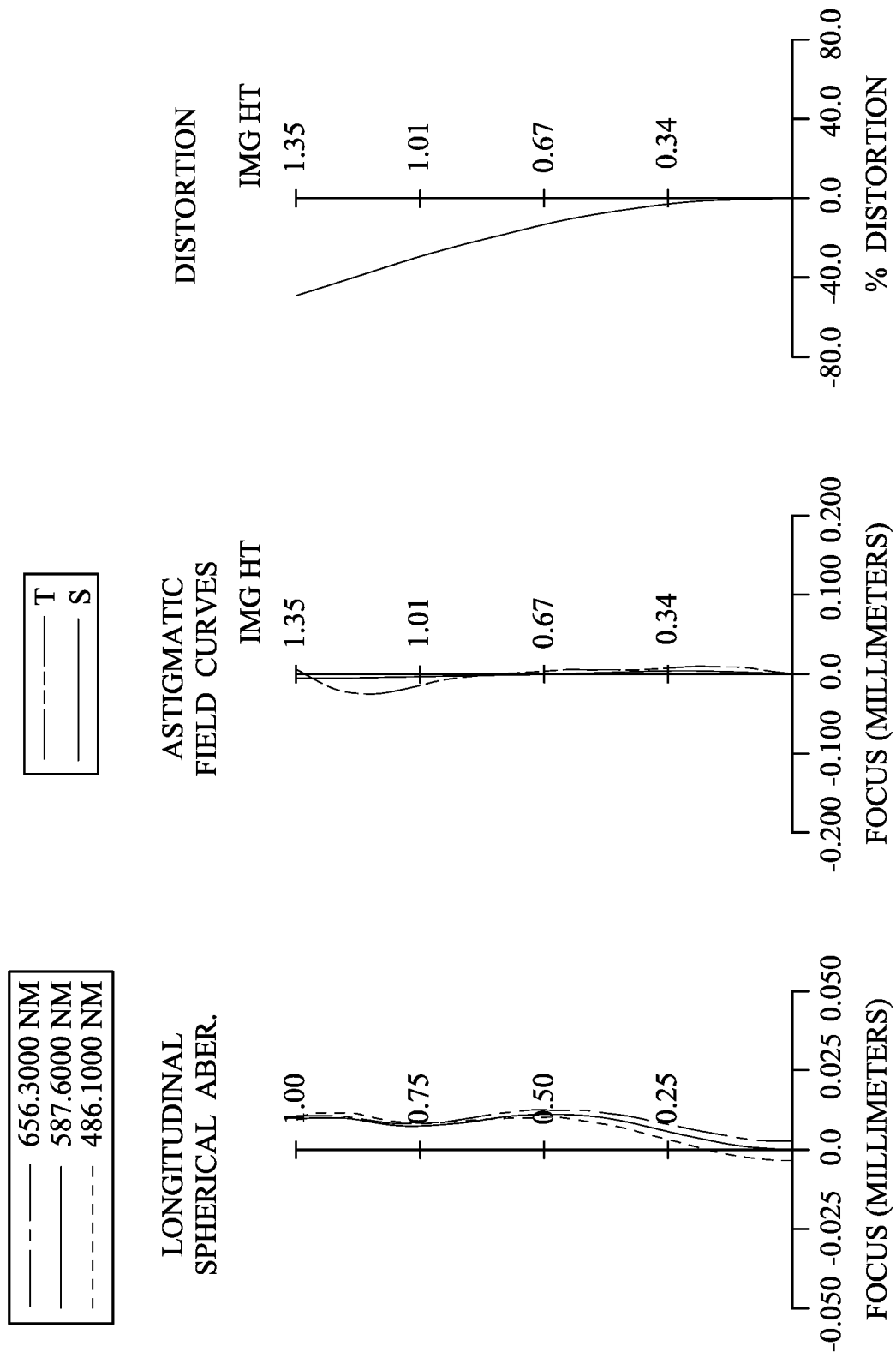
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows spherical aberration curves, astigmatic field curves and a distortion curve of the imaging apparatus according to the 8th embodiment. In FIG. 15, the imaging apparatus includes a photographing optical lens assembly (its reference numeral is omitted) and an image sensor 896. The photographing optical lens assembly includes, in order from an object side to an image side, a first lens element 810, a second lens element 820, a third lens element 830, an aperture stop 800, a fourth lens element 840, a fifth lens element 850, a sixth lens element 860, a seventh lens element 870, an eighth lens element 880, a filter 890 and an image surface 895. The image sensor 896 is disposed on the image surface 895 of the photographing optical lens assembly. The photographing optical lens assembly includes eight lens elements (810, 820, 830, 840, 850, 860, 870 and 880) without additional one or more lens elements inserted between the first lens element 810 and the eighth lens element 880.

The first lens element 810 with negative refractive power has an object-side surface 811 being convex in a paraxial region thereof and an image-side surface 812 being concave in a paraxial region thereof. The first lens element 810 is made of a glass material, and has the object-side surface 811 and the image-side surface 812 being both spherical.

The second lens element 820 with positive refractive power has an object-side surface 821 being concave in a paraxial region thereof and an image-side surface 822 being convex in a paraxial region thereof. The second lens element 820 is made of a plastic material, and has the object-side surface 821 and the image-side surface 822 being both aspheric. Furthermore, the object-side surface 821 of the second lens element 820 includes at least one inflection point. The image-side surface 822 of the second lens element 820 includes at least one inflection point.

The third lens element 830 with positive refractive power has an object-side surface 831 being convex in a paraxial region thereof and an image-side surface 832 being concave in a paraxial region thereof. The third lens element 830 is made of a plastic material, and has the object-side surface 831 and the image-side surface 832 being both aspheric. Furthermore, the image-side surface 832 of the third lens element 830 includes at least one inflection point and at least one critical point in an off-axis region thereof.

The fourth lens element 840 with positive refractive power has an object-side surface 841 being convex in a paraxial region thereof and an image-side surface 842 being convex in a paraxial region thereof. The fourth lens element 840 is made of a plastic material, and has the object-side surface 841 and the image-side surface 842 being both aspheric. Furthermore, the object-side surface 841 of the fourth lens element 840 includes at least one inflection point.

The fifth lens element 850 with negative refractive power has an object-side surface 851 being concave in a paraxial region thereof and an image-side surface 852 being convex in a paraxial region thereof. The fifth lens element 850 is made of a plastic material, and has the object-side surface 851 and the image-side surface 852 being both aspheric. Furthermore, the image-side surface 852 of the fifth lens element 850 includes at least one inflection point and at least one critical point in an off-axis region thereof.

The sixth lens element 860 with positive refractive power has an object-side surface 861 being convex in a paraxial region thereof and an image-side surface 862 being concave in a paraxial region thereof. The sixth lens element 860 is made of a plastic material, and has the object-side surface 861 and the image-side surface 862 being both aspheric. Furthermore, the object-side surface 861 of the sixth lens element 860 includes at least one inflection point. The image-side surface 862 of the sixth lens element 860 includes at least one inflection point and at least one critical point in an off-axis region thereof.

The seventh lens element 870 with positive refractive power has an object-side surface 871 being concave in a paraxial region thereof and an image-side surface 872 being convex in a paraxial region thereof. The seventh lens element 870 is made of a plastic material, and has the object-side surface 871 and the image-side surface 872 being both aspheric. Furthermore, the object-side surface 871 of the seventh lens element 870 includes at least one inflection point and at least one critical point in an off-axis region thereof. The image-side surface 872 of the seventh lens element 870 includes at least one inflection point and at least one critical point in an off-axis region thereof.

The eighth lens element 880 with negative refractive power has an object-side surface 881 being convex in a paraxial region thereof and an image-side surface 882 being concave in a paraxial region thereof. The eighth lens element 880 is made of a plastic material, and has the object-side surface 881 and the image-side surface 882 being both aspheric. Furthermore, the object-side surface 881 of the eighth lens element 880 includes at least one inflection point and at least one critical point in an off-axis region thereof. The image-side surface 882 of the eighth lens element 880 includes at least one inflection point and at least one critical point in an off-axis region thereof.

The filter 890 is made of a glass material and located between the eighth lens element 880 and the image surface 895, and will not affect the focal length of the photographing optical lens assembly.

The detailed optical data of the 8th embodiment are shown in TABLE 15 and the aspheric surface data are shown in TABLE 16 below.

TABLE 15

8th Embodiment
f = 0.95 mm, Fno = 1.45, HFOV = 70.0 deg.

| Surface # | | Curvature Radius | | Thickness | Material | Index | Abbe # | Focal Length |
|---|---|---|---|---|---|---|---|---|
| 0 | Object | | Plano | Infinity | | | | |
| 1 | Lens 1 | 9.130 | | 0.729 | Glass | 1.639 | 55.4 | −2.74 |
| 2 | | −1.425 | | 1.485 | | | | |
| 3 | Lens 2 | 1.628 | ASP | 1.083 | Plastic | 1.544 | 56.0 | 6.51 |
| 4 | | −1.377 | ASP | 0.030 | | | | |
| 5 | Lens 3 | 1.633 | ASP | 0.489 | Plastic | 1.534 | 55.9 | 4.45 |
| 6 | | 4.683 | ASP | 0.111 | | | | |
| 7 | Ape. Stop | | Plano | 0.367 | | | | |
| 8 | Lens 4 | 1.619 | ASP | 0.595 | Plastic | 1.544 | 56.0 | 1.69 |
| 9 | | −1.996 | ASP | 0.072 | | | | |
| 10 | Lens 5 | −0.810 | ASP | 0.180 | Plastic | 1.680 | 18.4 | −1.56 |
| 11 | | −3.727 | ASP | 0.030 | | | | |
| 12 | Lens 6 | 1.449 | ASP | 0.231 | Plastic | 1.534 | 55.9 | 18.93 |
| 13 | | 1.598 | ASP | 0.076 | | | | |
| 14 | Lens 7 | −5.535 | ASP | 0.181 | Plastic | 1.560 | 45.0 | 1.83 |
| 15 | | −0.875 | ASP | 0.020 | | | | |
| 16 | Lens 8 | 0.732 | ASP | 0.150 | Plastic | 1.544 | 56.0 | −3.60 |
| 17 | | 0.494 | ASP | 0.250 | | | | |
| 18 | Filter | | Plano | 0.110 | Glass | 1.517 | 64.2 | — |
| 19 | | | Plano | 0.311 | | | | |
| 20 | Image | | Plano | — | | | | |

Reference wavelength is 587.6 nm (d-line).

| 8th Embodiment | | | |
|---|---|---|---|
| f [mm] | 0.95 | f/f3 | 0.21 |
| Fno | 1.45 | f/f4 | 0.67 |
| HFOV [deg.] | 70.0 | f/f5 | −0.61 |
| N4 | 1.54 | f/f6 | 0.05 |

TABLE 16

Aspheric Coefficients

| Surface # | 3 | 4 | 5 | 6 | 8 | 9 | 10 |
|---|---|---|---|---|---|---|---|
| k = | −2.1925E+00 | 2.1273E−01 | 8.2005E−01 | 2.4097E+01 | −3.3967E+00 | −3.5016E−01 | −5.8011E+00 |
| A4 = | −2.1782E−02 | 2.4026E−01 | −5.3729E−02 | −4.7721E−01 | −1.1363E−01 | −4.2213E−01 | 4.5042E−02 |
| A6 = | 5.1222E−02 | −6.5372E−02 | −1.2997E−02 | 4.1830E−01 | 1.1522E−01 | 2.6418E−01 | −1.4200E+00 |
| A8 = | −1.5761E−02 | 9.5928E−02 | 2.7813E−03 | −2.1668E−01 | −4.0646E−01 | 1.8494E+00 | 0.0423E+00 |
| A10 = | 6.8973E−04 | −1.7566E−02 | | | 2.5485E−01 | −4.3996E+00 | −9.6939E+00 |
| A12 = | | | | | | 2.7247E+00 | 5.2261E+00 |

| Surface # | 11 | 12 | 13 | 14 | 15 | 16 | 17 |
|---|---|---|---|---|---|---|---|
| k = | 9.1403E−01 | −9.0586E+00 | −5.7930E−01 | −9.0000E+01 | −1.3152E+01 | −2.9930E+00 | −4.7993E+00 |
| A4 = | 1.1097E+00 | −2.9029E−01 | 4.6702E−01 | 2.2348E+00 | 3.3419E−01 | −1.6458E+00 | −7.0924E−01 |
| A6 = | −4.0686E+00 | −1.5457E+00 | −5.4565E+00 | −9.7452E+00 | −1.8578E+00 | 2.8189E+00 | 9.3338E−01 |
| A8 = | 9.2467E+00 | 5.4341E+00 | 1.0418E+01 | 1.7219E+01 | 4.9088E+00 | −2.2820E+00 | −6.1893E−01 |
| A10 = | −9.5919E+00 | −4.8970E+00 | −7.5673E+00 | −1.3982E+01 | −4.7815E+00 | 8.9995E−01 | 1.9918E−01 |
| A12 = | 3.4515E+00 | 1.0670E+00 | 1.8108E+00 | 4.2711E+00 | 1.6137E+00 | −1.3897E−01 | −2.8156E−02 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from TABLE 15 and TABLE 16 as the following values and satisfy the following conditions:

-continued

| 8th Embodiment | | | |
|---|---|---|---|
| Vmin | 18.4 | f/f7 | 0.62 |
| (CT7 + CT8)/CT6 | 1.43 | f/f8 | −0.26 |
| SL/TL | 0.40 | f/f12 | −0.03 |
| T12/CT2 | 1.37 | f/f123 | 0.42 |
| T56/Tavg | 0.10 | f/|R1| | 0.10 |
| TD/(CT3 + T34 + CT4 + T45 + CT5) | 3.21 | |P|max | 0.61 |
| TL [mm] | 6.50 | CRA [deg.] | 35.0 |
| TL/EPD | 9.88 | ImgH [mm] | 1.35 |
| TL/f | 6.82 | ImgH/f | 1.42 |

-continued

| 8th Embodiment | | | |
|---|---|---|---|
| TL/ImgH | 4.82 | Y11/Y82 | 2.37 |
| (R1 + R2)/(R1 − R2) | 1.37 | Y82/CT8 | 7.42 |
| f/EPD | 1.45 | Y82/f | 1.17 |
| f/f1 | −0.35 | Yc82/Y82 | 0.86 |
| f/f2 | 0.16 | | |

In the photographing optical lens assembly according to the 8th embodiment, seven lens elements (820, 830, 840, 850, 860, 870 and 880) are made of plastic materials. At least one surface of the object-side surface and the image-side surface of each lens element of the aforementioned seven lens elements is aspheric and includes at least one inflection point. The Abbe number of the fifth lens element 850 is the minimum value Vmin among Abbe numbers of the lens elements of the photographing optical lens assembly.

Specifically, numbers of inflection points and critical points in the off-axis regions of the object-side surfaces and the image-side surfaces of the eight lens elements in the 8th embodiment are listed below.

| 8th Embodiment-Numbers of Inflection Points | | | | | | | | |
|---|---|---|---|---|---|---|---|---|
| | Lens 1 | Lens 2 | Lens 3 | Lens 4 | Lens 5 | Lens 6 | Lens 7 | Lens 8 |
| Object-side surface | 0 | 1 | 0 | 1 | 0 | 3 | 2 | 2 |
| Image-side surface | 0 | 1 | 1 | 0 | 2 | 2 | 1 | 1 |

| 8th Embodiment-Numbers of Critical Points | | | | | | | | |
|---|---|---|---|---|---|---|---|---|
| | Lens 1 | Lens 2 | Lens 3 | Lens 4 | Lens 5 | Lens 6 | Lens 7 | Lens 8 |
| Object-side surface | 0 | 0 | 0 | 0 | 0 | 0 | 2 | 2 |
| Image-side surface | 0 | 0 | 1 | 0 | 1 | 2 | 1 | 1 |

9TH EMBODIMENT

Figure 17:
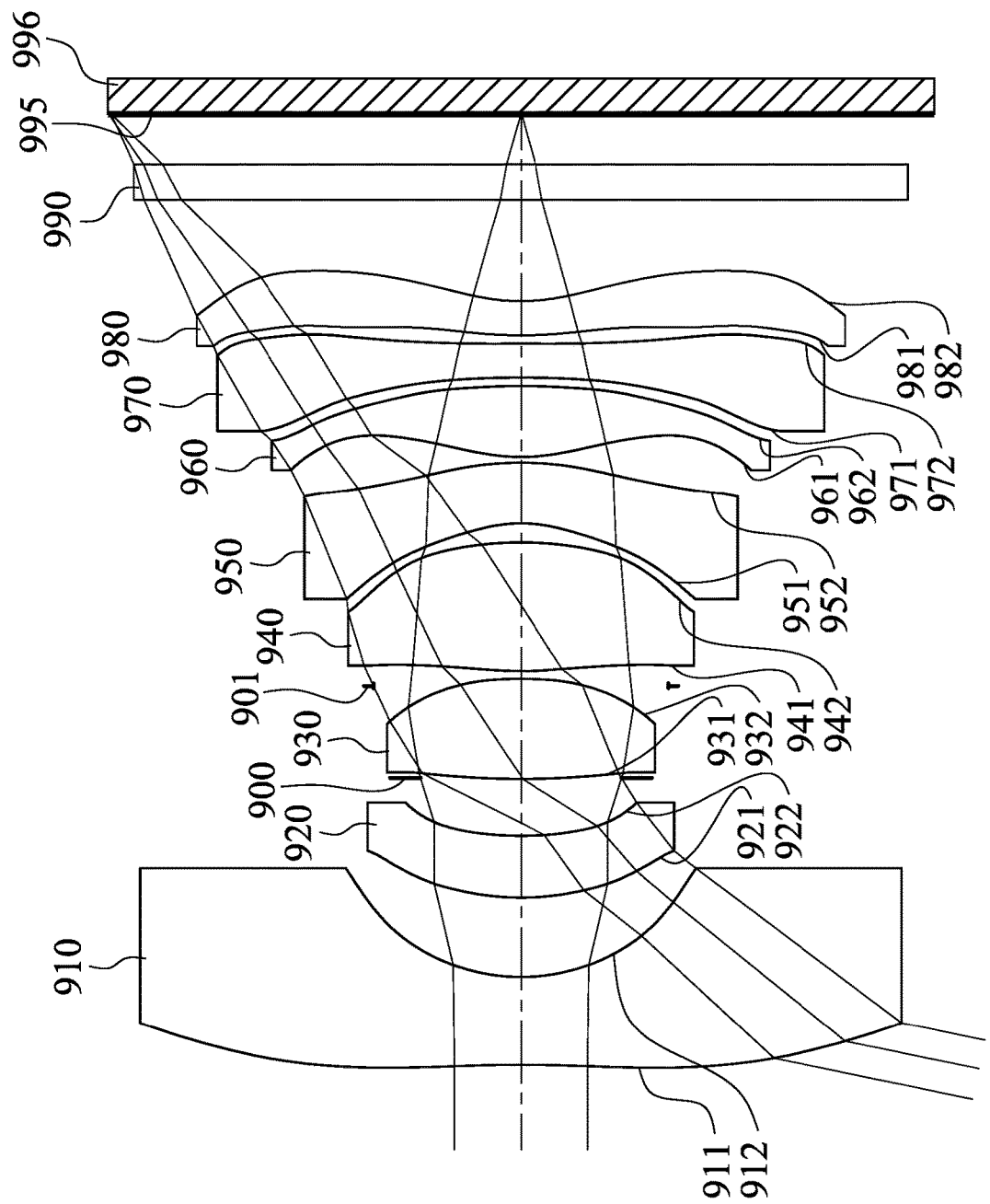
FIG. 17 is a schematic view of an imaging apparatus according to the 9th embodiment of the present disclosure.
Figure 18:
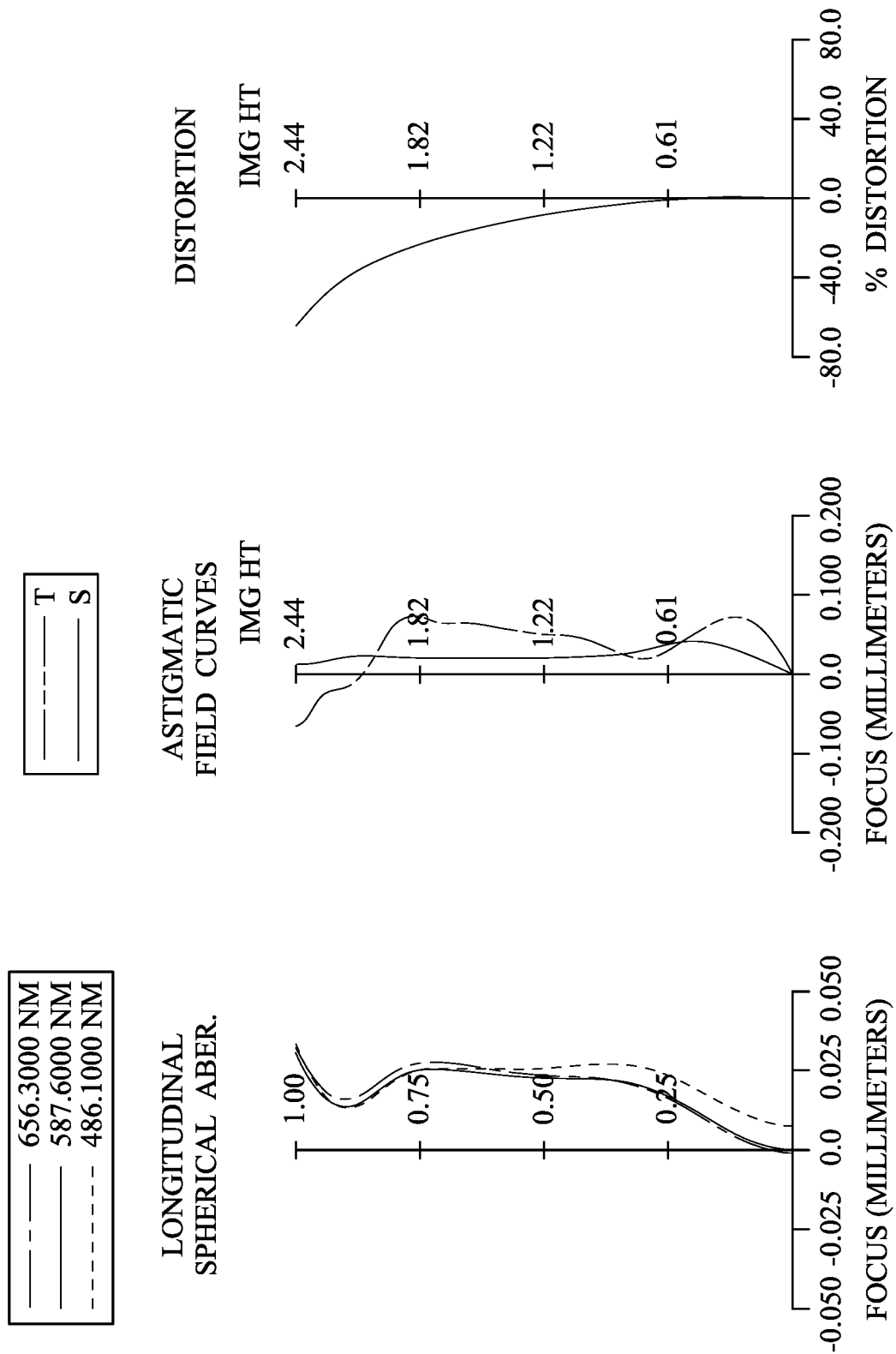
FIG. 18 shows spherical aberration curves, astigmatic field curves and a distortion curve of the imaging apparatus according to the 9th embodiment.

FIG. 17 is a schematic view of an imaging apparatus according to the 9th embodiment of the present disclosure. FIG. 18 shows spherical aberration curves, astigmatic field curves and a distortion curve of the imaging apparatus according to the 9th embodiment. In FIG. 17, the imaging apparatus includes a photographing optical lens assembly (its reference numeral is omitted) and an image sensor 996. The photographing optical lens assembly includes, in order from an object side to an image side, a first lens element 910, a second lens element 920, an aperture stop 900, a third lens element 930, a stop 901, a fourth lens element 940, a fifth lens element 950, a sixth lens element 960, a seventh lens element 970, an eighth lens element 980, a filter 990 and an image surface 995. The image sensor 996 is disposed on the image surface 995 of the photographing optical lens assembly. The photographing optical lens assembly includes eight lens elements (910, 920, 930, 940, 950, 960, 970 and 980) without additional one or more lens elements inserted between the first lens element 910 and the eighth lens element 980.

The first lens element 910 with negative refractive power has an object-side surface 911 being concave in a paraxial region thereof and an image-side surface 912 being concave in a paraxial region thereof. The first lens element 910 is made of a plastic material, and has the object-side surface 911 and the image-side surface 912 being both aspheric. Furthermore, the object-side surface 911 of the first lens element 910 includes at least one inflection point and at least one convex critical point in an off-axis region thereof. The image-side surface 912 of the first lens element 910 includes at least one inflection point.

The second lens element 920 with positive refractive power has an object-side surface 921 being convex in a paraxial region thereof and an image-side surface 922 being concave in a paraxial region thereof. The second lens element 920 is made of a plastic material, and has the object-side surface 921 and the image-side surface 922 being both aspheric. Furthermore, the object-side surface 921 of the second lens element 920 includes at least one inflection point.

The third lens element 930 with positive refractive power has an object-side surface 931 being convex in a paraxial region thereof and an image-side surface 932 being convex in a paraxial region thereof. The third lens element 930 is made of a plastic material, and has the object-side surface 931 and the image-side surface 932 being both aspheric. Furthermore, the object-side surface 931 of the third lens element 930 includes at least one inflection point.

The fourth lens element 940 with positive refractive power has an object-side surface 941 being convex in a paraxial region thereof and an image-side surface 942 being convex in a paraxial region thereof. The fourth lens element 940 is made of a plastic material, and has the object-side surface 941 and the image-side surface 942 being both aspheric. Furthermore, the object-side surface 941 of the fourth lens element 940 includes at least one inflection point and at least one critical point in an off-axis region thereof. The image-side surface 942 of the fourth lens element 940 includes at least one inflection point.

The fifth lens element 950 with negative refractive power has an object-side surface 951 being concave in a paraxial region thereof and an image-side surface 952 being convex in a paraxial region thereof. The fifth lens element 950 is made of a plastic material, and has the object-side surface 951 and the image-side surface 952 being both aspheric. Furthermore, the image-side surface 952 of the fifth lens element 950 includes at least one inflection point.

The sixth lens element 960 with positive refractive power has an object-side surface 961 being convex in a paraxial region thereof and an image-side surface 962 being convex in a paraxial region thereof. The sixth lens element 960 is made of a plastic material, and has the object-side surface 961 and the image-side surface 962 being both aspheric. Furthermore, the object-side surface 961 of the sixth lens element 960 includes at least one inflection point and at least one critical point in an off-axis region thereof. The image-side surface 962 of the sixth lens element 960 includes at least one inflection point.

The seventh lens element 970 with negative refractive power has an object-side surface 971 being concave in a paraxial region thereof and an image-side surface 972 being convex in a paraxial region thereof. The seventh lens element 970 is made of a plastic material, and has the object-side surface 971 and the image-side surface 972 being both aspheric. Furthermore, the object-side surface 971 of the seventh lens element 970 includes at least one inflection point. The image-side surface 972 of the seventh lens element 970 includes at least one inflection point and at least one critical point in an off-axis region thereof.

The eighth lens element 980 with negative refractive power has an object-side surface 981 being convex in a paraxial region thereof and an image-side surface 982 being concave in a paraxial region thereof. The eighth lens element 980 is made of a plastic material, and has the object-side surface 981 and the image-side surface 982 being both aspheric. Furthermore, the object-side surface 981 of the eighth lens element 980 includes at least one inflection point and at least one critical point in an off-axis region thereof. The image-side surface 982 of the eighth lens element 980 includes at least one inflection point and at least one critical point in an off-axis region thereof.

The filter 990 is made of a glass material and located between the eighth lens element 980 and the image surface 995, and will not affect the focal length of the photographing optical lens assembly.

The detailed optical data of the 9th embodiment are shown in TABLE 17 and the aspheric surface data are shown in TABLE 18 below.

TABLE 17

9th Embodiment
f = 1.42 mm, Fno = 1.80, HFOV = 78.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −7.549 | ASP | 0.521 | Plastic | 1.545 | 56.1 | −1.82 |
| 2 | | 1.167 | ASP | 0.468 | | | | |
| 3 | Lens 2 | 1.624 | ASP | 0.364 | Plastic | 1.639 | 23.5 | 8.03 |
| 4 | | 2.169 | ASP | 0.341 | | | | |
| 5 | Ape. Stop | Plano | | −0.006 | | | | |
| 6 | Lens 3 | 5.104 | ASP | 0.593 | Plastic | 1.544 | 56.0 | 3.46 |
| 7 | | −2.863 | ASP | −0.041 | | | | |
| 8 | Stop | Plano | | 0.088 | | | | |
| 9 | Lens 4 | 1.971 | ASP | 0.757 | Plastic | 1.544 | 56.0 | 2.01 |
| 10 | | −2.118 | ASP | 0.113 | | | | |
| 11 | Lens 5 | −0.825 | ASP | 0.360 | Plastic | 1.669 | 19.5 | −2.34 |
| 12 | | −2.049 | ASP | 0.035 | | | | |
| 13 | Lens 6 | 1.099 | ASP | 0.417 | Plastic | 1.544 | 56.0 | 1.60 |
| 14 | | −3.651 | ASP | 0.050 | | | | |
| 16 | Lens 7 | −5.505 | ASP | 0.200 | Plastic | 1.669 | 19.5 | −9.69 |
| 16 | | −37.069 | ASP | 0.050 | | | | |
| 17 | Lens 8 | 2.623 | ASP | 0.201 | Plastic | 1.566 | 37.4 | −3.63 |
| 18 | | 1.120 | ASP | 0.600 | | | | |
| 19 | Filter | Plano | | 0.210 | Glass | 1.517 | 64.2 | — |
| 20 | | Plano | | 0.296 | | | | |
| 21 | Image | Plano | | — | | | | |

Reference wavelength is 587.6 nm (d-line).
Effective radius of Surface 8 is 0.870 mm,

TABLE 18

Aspheric Coefficients

| Surface # | 1 | 2 | 3 | 4 | 6 | 7 | 9 | 10 |
|---|---|---|---|---|---|---|---|---|
| k = | 6.9104E+00 | −1.7947E−01 | −7.8059E−01 | 4.1574E+00 | −1.5741E+01 | 6.2167E+00 | −3.6513E+01 | 2.9224E−01 |
| A4 = | 8.2557E−02 | −2.8699E−03 | −5.4681E−02 | 2.6853E−02 | 4.1207E−02 | −1.0908E+00 | −5.1572E−01 | 6.5303E−02 |
| A6 = | −4.1001E−02 | 4.0802E−03 | 4.7034E−01 | 1.8723E+00 | −2.5113E−01 | 3.5581E+00 | 1.6679E+00 | −1.2004E−01 |
| A8 = | 1.8084E−02 | 5.0517E−01 | −1.4553E+00 | −1.0984E+01 | 7.7504E−01 | −7.4786E+00 | −3.1207E+00 | −2.1147E+00 |
| A10 = | −5.3981E−03 | −1.9389E+00 | 3.7873E+00 | 4.2895E+01 | −9.6778E−01 | 8.3492E+00 | 3.2356E+00 | 5.5603E+00 |
| A12 = | 9.7772E−04 | 3.5326E+00 | −4.6843E+00 | −8.1744E+01 | | −3.9245E+00 | −1.7852E+00 | −6.2693E+00 |
| A14 = | −9.6504E−05 | −2.8227E+00 | 1.9314E+00 | 6.0482E401 | | | 4.2909E−01 | 3.5162E+00 |
| A16 = | 3.9957E−06 | 7.8889E−01 | | | | | | −7.7724E−01 |

TABLE 18-continued

Aspheric Coefficients

| Surface # | 11 | 12 | 13 | 14 | 15 | 16 | 17 | 18 |
|---|---|---|---|---|---|---|---|---|
| k = | −8.4238E−01 | −1.2003E+00 | −1.3671E+01 | −2.0248E+00 | 4.0611E+00 | −3.1104E+01 | −2.9505E+01 | −5.3053E+00 |
| A4 = | 1.0394E+00 | −1.6786E−01 | 1.2302E−01 | 4.4273E−01 | 1.3335E−01 | 2.6459E−01 | 8.1406E−02 | −2.0569E−01 |
| A6 = | −2.1955E+00 | 7.9826E−01 | −9.0615E−01 | −2.1672E+00 | −8.9680E−01 | −6.8981E−01 | −8.1331E−01 | 1.3394E−01 |
| A8 = | 3.2720E+00 | −8.6422E−01 | 1.8799E+00 | 4.2954E+00 | 1.9553E+00 | 1.0306E+00 | 1.3918E+00 | −7.3448E−02 |
| A10 = | −4.1045E+00 | 1.9276E−01 | −2.2387E+00 | −4.5218E+00 | −2.1512E+00 | −8.7497E−01 | −1.1076E+00 | 4.4369E−02 |
| A12 = | 3.6167E+00 | 2.9541E−01 | 1.5311E+00 | 2.7420E+00 | 1.3098E+00 | 4.2421E−01 | 4.7884E−01 | −2.1045E−02 |
| A14 = | −1.7112E+00 | −2.1662E−01 | −5.8869E−01 | −9.6866E−01 | −4.4857E−01 | −1.1650E−01 | −1.1536E−01 | 5.6370E−03 |
| A16 = | 3.0763E−01 | 4.3005E−02 | 1.1666E−01 | 1.8687E−01 | 8.1343E−02 | 1.6854E−02 | 1.4493E−02 | −7.4735E−04 |
| A18 = | | | −9.0759E−03 | −1.5322E−02 | −6.1016E−03 | −9.9832E−04 | −7.3631E−04 | 3.8225E−05 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from TABLE 17 and TABLE 18 as the following values and satisfy the following conditions:

| 9th Embodiment | | | |
|---|---|---|---|
| f [mm] | 1.42 | f/f3 | 0.41 |
| Fno | 1.80 | f/f4 | 0.71 |
| HFOV [deg.] | 78.3 | f/f5 | −0.60 |
| N4 | 1.54 | f/f6 | 0.88 |
| Vmin | 19.5 | f/f7 | −0.15 |
| (CT7 + CT8)/CT6 | 0.96 | f/f8 | −0.39 |
| SL/TL | 0.70 | f/f12 | −0.60 |
| T12/CT2 | 1.29 | f/f123 | 0.03 |
| T56/Tavg | 0.22 | f/|R1| | 0.19 |
| TD/(CT3 + T34 + CT4 + T45 + CT5) | 2.41 | |P|max | 0.88 |
| TL [mm] | 5.62 | CRA [deg.] | 34.7 |
| TL/EPD | 7.13 | ImgH [mm] | 2.43 |
| TL/f | 3.96 | ImgH/f | 1.72 |
| TL/ImgH | 2.31 | Y11/Y82 | 1.17 |
| (R1 + R2)/(R1 − R2) | 0.73 | Y82/CT8 | 9.62 |
| f/EPD | 1.80 | Y82/f | 1.35 |
| f/f1 | −0.78 | Yc82/Y82 | 0.63 |
| f/f2 | 0.18 | | |

In the photographing optical lens assembly according to the 9th embodiment, eight lens elements (910, 920, 930, 940, 950, 960, 970 and 980) are made of plastic materials. At least one surface of the object-side surface and the image-side surface of each lens element of the aforementioned eight lens elements is aspheric and includes at least one inflection point. The Abbe numbers of the fifth lens element 950 and the seventh lens element 970 are the minimum values Vmin among Abbe numbers of the lens elements of the photographing optical lens assembly.

Specifically, numbers of inflection points and critical points in the off-axis regions of the object-side surfaces and the image-side surfaces of the eight lens elements in the 9th embodiment are listed below.

| 9th Embodiment-Numbers of Inflection Points | | | | | | | | |
|---|---|---|---|---|---|---|---|---|
| | Lens 1 | Lens 2 | Lens 3 | Lens 4 | Lens 5 | Lens 6 | Lens 7 | Lens 8 |
| Object-side surface | 1 | 1 | 1 | 2 | 0 | 1 | 1 | 3 |
| Image-side surface | 1 | 0 | 0 | 1 | 2 | 1 | 2 | 1 |

| 9th Embodiment-Numbers of Critical Points | | | | | | | | |
|---|---|---|---|---|---|---|---|---|
| | Lens 1 | Lens 2 | Lens 3 | Lens 4 | Lens 5 | Lens 6 | Lens 7 | Lens 8 |
| Object-side surface | 1 | 0 | 0 | 1 | 0 | 1 | 0 | 3 |
| Image-side surface | 0 | 0 | 0 | 0 | 0 | 0 | 2 | 1 |

10TH EMBODIMENT

Figure 19:
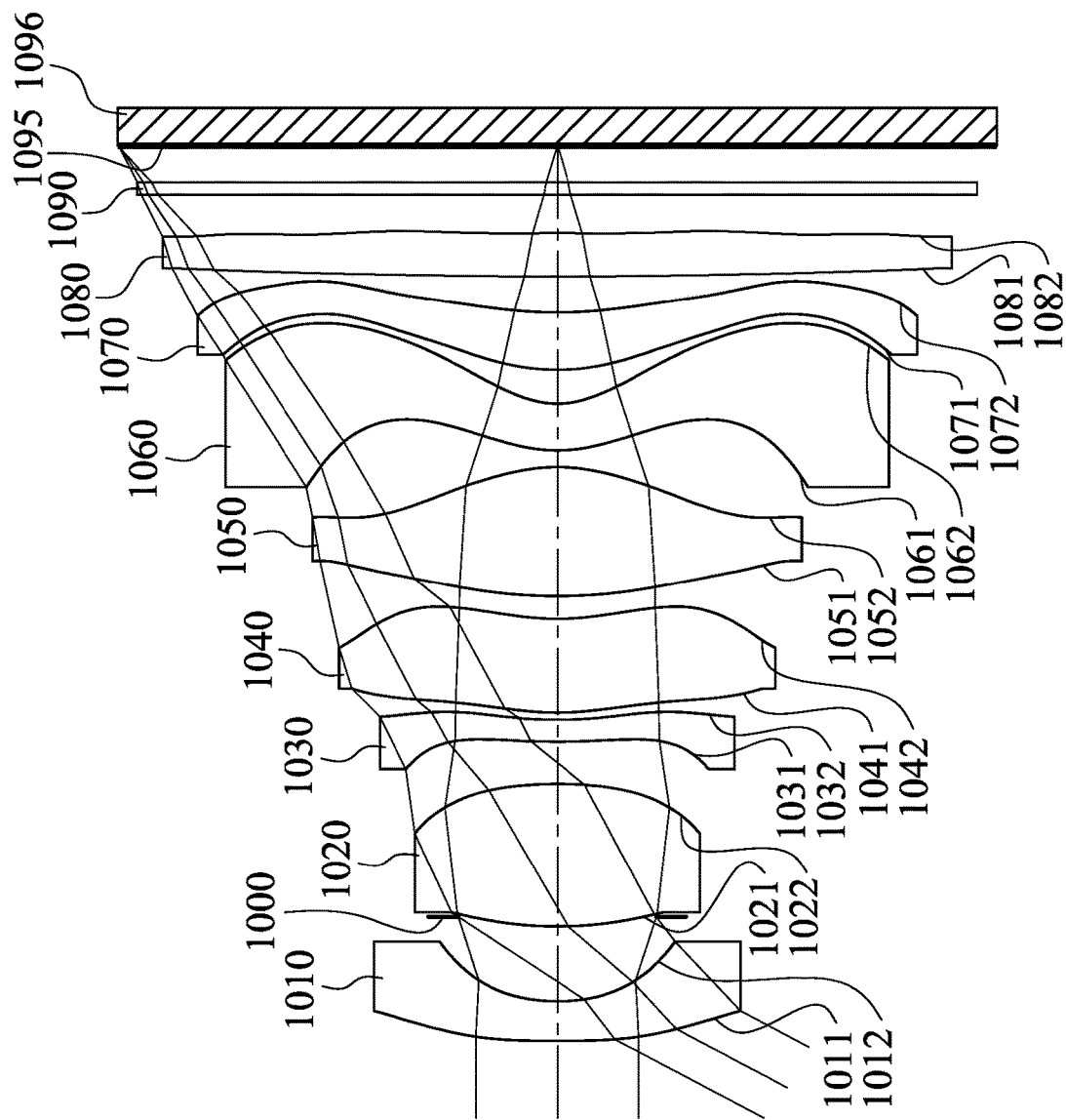
FIG. 19 is a schematic view of an image capturing apparatus according to the 10th embodiment of the present disclosure.
Figure 20:
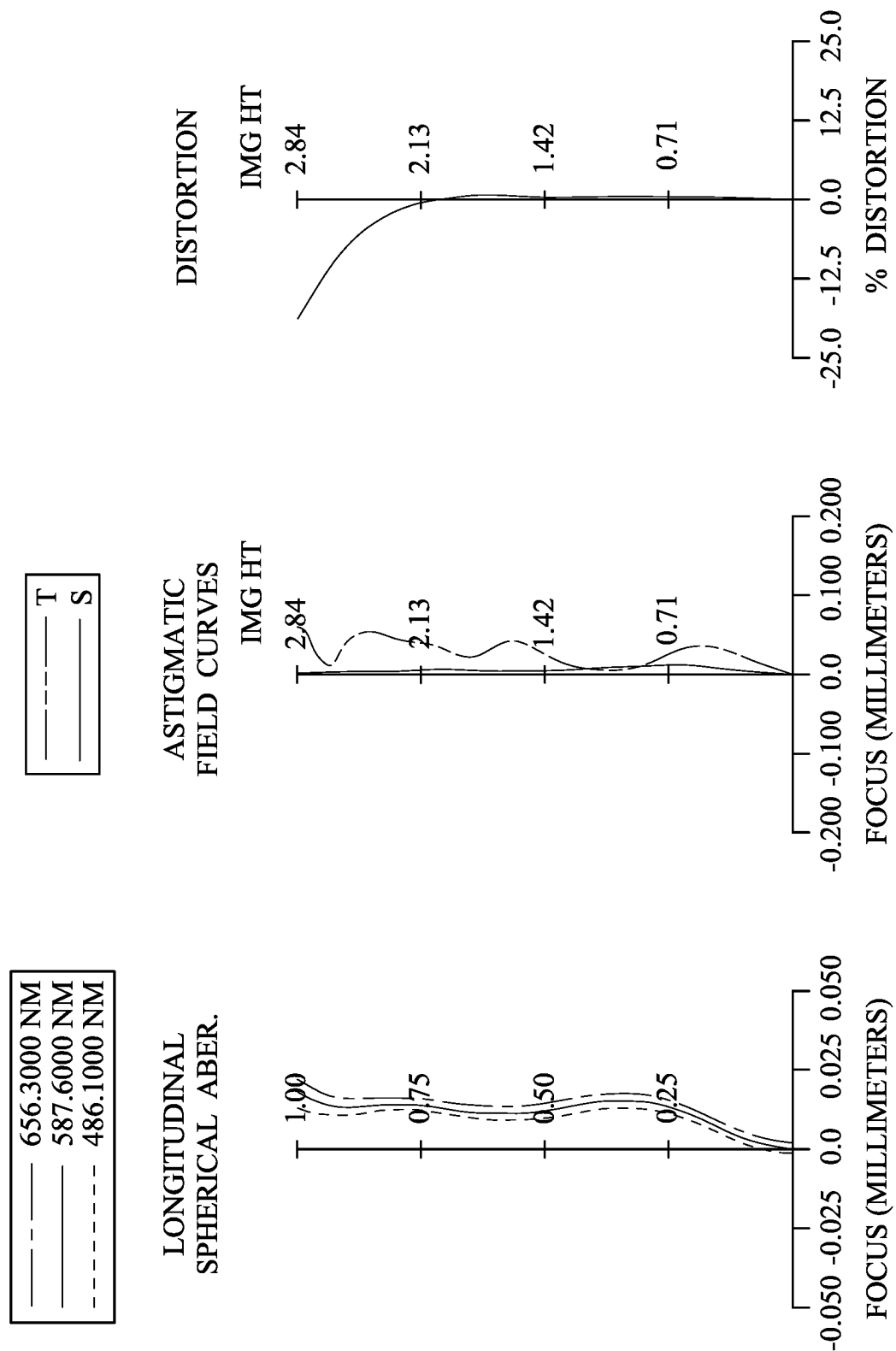
FIG. 20 shows spherical aberration curves, astigmatic field curves and a distortion curve of the image capturing apparatus according to the 10th embodiment.

FIG. 19 is a schematic view of an imaging apparatus according to the 10th embodiment of the present disclosure. FIG. 20 shows spherical aberration curves, astigmatic field curves and a distortion curve of the imaging apparatus according to the 10th embodiment. In FIG. 19, the imaging apparatus includes a photographing optical lens assembly (its reference numeral is omitted) and an image sensor 1096. The photographing optical lens assembly includes, in order from an object side to an image side, a first lens element 1010, an aperture stop 1000, a second lens element 1020, a third lens element 1030, a fourth lens element 1040, a fifth lens element 1050, a sixth lens element 1060, a seventh lens element 1070, an eighth lens element 1080, a filter 1090 and an image surface 1095. The image sensor 1096 is disposed on the image surface 1095 of the photographing optical lens assembly. The photographing optical lens assembly includes eight lens elements (1010, 1020, 1030, 1040, 1050, 1060, 1070 and 1080) without additional one or more lens elements inserted between the first lens element 1010 and the eighth lens element 1080.

The first lens element 1010 with negative refractive power has an object-side surface 1011 being convex in a paraxial region thereof and an image-side surface 1012 being concave in a paraxial region thereof. The first lens element 1010 is made of a plastic material, and has the object-side surface 1011 and the image-side surface 1012 being both aspheric. Furthermore, the object-side surface 1011 of the first lens element 1010 includes at least one inflection point.

The second lens element 1020 with positive refractive power has an object-side surface 1021 being convex in a paraxial region thereof and an image-side surface 1022 being convex in a paraxial region thereof. The second lens element 1020 is made of a plastic material, and has the object-side surface 1021 and the image-side surface 1022 being both aspheric.

Furthermore, the object-side surface 1021 of the second lens element 1020 includes at least one inflection point.

The third lens element 1030 with negative refractive power has an object-side surface 1031 being convex in a paraxial region thereof and an image-side surface 1032 being concave in a paraxial region thereof. The third lens element 1030 is made of a plastic material, and has the object-side surface 1031 and the image-side surface 1032 being both aspheric. Furthermore, the object-side surface 1031 of the third lens element 1030 includes at least one inflection point and at least one critical point in an off-axis region thereof. The image-side surface 1032 of the third lens element 1030 includes at least one inflection point and at least one critical point in an off-axis region thereof.

The fourth lens element 1040 with positive refractive power has an object-side surface 1041 being convex in a paraxial region thereof and an image-side surface 1042 being concave in a paraxial region thereof. The fourth lens element 1040 is made of a plastic material, and has the object-side surface 1041 and the image-side surface 1042 being both aspheric. Furthermore, the object-side surface 1041 of the fourth lens element 1040 includes at least one inflection point. The image-side surface 1042 of the fourth lens element 1040 includes at least one inflection point and at least one critical point in an off-axis region thereof.

The fifth lens element 1050 with positive refractive power has an object-side surface 1051 being convex in a paraxial region thereof and an image-side surface 1052 being convex in a paraxial region thereof. The fifth lens element 1050 is made of a plastic material, and has the object-side surface 1051 and the image-side surface 1052 being both aspheric. Furthermore, the object-side surface 1051 of the fifth lens element 1050 includes at least one inflection point and at least one critical point in an off-axis region thereof. The image-side surface 1052 of the fifth lens element 1050 includes at least one inflection point and at least one critical point in an off-axis region thereof.

The sixth lens element 1060 with negative refractive power has an object-side surface 1061 being convex in a paraxial region thereof and an image-side surface 1062 being concave in a paraxial region thereof. The sixth lens element 1060 is made of a plastic material, and has the object-side surface 1061 and the image-side surface 1062 being both aspheric. Furthermore, the object-side surface 1061 of the sixth lens element 1060 includes at least one inflection point and at least one critical point in an off-axis region thereof. The image-side surface 1062 of the sixth lens element 1060 includes at least one inflection point and at least one critical point in an off-axis region thereof.

The seventh lens element 1070 with positive refractive power has an object-side surface 1071 being convex in a paraxial region thereof and an image-side surface 1072 being concave in a paraxial region thereof. The seventh lens element 1070 is made of a plastic material, and has the object-side surface 1071 and the image-side surface 1072 being both aspheric.

Furthermore, the object-side surface 1071 of the seventh lens element 1070 includes at least one inflection point and at least one critical point in an off-axis region thereof. The image-side surface 1072 of the seventh lens element 1070 includes at least one inflection point and at least one critical point in an off-axis region thereof.

The eighth lens element 1080 with positive refractive power has an object-side surface 1081 being convex in a paraxial region thereof and an image-side surface 1082 being convex in a paraxial region thereof. The eighth lens element 1080 is made of a plastic material, and has the object-side surface 1081 and the image-side surface 1082 being both aspheric. Furthermore, the image-side surface 1082 of the eighth lens element 1080 includes at least one inflection point and at least one critical point in an off-axis region thereof.

The filter 1090 is made of a glass material and located between the eighth lens element 1080 and the image surface 1095, and will not affect the focal length of the photographing optical lens assembly.

The detailed optical data of the 10th embodiment are shown in TABLE 19 and the aspheric surface data are shown in TABLE 20 below.

TABLE 19

10th Embodiment
f = 1.85 mm, Fno = 1.75, HFOV = 62.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 12.365 | ASP | 0.266 | Plastic | 1.545 | 56.1 | -2.53 |
| 2 | | 1.231 | ASP | 0.547 | | | | |
| 3 | Ape. Stop | Plano | | -0.061 | | | | |
| 4 | Lens 2 | 2.585 | ASP | 0.925 | Plastic | 1.544 | 66.0 | 2.63 |
| 5 | | -2.790 | ASP | 0.273 | | | | |
| 6 | Lens 3 | 5.387 | ASP | 0.142 | Plastic | 1.688 | 18.7 | -8.30 |
| 7 | | 2.742 | ASP | 0.047 | | | | |
| 8 | Lens 4 | 1.833 | ASP | 0.607 | Plastic | 1.544 | 56.0 | 67.42 |
| 9 | | 1.705 | ASP | 0.148 | | | | |
| 10 | Lens 5 | 3.629 | ASP | 0.836 | Plastic | 1.544 | 56.0 | 1.77 |
| 11 | | -1.215 | ASP | 0.109 | | | | |
| 12 | Lens 6 | 1.020 | ASP | 0.302 | Plastic | 1.688 | 18.7 | -2.81 |
| 13 | | 0.687 | ASP | 0.219 | | | | |
| 14 | Lens 7 | 1.446 | ASP | 0.373 | Plastic | 1.644 | 56.0 | 4.96 |
| 15 | | 2.831 | ASP | 0.234 | | | | |
| 16 | Lens 8 | 54.510 | ASP | 0.281 | Plastic | 1.544 | 56.0 | 29.52 |
| 17 | | -22.721 | ASP | 0.250 | | | | |
| 18 | Filter | Plano | | 0.080 | Glass | 1.517 | 64.2 | — |
| 19 | | Plano | | 0.237 | | | | |
| 20 | Image | Plano | | — | | | | |

Reference wavelength is 587.6 nm (d-line).

TABLE 20

Aspheric Coefficients

| Surface # | 1 | 2 | 4 | 5 | 6 | 7 | 8 | 9 |
|---|---|---|---|---|---|---|---|---|
| k = | -3.4116E+01 | -8.4126E+00 | 3.0842E+00 | 1.5331E+00 | 2.6832E+01 | -1.0000E+00 | -2.8174E+01 | -1.2429E+01 |
| A4 = | 2.9257E-01 | 1.0064E+00 | -9.7058E-03 | -1.6835E-01 | 8.8567E-02 | 1.2996E-02 | -4.3589E-02 | -1.2512E-01 |
| A6 = | -3.9730E-01 | -1.2702E+00 | 1.3602E-02 | -1.0929E-01 | -1.3660E+00 | -7.5002E-01 | -9.9092E-02 | 2.2726E-02 |
| A8 = | 3.8311E-01 | 2.0009E+00 | -4.1579E-01 | 3.8446E-01 | 2.4628E+00 | 1.1816E+00 | 1.2433E-01 | -7.7071E-02 |
| A10 = | -2.7035E-01 | -1.8709E+00 | 9.7186E-01 | -8.4209E-01 | -2.7267E+00 | -8.8840E-01 | 2.4131E-02 | 4.8777E-02 |
| A12 = | 1.1971E-01 | 9.5837E-01 | -1.1188E+00 | 8.7790E-01 | 1.6266E+00 | 3.5213E-01 | -8.7277E-02 | -7.7169E-03 |
| A14 = | -2.9104E-02 | -2.0887E-01 | 2.3467E-01 | -3.9033E-01 | -4.3942E-01 | -5.8579E-02 | 4.3688E-02 | |
| A16 = | 3.0227E-03 | | | | | | -7.14925-03 | |

| Surface # | 10 | 11 | 12 | 13 | 14 | 15 | 16 | 17 |
|---|---|---|---|---|---|---|---|---|
| k = | -3.5055E+00 | -1.7215E+00 | -1.5120E+00 | -1.0826E+00 | -4.5086E+00 | -3.2708E+01 | -9.0000E+01 | 6.3112E+01 |
| A4 = | 4.0721E-02 | 1.9934E-01 | -3.2008E-01 | -7.5861E-01 | 2.1811E-01 | 1.0502E-01 | | 1.3369E-01 |
| A6 = | -8.5567E-02 | -2.1784E-01 | 7.2688E-02 | 6.0156E-01 | -7.0493E-01 | -3.4651E-01 | | -1.6603E-01 |
| A8 = | 4.4280E-02 | 1.3165E-01 | 2.9983E-02 | -3.4277E-01 | 8.8365E-01 | 4.6830E-01 | | 9.0669E-02 |
| A10 = | -5.4004E-03 | 4.4570E-02 | -3.4090E-02 | 1.4244E-01 | -6.0331E-01 | -3.2404E-01 | | -2.6409E-02 |
| A12 = | -8.9738E-04 | -1.0166E-02 | 1.0530E-02 | -4.4311E-02 | 2.4386E-01 | 1.2767E-01 | | 4.3818E-03 |
| A14 = | | 5.8190E-02 | -1.2848E-03 | 1.0188E-02 | -6.0083E-02 | -3.0046E-02 | | -4.1203E-04 |
| A16 = | | -1.8683E-02 | 5.2841E-05 | -1.6170E-03 | 8.8676E-03 | 4.1979E-03 | | 2.0170E-05 |
| A18 = | | 2.4294E-03 | | 1.5447E-04 | -7.2070E-04 | -3.2229E-04 | | -3.8905E-07 |
| A20 = | | -1.4109E-04 | | -6.5566E-06 | 2.4805E-05 | 1.0500E-05 | | |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again. Furthermore, five values of parameter Yc82/Y82 in the following table are respectively corresponding to five critical points located from the axial vertex to the maximum effective diameter position in the off-axis region of the image-side surface 1082 of the eighth lens element 1080.

Moreover, these parameters can be calculated from TABLE 19 and TABLE 20 as the following values and satisfy the following conditions:

| 10th Embodiment | | | |
|---|---|---|---|
| f [mm] | 1.85 | f/f3 | -0.22 |
| Fno | 1.75 | f/f4 | 0.03 |
| HFOV [deg.] | 62.1 | f/f5 | 1.04 |
| N4 | 1.54 | f/f6 | -0.66 |
| Vmin | 18.7 | f/f7 | 0.37 |
| (CT7 + CT8)/CT6 | 2.17 | f/f8 | 0.06 |
| SL/TL | 0.86 | f/f12 | 0.19 |
| T12/CT2 | 0.53 | f/f123 | -0.08 |
| T56/Tavg | 0.50 | f/|R1| | 0.15 |
| TD/(CT3 + T34 + CT4 + T45 + CT5) | 2.94 | |P|max | 1.04 |
| TL [mm] | 5.81 | CRA [deg.] | 33.6 |
| TL/EPD | 5.50 | ImgH [mm] | 2.84 |
| TL/f | 3.14 | ImgH/f | 1.54 |

-continued

| 10th Embodiment | | | |
|---|---|---|---|
| TL/ImgH | 2.04 | Y11/Y82 | 0.46 |
| (R1 + R2)/(R1 − R2) | 1.22 | Y82/CT8 | 9.10 |
| f/EPD | 1.75 | Y82/f | 1.38 |
| f/f1 | −0.73 | Yc82/Y82 | 0.12, 0.39, 0.65, 0.78, 0.98 |
| f/f2 | 0.70 | | |

In the photographing optical lens assembly according to the 10th embodiment, eight lens elements (1010, 1020, 1030, 1040, 1050, 1060, 1070 and 1080) are made of plastic materials. At least one surface of the object-side surface and the image-side surface of each lens element of the aforementioned eight lens elements is aspheric and includes at least one inflection point. The Abbe numbers of the third lens element 1030 and the sixth lens element 1060 are the minimum values Vmin among Abbe numbers of the lens elements of the photographing optical lens assembly.

Specifically, numbers of inflection points and critical points in the off-axis regions of the object-side surfaces and the image-side surfaces of the eight lens elements in the 10th embodiment are listed below.

| 10th Embodiment-Numbers of Inflection Points | | | | | | | | |
|---|---|---|---|---|---|---|---|---|
| | Lens 1 | Lens 2 | Lens 3 | Lens 4 | Lens 5 | Lens 6 | Lens 7 | Lens 8 |
| Object-side surface | 1 | 1 | 1 | 2 | 1 | 1 | 1 | 0 |
| Image-side surface | 0 | 0 | 2 | 2 | 2 | 1 | 1 | 5 |

| 10th Embodiment-Numbers of Critical Points | | | | | | | | |
|---|---|---|---|---|---|---|---|---|
| | Lens 1 | Lens 2 | Lens 3 | Lens 4 | Lens 5 | Lens 6 | Lens 7 | Lens 8 |
| Object-side surface | 0 | 0 | 1 | 0 | 1 | 1 | 1 | 0 |
| Image-side surface | 0 | 0 | 1 | 1 | 2 | 1 | 1 | 5 |

11TH EMBODIMENT

Figure 24:
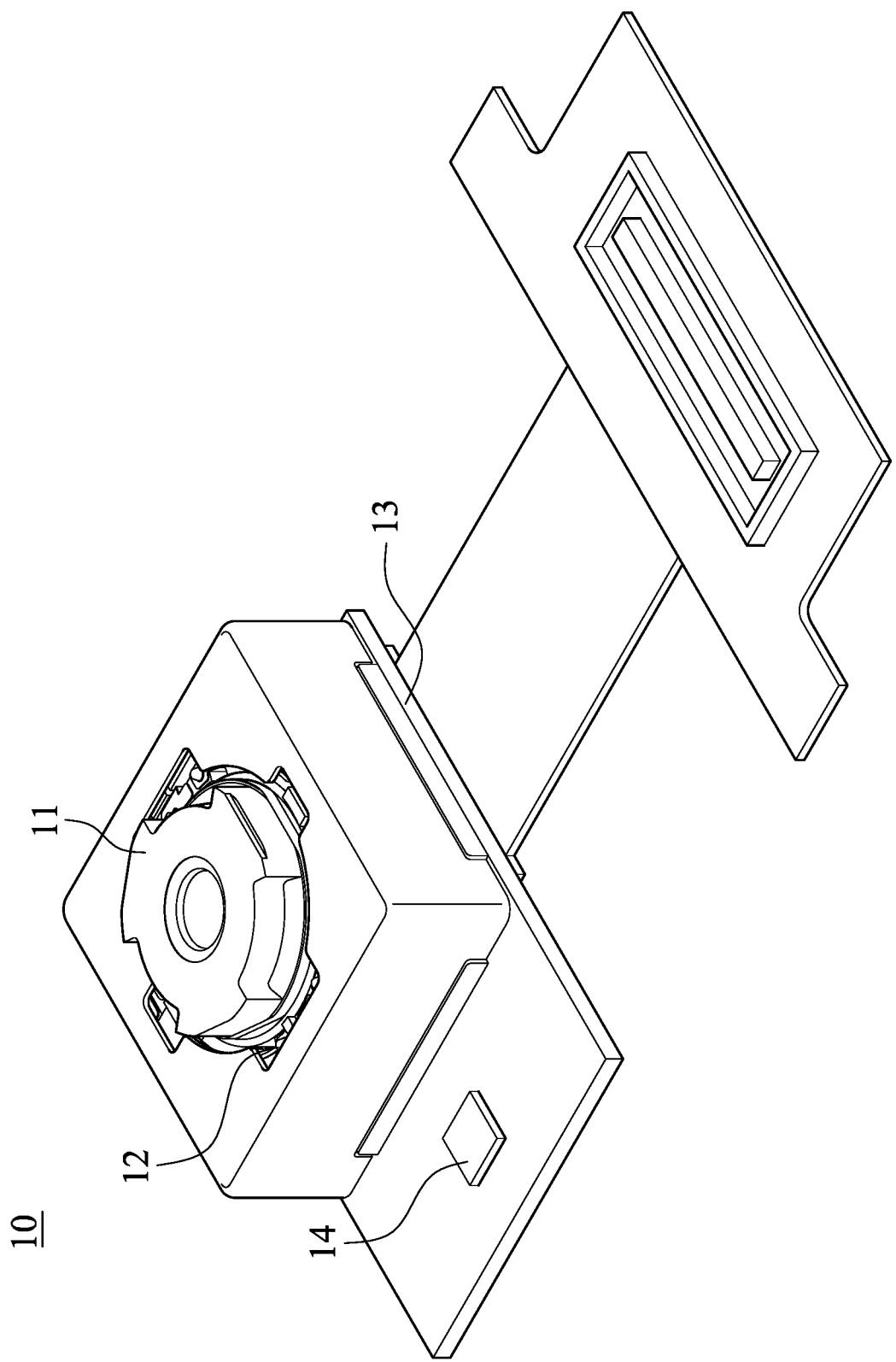
FIG. 24 is a three-dimensional schematic view of an imaging apparatus according to the 11th embodiment of the present disclosure.

FIG. 24 is a three-dimensional schematic view of an imaging apparatus 10 according to the 11th embodiment of the present disclosure. In FIG. 24, the imaging apparatus 10 of the 11th embodiment is a camera module, the imaging apparatus 10 includes an imaging lens assembly 11, a driving apparatus 12 and an image sensor 13, wherein the imaging lens assembly 11 includes the photographing optical lens assembly according to the present disclosure and a lens barrel (its reference numeral is omitted) for carrying the photographing optical lens assembly. The imaging apparatus 10 can focus light from an imaged object via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys etc. The photographing optical lens assembly can obtain a favorable imaging position by the driving apparatus 12 so as to capture clear images when the imaged object is disposed at different object distances.

The imaging apparatus 10 can include the image sensor 13 located on the image surface of the photographing optical lens assembly, such as CMOS and CCD, with superior sensitivity and low noise. Thus, it is favorable for providing realistic images with high definition image quality thereof.

Moreover, the imaging apparatus 10 can further include an image stabilization module 14, which can be a kinetic energy sensor, such as an accelerometer, a gyro sensor, and a Hall Effect sensor. In the 11th embodiment, the image stabilization module 14 is a gyro sensor, but is not limited thereto. Therefore, the variation of different axial directions of the photographing optical lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

12TH EMBODIMENT

Figure 25A:
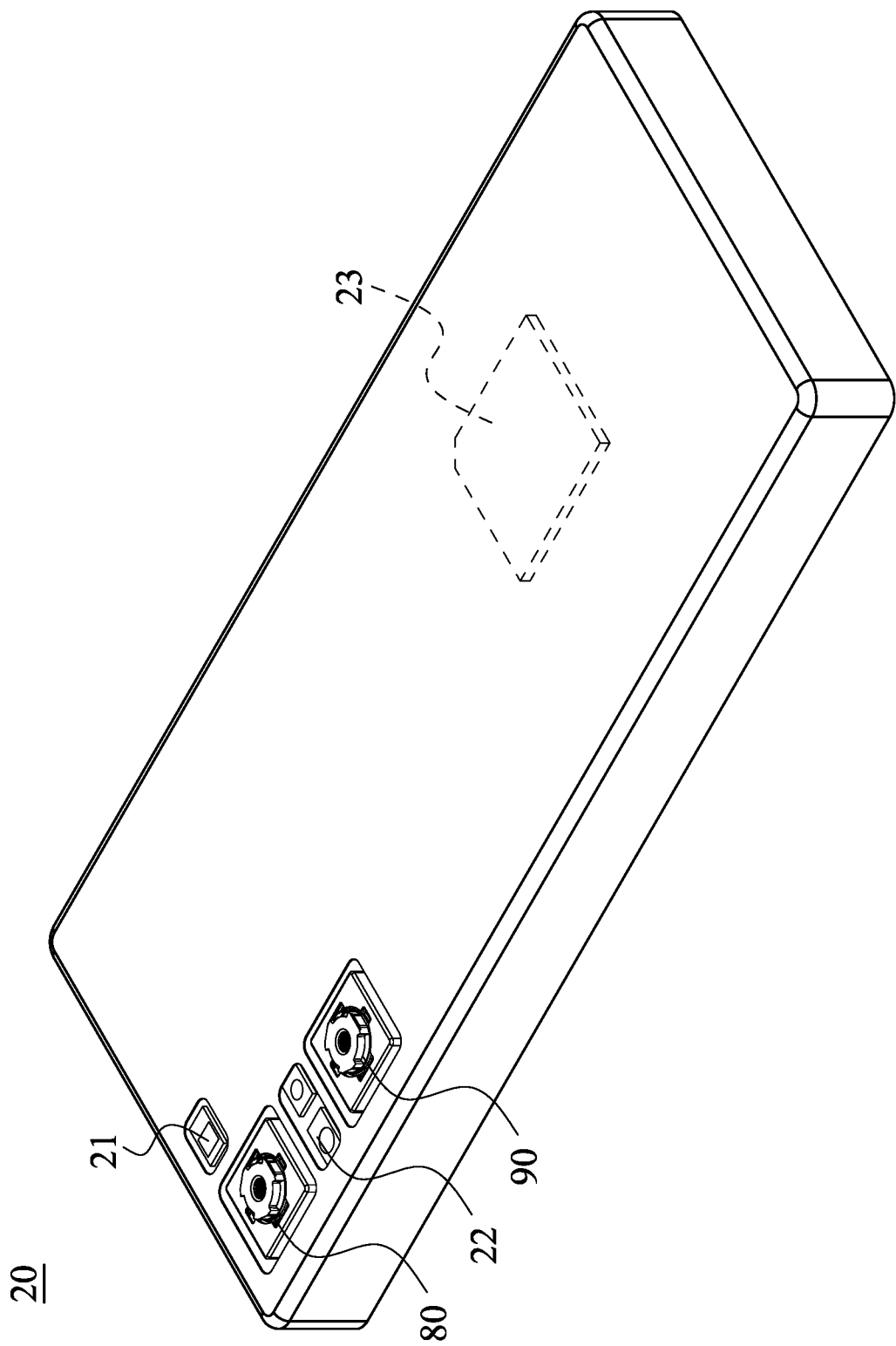
FIG. 25A is a schematic view of one side of an electronic device according to the 12th embodiment of the present disclosure.
Figure 25B:
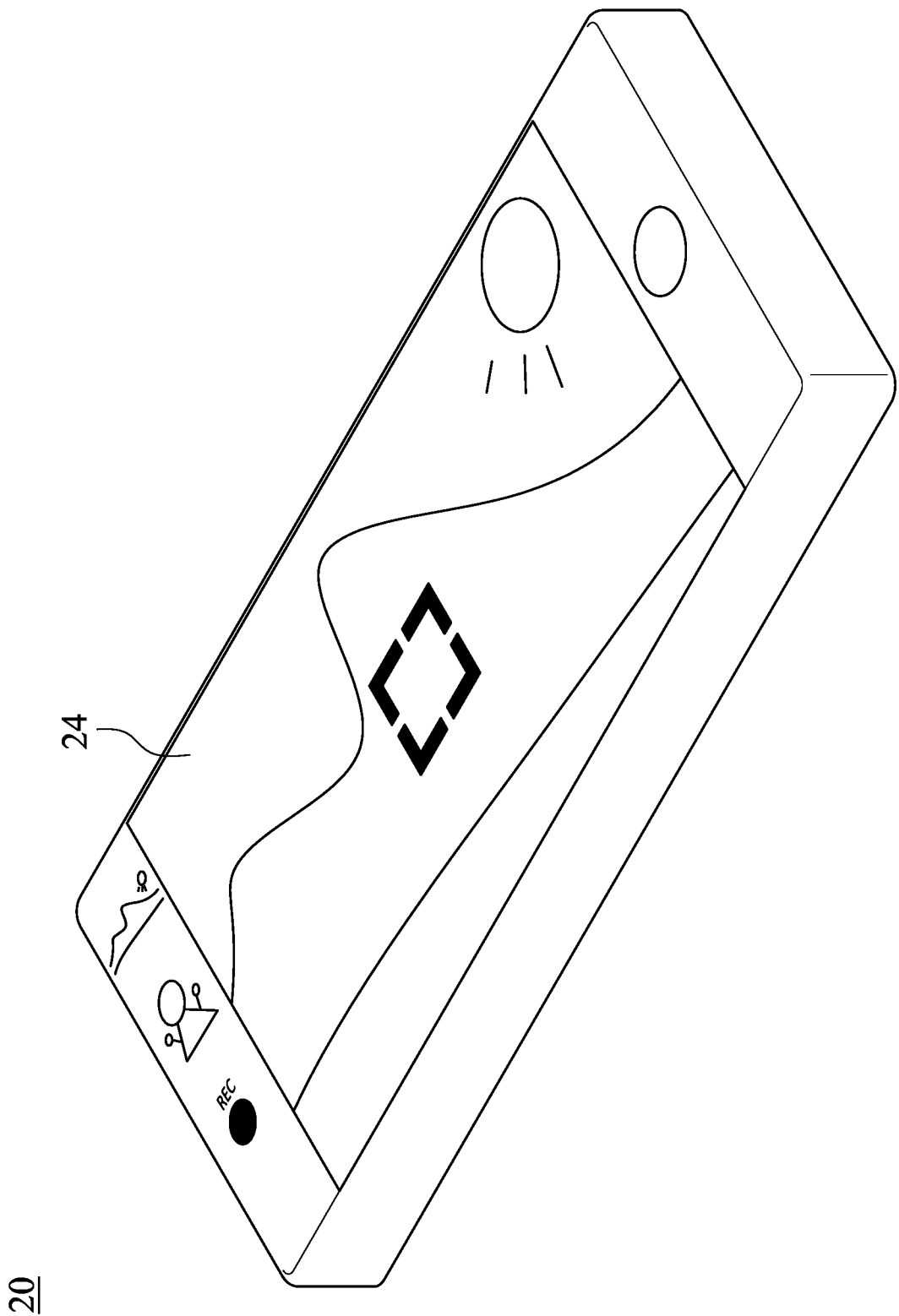
FIG. 25B is a schematic view of another side of the electronic device of FIG. 25A.

FIG. 25A is a schematic view of one side of an electronic device 20 according to the 12th embodiment of the present disclosure. FIG. 25B is a schematic view of another side of the electronic device 20 of FIG. 25A. FIG. 25C is a system schematic view of the electronic device 20 of FIG. 25A. In FIGS. 25A, 29B and 29C, the electronic device 20 according to the 12th embodiment is a smartphone, wherein the electronic device 20 includes imaging apparatuses 80, 90, a flash module 21, a focusing assisting module 22, an image signal processor 23, a user interface 24 and an image software processor 25. The imaging apparatus 80 includes an imaging lens module 81, a driving apparatus 82, an image sensor 83 and an image stabilization module 84. The imaging apparatus 90 includes an imaging lens module 91, a driving apparatus 92, an image sensor 93 and an image stabilization module 94. At least one of the imaging lens modules 81 and 91 includes a photographing optical lens assembly according to the present disclosure. Furthermore, the imaging properties of the imaging apparatuses 80 and 90 may be not the same. The arrangements and the imaging properties of the imaging apparatuses 80 and 90 are not limited thereto.

When the user captures images of an imaged object 26 via the user interface 24, the electronic device 20 focuses and generates images via at least one of the imaging apparatuses 80 and 90 (that is, a single or a plurality of images are captured by the imaging apparatuses 80 and 90) while compensating for low illumination via the flash module 21 when necessary. Then, the electronic device 20 quickly focuses on the imaged object according to its object distance information provided by the focusing assisting module 22, and optimizes the image via the image signal processor 23 (ISP) and the image software processor 25. Thus, the image quality can be further enhanced. The focusing assisting module 22 can adopt infrared or laser for obtaining quick focusing, and the user interface 24 can utilize a touch screen or a physical button for capturing and processing the image with various functions of the image processing software.

At least one of the imaging apparatuses 80 and 90 according to the 12th embodiment is the same as the imaging apparatus 10 according to the 11th embodiment, and will not describe again herein.

13TH EMBODIMENT

Figure 26:
FIG. 26 is a schematic view of an electronic device according to the 13th embodiment of the present disclosure.

FIG. 26 is a schematic view of an electronic device 30 according to the 13th embodiment of the present disclosure. The electronic device 30 of the 13th embodiment is a wearable device, wherein the electronic device 30 includes an imaging apparatus 31, and the imaging apparatus 31 can be the same as stated in the 11th embodiment, and will not describe again herein.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising eight lens elements, the eight lens elements being, in order from an object side to an image side:
    a first lens element, a second lens element, a third lens element, a fourth lens element, a fifth lens element, a sixth lens element, a seventh lens element and an eighth lens element; each of the eight lens elements has an object-side surface facing towards the object side and an image-side surface facing towards the image side;
    wherein the photographing optical lens assembly has a total of eight lens elements, the first lens element has negative refractive power; the object-side surface of the fifth lens element is concave in a paraxial region thereof; the eighth lens element has negative refractive power, and the image-side surface of the eighth lens element comprises at least one critical point in an off-axis region thereof;
    wherein a half of a maximum field of view of the photographing optical lens assembly is HFOV, an axial distance between the object-side surface of the first lens element and an image surface is TL, a vertical distance between the critical point in the off-axis region on the image-side surface of the eighth lens element and an optical axis is Yc82, a vertical distance between a maximum effective diameter position of the image-side surface of the eighth lens element and the optical axis is Y82, and the following conditions are satisfied:

$55.0 \text{ degrees} < HFOV$;

$1.0 \text{ mm} < TL < 12.0 \text{ mm}$; and $0.10 < Yc82/Y82 < 0.90$.

2. The photographing optical lens assembly of claim 1, wherein an axial distance between the first lens element and the second lens element is T12, a central thickness of the second lens element is CT2, and the following condition is satisfied:

$0.40 < T12/CT2 < 1.7$.

3. The photographing optical lens assembly of claim 1, wherein a focal length of the photographing optical lens assembly is f, a focal length of the second lens element is f2, and the following condition is satisfied:

$-0.55 < f/f2 \leq 0.53$.

4. The photographing optical lens assembly of claim 1, wherein a focal length of the photographing optical lens assembly is f, a composite focal length of the first lens element, the second lens element and the third lens element is f123, and the following condition is satisfied:

$-0.14 < f/f123 < 0.54$.

5. The photographing optical lens assembly of claim 1, wherein a focal length of the photographing optical lens assembly is f, a curvature radius of the object-side surface of the first lens element is R1, and the following condition is satisfied:

$f/|R1| < 1.20$.

6. The photographing optical lens assembly of claim 1, wherein the vertical distance between the maximum effective diameter position of the image-side surface of the eighth lens element and the optical axis is Y82, a focal length of the photographing optical lens assembly is f, and the following condition is satisfied:

$1.0 < Y82/f < 3.0$.

7. The photographing optical lens assembly of claim 1, wherein the fourth lens element has positive refractive power, a focal length of the photographing optical lens assembly is f, a focal length of the fourth lens element is f4, and the following condition is satisfied:

$0.57 \leq f/f4 < 2.00$.

8. The photographing optical lens assembly of claim 1, wherein at least five lens elements of the first lens element through the eighth lens element are made of plastic materials, and at least one surface of the object-side surface and the image-side surface of the at least five lens elements is aspheric and comprises at least one inflection point.

9. The photographing optical lens assembly of claim 1, further comprising:
    an aperture stop disposed on an image side of the first lens element;
    wherein an axial distance between the aperture stop and the image surface is SL, the axial distance between the object-side surface of the first lens element and the image surface is TL, and the following condition is satisfied:

$0.30 < SL/TL \leq 0.86$.

* * * * *